United States Patent
Lee et al.

(10) Patent No.: US 9,730,198 B2
(45) Date of Patent: Aug. 8, 2017

(54) METHOD AND APPARATUS FOR TRANSMITTING CONTROL INFORMATION IN A WIRELESS COMMUNICATION SYSTEM

(75) Inventors: Hyunwoo Lee, Anyang-si (KR); Jinmin Kim, Anyang-si (KR); Seunghee Han, Anyang-si (KR)

(73) Assignee: LG Electronics Inc., Seoul (KR)

(*) Notice: Subject to any disclaimer, the term of this patent is extended or adjusted under 35 U.S.C. 154(b) by 165 days.

(21) Appl. No.: 14/117,305

(22) PCT Filed: May 23, 2012

(86) PCT No.: PCT/KR2012/004067
§ 371 (c)(1),
(2), (4) Date: Nov. 12, 2013

(87) PCT Pub. No.: WO2012/161510
PCT Pub. Date: Nov. 29, 2012

(65) Prior Publication Data
US 2014/0334395 A1    Nov. 13, 2014

Related U.S. Application Data

(60) Provisional application No. 61/488,802, filed on May 23, 2011.

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1861* (2013.01); *H04L 5/0053* (2013.01);
(Continued)

(58) Field of Classification Search
CPC ....... H04L 72/0413; H04L 1/1861; H04J 4/00
See application file for complete search history.

(56) References Cited

U.S. PATENT DOCUMENTS

2009/0241004 A1* 9/2009 Ahn ............... H04L 1/1812
714/749
2010/0290369 A1* 11/2010 Hui ............... H04B 7/2656
370/279

(Continued)

FOREIGN PATENT DOCUMENTS

KR    10-2007-0030539 A    3/2007
KR    10-2011-0046817 A    5/2011

OTHER PUBLICATIONS

3GPP, "Technical Specification 3rd Generation Partnership Project; Technical Specification Group Radio Access Network; Evolved Universal Terrestrial Radio Access (E-UTRA); Physical layer procedures (Release 10)." 3GPP TS 36.213 V10.1.0, Mar. 2011. (Retrieved from the Internet on Nov. 30, 2012: <URL:http://www.3gpp.org/ftp/Specs/html-info/36213.htm>.

*Primary Examiner* — Jeffrey M Rutkowski
*Assistant Examiner* — Thomas D Busch
(74) *Attorney, Agent, or Firm* — Dentons US LLP

(57) ABSTRACT

The invention relates to a wireless communication system, and more particularly, to a method and apparatus for transmitting control information. The wireless communication system may support carrier aggregation (CA). A method for transmitting control information to a base station by a terminal in a wireless communication system according to one aspect of the present invention comprises the steps of: receiving at least one of either a physical downlink control channel (PDCCH) or a physical downlink shared channel (PDSCH) from said base station via at least one serving cell provided on the terminal; and transmitting, to said base station, control information on the reception of said PDCCH or on the reception of said PDSCH indicated by the PDCCH. Said at least one serving cell may use a frequency division duplex (FDD) frame structure or a time division duplex (TDD) frame structure. Said control information may be (Continued)

transmitted using a control information feedback timing of a first serving cell determined in accordance with a preset criterion from said at least one serving cell.

17 Claims, 40 Drawing Sheets

(51) Int. Cl.
    *H04L 5/00*          (2006.01)
    *H04L 27/26*        (2006.01)
    *H04L 1/00*          (2006.01)
    *H04L 5/14*          (2006.01)

(52) U.S. Cl.
    CPC .......... H04L 5/0055 (2013.01); H04L 5/0057 (2013.01); *H04L 1/0026* (2013.01); *H04L 5/001* (2013.01); *H04L 5/14* (2013.01); *H04L 27/2633* (2013.01); *H04L 27/2636* (2013.01); *H04L 27/2644* (2013.01)

(56) References Cited

U.S. PATENT DOCUMENTS

| | | | |
|---|---|---|---|
| 2012/0087254 A1* | 4/2012 | Yin | H04L 1/0031 370/252 |
| 2012/0257513 A1* | 10/2012 | Yamada | H04L 1/0618 370/248 |
| 2013/0182619 A1* | 7/2013 | Tiirola et al. | 370/280 |

* cited by examiner

FIG. 5
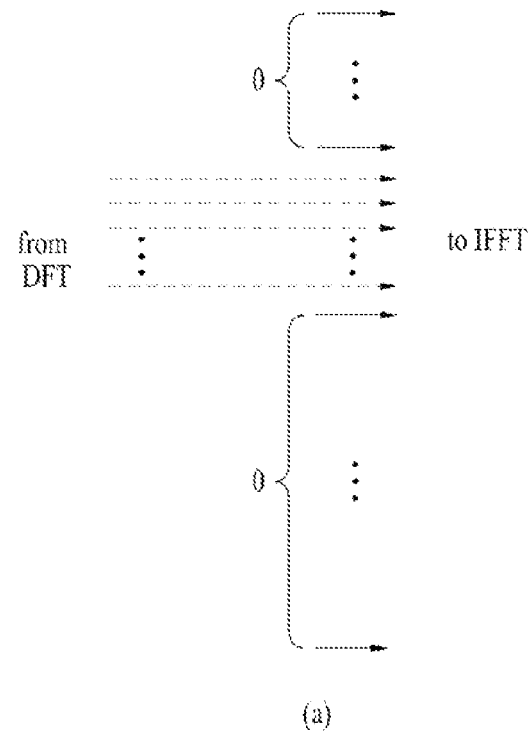
(a)
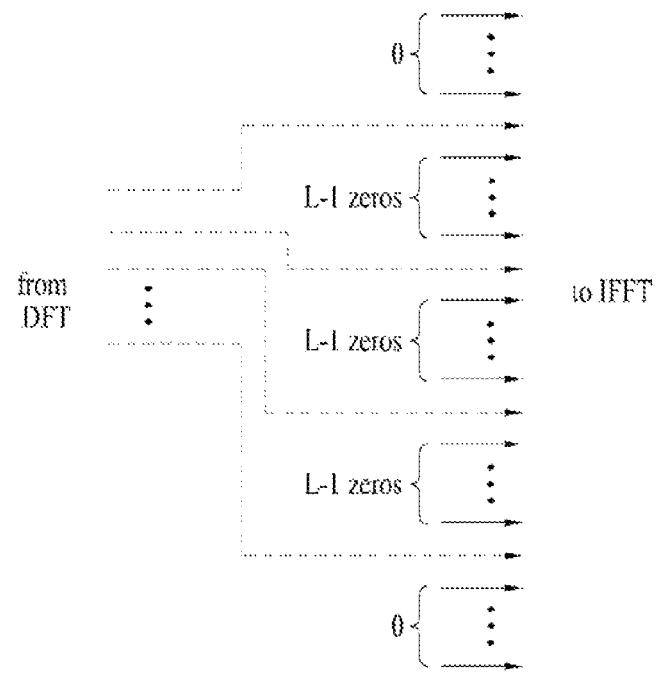
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | $n' = 0$ | | | $n' = 0$ | | |
| 2 | 1 | | 6 | 12 | | 6 | 12 |
| 3 | 2 | 1 | 7 | 13 | 1 | 7 | 13 |
| 4 | 3 | 2 | 8 | 14 | 2 | 8 | 14 |
| 5 | 4 | 3 | 9 | 15 | 3 | 9 | 15 |
| 6 | 5 | 4 | 10 | 16 | 4 | 10 | 16 |
| 7 | 6 | 5 | 11 | 17 | 5 | 11 | 17 |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset Cell-specific Cyclic shift value of CAZAC sequence $n_{OC}$ Orthogonal sequence index for ACK/NACK
$\bar{n}_{OC}$ Orthogonal sequence index for RS
$n_{CS}$ Cyclic shift value of a CAZAC sequence
$n'$ ACK/NACK resource index used for the channelization in a RB FIG. 33
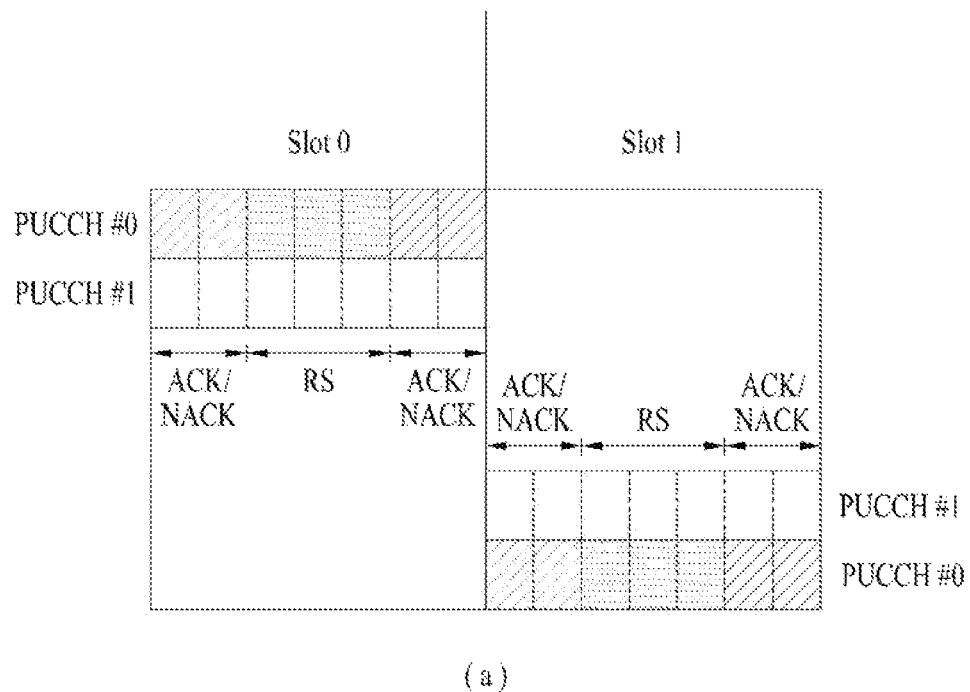
(a)
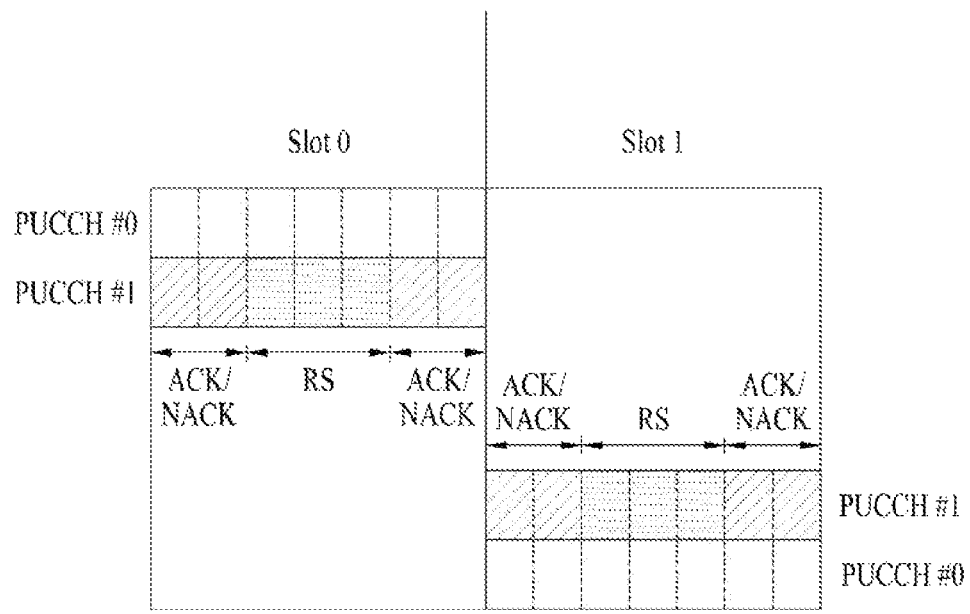
(b)

FIG. 34
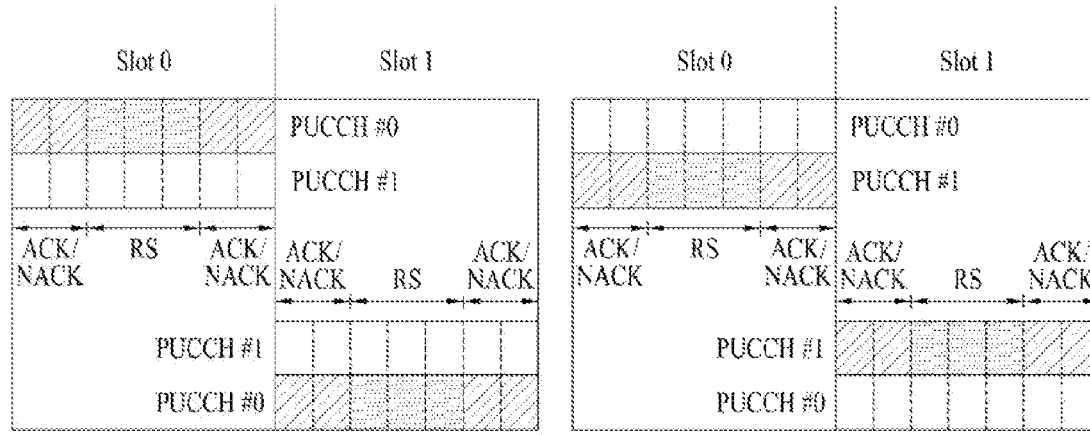
(a)          (a)
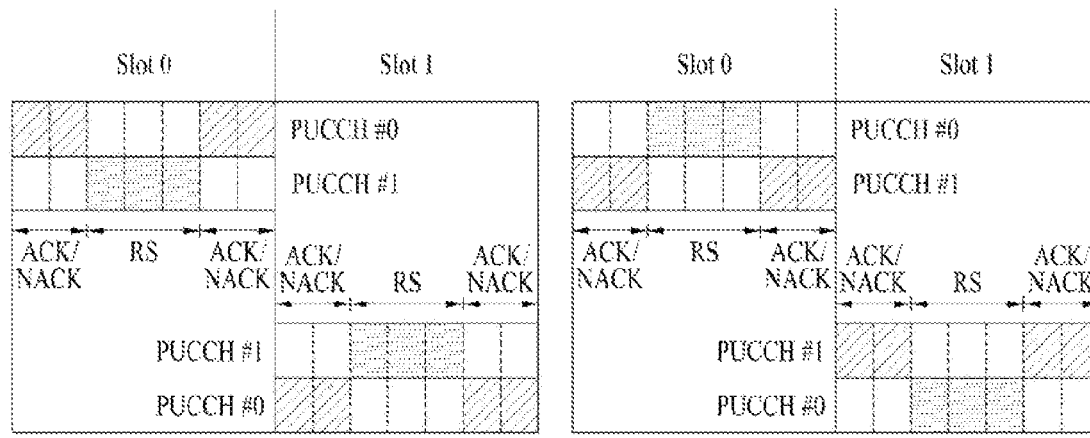
(c)          (d)

METHOD AND APPARATUS FOR TRANSMITTING CONTROL INFORMATION IN A WIRELESS COMMUNICATION SYSTEM

This Application is a 35 U.S.C. §371 National Stage Entry of International Application No. PCT/KR2012/004067, filed May 23, 2012 and claims the benefit of U.S. Provisional Application No. 61/488,802, filed May 23, 2011, all of which are incorporated by reference in their entirety herein.

TECHNICAL FIELD

The present invention relates to a wireless communication system, and more particularly, to a method of transmitting control information and apparatus therefor. The wireless communication system can support carrier aggregation (CA).

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple a □ ccess) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of efficiently transmitting control information in a wireless communication system and apparatus therefor. Another object of the present invention is to provide a channel format, a signal processing, and an apparatus therefor to efficiently transmit control information. The other object of the present invention is to provide a method of efficiently allocating a resource to transmit control information and apparatus therefor.

Technical tasks obtainable from the present invention are not limited to the above-mentioned technical task. And, other unmentioned technical tasks can be clearly understood from the following description by those having ordinary skill in the technical field to which the present invention pertains.

Technical Solution

To achieve these and other technical objects, in an aspect of the present invention, disclosed herein is a method for transmitting control information to a base station by a user equipment in a wireless communication system, the method comprising receiving at least one of PDCCH (physical downlink control channel) and PDSCH (physical downlink shared channel) from the base station via at least one serving cell configured for the user equipment; and transmitting the control information in response to receiving of the PDCCH or the PDSCH indicated by the PDCCH to the base station, wherein the at least one serving cell uses a FDD (frequency division duplex) frame structure or a TDD (time division duplex) frame structure, and wherein the control information is transmitted at a control information feedback timing of a first serving cell determined according to a predetermined criteria among the at least one serving cell.

To achieve these and other technical objects, in another aspect of the present invention, disclosed herein is a user equipment for transmitting control information to a base station in a wireless communication system, the user equipment comprising a reception module configured to receive at least one of PDCCH (physical downlink control channel) and PDSCH (physical downlink shared channel) from the base station via at least one serving cell configured for the user equipment; and a transmission module configured to transmit the control information in response to receiving of the PDCCH or the PDSCH indicated by the PDCCH to the base station, and a processor configured to control the at least one serving cell to use a FDD (frequency division duplex) frame structure or a TDD (time division duplex) frame structure, and control the control information to be transmitted at a control information feedback timing of a first serving cell determined according to a predetermined criteria among the at least one serving cell.

It is to be understood that both the foregoing general description and the following detailed description are exemplary and explanatory and are intended to provide further explanation of the invention as claimed.

Advantageous Effects

According to the present invention, control information can be efficiently transmitted in a wireless communication system. In particular, the present invention can provide a channel format, a method of signal processing to efficiently transmit control information. In more particular, according to the present invention, a resource to transmit control information can be efficiently allocated.

Effects obtainable from the present invention may be non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for examples of mapping an input symbol to a subcarrier in frequency domain while satisfying a single carrier property;

FIG. 17 is a diagram of ACK/NACK channelization for PUCCH format 1a and 1b;

FIG. 33 is a diagram for a transmission structure of ACK/NACK information using a channel selection to which the present invention is applied;

FIG. 34 is a diagram for a transmission structure of ACK/NACK information using an enhanced channel selection to which the present invention is applied;

BEST MODE

Mode for Invention

Figure 1:
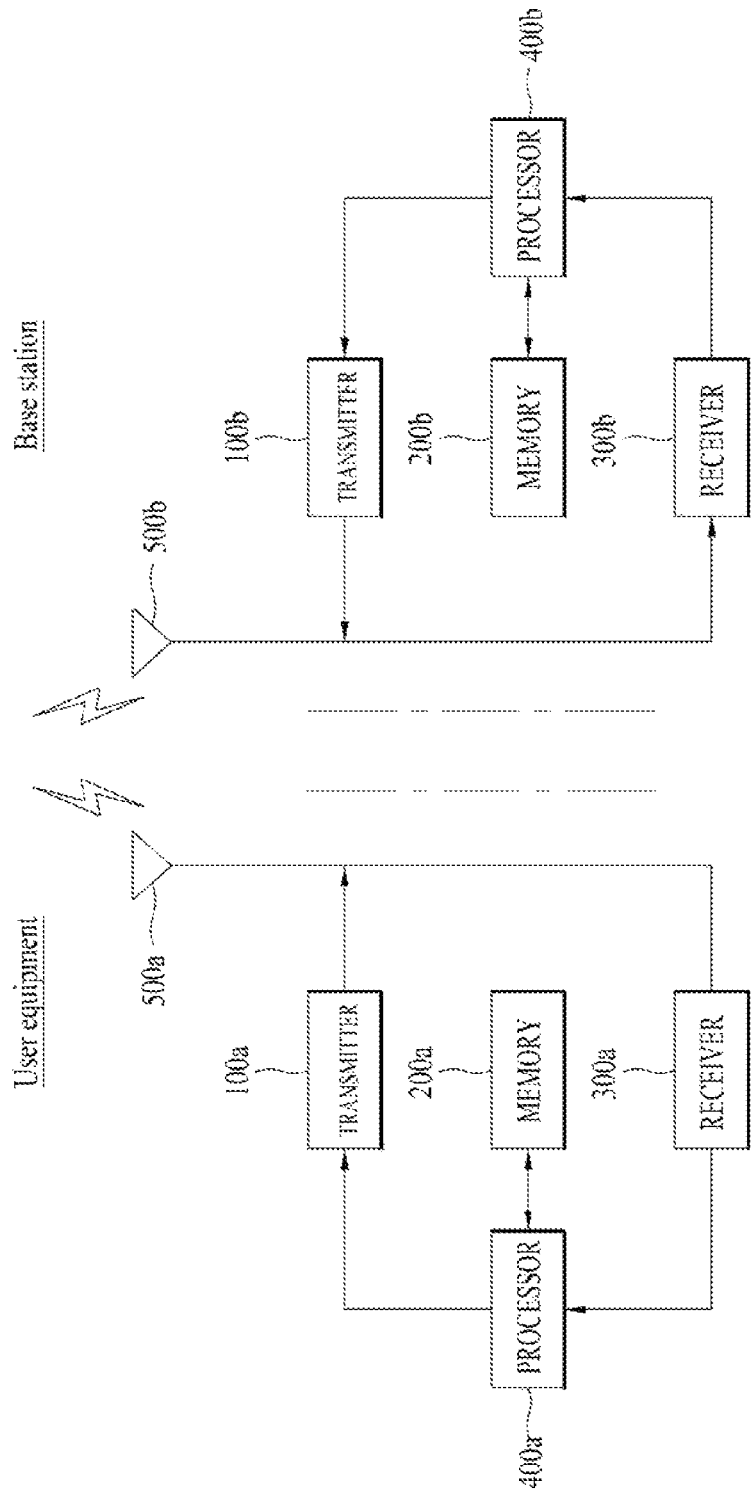
FIG. 1 is a block diagram for configuration of a user equipment and a base station, to which the present invention is applied.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

And, techniques, apparatuses (devices) and systems described in the following description may be applicable to various kinds of wireless multiple access systems. For example, the multiple access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRAN is a part of UMTS (Universal Mobile Telecommunications System). 3GPP (3rd Generation Partnership Project) LTE (long term evolution) is a part of E-UMTS (Evolved UMTS) that uses E-UTRAN. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case that the present invention is applied to 3GPP LTE/LTE-A, by which the present invention is non-limited. For instance, although the detailed description of the present invention may be explained based on a wireless communication system corresponding to 3GPP LTE/LTE-A system, it may be applicable to other random wireless communication systems except items unique to 3GPP LTE/LTE-A.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description, a terminal may be stationary or may have mobility. And, the terminal may be a common name of a device for transceiving various kinds of data and control informations by communicating with a base station. The terminal may be named one of a user equipment (UE), a mobile station (MS), a mobile terminal (MT), a user terminal (UT), a subscriber station (SS), a wireless device, a personal digital assistant (PDA), a wireless modem, a handheld device and the like.

A base station generally means a fixed station communicating with a terminal or other base stations and exchanges various kinds of data and control informations by communicating with a terminal and other base stations. The base station may be named such a terminology as eNB (evolved-NodeB), BTS (Base Transceiver System), AP (Access Point) and the like.

In the present invention, if a specific signal is assigned to one of frame, subframe, slot, carrier and subcarrier, it may mean that a specific signal is transmitted in an interval or timing of frame/subframe/slot via corresponding carrier/subcarrier.

In the present invention, a rank or a transmission rank may mean the number of layers multiplexed with or allocated to one OFDM symbol or one resource element (RE).

In the present invention, PDCCH (physical downlink control channel)/PCFICH (physical control format indicator channel)/PFICH (physical hybrid automatic retransmit request indicator channel)/PDSCH (physical downlink shared channel) mean a set of resource elements carrying ACK/NACK (acknowledgement/Negative ACK)/downlink data for DCI (downlink control information)/CFI (control format indicator)/uplink transmission, respectively.

And, PUCCH (physical uplink control channel)/PUSCH (physical uplink shared channel)/PRACH (physical random access channel) mean a set of resource elements carrying UCI (uplink control information)/uplink data/random access signal, respectively.

In particular, a resource element (RE) allocated to or belongs to PDCCH/PCFICH/PHICH/PDSCH/PUCCH/PUSCH/PRACH is called a PDCCH/PCFICH/PHICH/PDSCH/PUCCH/PUSCH/PRACH RE or a PDCCH/PCFICH/PHICH/PDSCH/PUCCH/PUSCH/PRACH resource, respectively.

Hence, an expression that a user equipment transmits PUCCH/PUSCH/PRACH may be used as a same meaning that the user equipment transmits uplink control information/uplink data/random access signal via the PUCCH/PUSCH/PRACH. And, an expression that a base station transmits PDCCH/PCFICH/PHICH/PDSCH may be used as a same meaning that the base station transmits downlink control information/downlink data and the like on the PDCCH/PCFICH/PHICH/PDSCH.

Meanwhile, if ACK/NACK information is mapped to a specific constellation point, it may mean that the ACK/NACK information is mapped to a specific complex modulation symbol. And, if the ACK/NACK information is mapped to a specific complex modulation symbol, it may mean that the ACK/NACK information is modulated by the specific complex modulation symbol.

FIG. 1 is a block diagram for configuration of a user equipment and a base station, to which the present invention is applied. In particular, a user equipment works as a transmitting device in UL or works as a receiving device in DL. On the contrary, a base station works as a receiving device in UL or works as a transmitting device in DL.

Referring to FIG. 1, a user equipment/base station UE/BS may include an antenna 500a/500b capable of transmitting and receiving information, data, signals and/or messages and the like, a transmitter 100a/100b transmitting information, data, signals and/or messages by controlling the antenna 500a/500b, a receiver 300a/300b receiving information, data, signals and/or messages by controlling the antenna 500a/500b and a memory 200a/200b storing various kinds of informations within a wireless communication system temporarily or permanently. Moreover, the user equipment/base station may further include a processor 400a/400b controlling various components by being operatively connected to the components including the transmitter, the receiver, the memory and the like.

The transmitter 100a, the receiver 300a, the memory 200a and the processor 400a in the user equipment may be implemented with separate chips as independent components, respectively. Alternatively, at least two of the transmitter 100a, the receiver 300a, the memory 200a and the processor 400a in the user equipment may be implemented with a single chip. On the other hand, the transmitter 100b, the receiver 300b, the memory 200b and the processor 400b in the base station may be implemented with separate chips as independent components, respectively. Alternatively, at least two of the transmitter 100b, the receiver 300b, the memory 200b and the processor 400b in the base station may be implemented with a single chip. Alternatively, the transmitter and the receiver may be integrated into a single transceiver in the user equipment or the base station.

The antenna 500a/500b may play a role in externally transmitting a signal generated from the transmitter 100a/100b. And, the antenna 500a/500b may play a role in receiving a signal from outside and then delivering the received signal to the receiver 300a/300b. Moreover, the antenna 500a/500b may be called an antenna port. In this case, the antenna port may correspond to a single physical antenna or may be configured by a combination of a plurality of physical antennas. In case that MIMO (multi-input multi-output) function of transceiving data and the like using a plurality of antennas is supported by a transceiver, at least two antennas may be connected to the transceiver.

The processor 400a/400b may generally control overall operations of various components or modules in the mobile/base station. In particular, the processor 400a/400b may be able to perform various control functions to implement the above-described embodiments of the present invention, a MAC (medium access control) frame variable control function according to service characteristics and propagation environment, a power saving mode function of controlling an idle mode operation, a handover function, an authentication and encryption function and the like. And, the processor 400a/400b may be named one of a controller, a microcontroller, a microprocessor, a microcomputer and the like. Moreover, the processor 400a/400b may be implemented by hardware, firmware, software or a combination thereof.

In case of implementing the present invention using hardware, the processor 400a/400b may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing the present invention using firmware or software, the firmware or software may be configured to include modules, procedures, and/or functions for performing the functions or operations of the present invention. And, the firmware or software configured to perform the present invention may be driven by the processor 400a/400b in a manner of being loaded in the processor 400a/400b or being saved in the memory 200a/200b.

The transmitter 100a/100b may perform prescribed coding and modulation on a signal and/or data, which is scheduled by the processor 400a/400b or a scheduler connected to the processor 400a/400b and will be then transmitted externally, and may be then able to deliver the coded and modulated signal and/or data to the antenna 500a/500b. The transmitter 100a/100b and the receiver 300a/300b of the user equipment and the base station may be differently configured depending on a process for processing a transmission signal and a reception signal.

The memory 200a/200b may store programs for processing and control of the processor 400a/400b and may be able to temporarily store input/output information. And, the memory 200a/200b may be utilized as a buffer. Moreover, the memory 200a/200b may include at least one of storage media including a flash type memory, a hard disk type memory, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Figure 2:
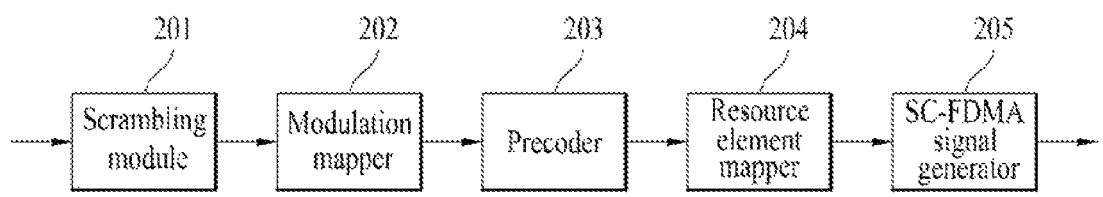
FIG. 2 is a diagram for a signal processing process for a user equipment to transmit an uplink signal.

FIG. 2 is a diagram for a signal processing process for a user equipment to transmit an uplink signal. Referring to FIG. 2, a transmitter 100a in a user equipment can include a scramble module 201, a modulation mapper 202, a precoder 203, a resource element mapper 204 and a SC-FDMA signal generator 205.

First of all, in order to transmit a UL signal, a scramble module 201 may be able to scramble a transmission signal using a scramble signal. The scrambled signal is inputted to a modulation mapper 202 and is then modulated into a complex symbol using a BPSK (binary phase shift keying), QPSK (quadrature phase shift keying) or 16 QAM (quadrature amplitude modulation) scheme in accordance with a type or channel state of the transmission signal. Subsequently, the modulated complex symbol is processed by a precoder 203 and is then inputted to a resource element mapper 204. In this case, the resource element mapper 204 may be able to map the complex symbol to a time-frequency resource element. This processed signal is inputted to an SC-FDMA signal generator 205 and may be then transmitted to a base station via an antenna port.

Figure 3:
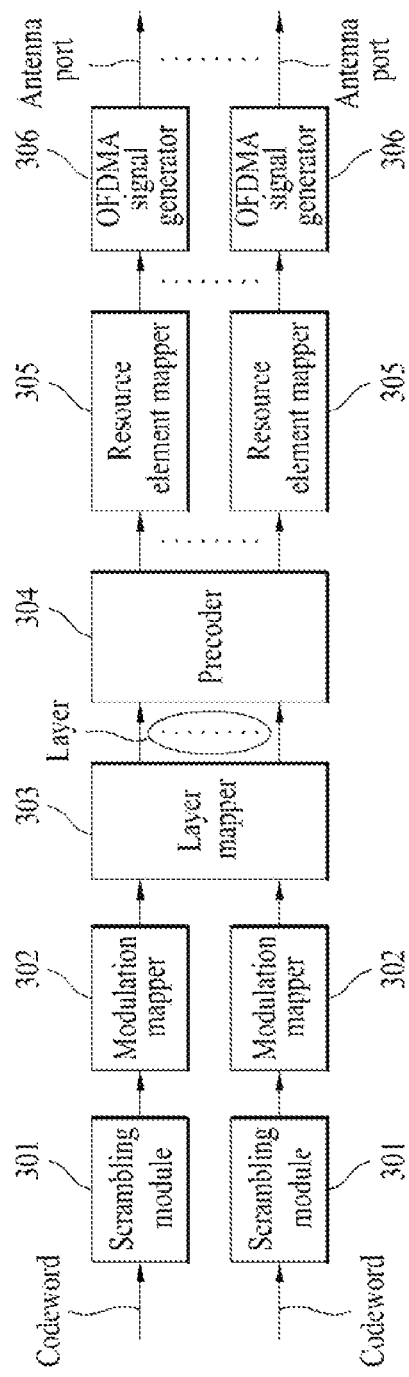
FIG. 3 is a diagram for a signal processing process for a base station to transmit a downlink signal.

FIG. 3 is a diagram for a signal processing process for a base station to transmit a downlink signal. Referring to FIG. 3, a transmitter 100b in a base station can include a scramble module 301, a modulation mapper 302, a layer mapper 303, a precoder 304, a resource element mapper 305, and an OFDM signal generator 306.

Similar to FIG. 2, a signal or a codeword can be modulated to a complex modulation symbol via the scramble module 301 and the modulation mapper 302 to transmit a DL signal or at least one codeword. Subsequently, the complex symbol is mapped to a plurality of layers by a layer mapper 303. Each of a plurality of the layers may be then assigned to each transmission antenna in a manner of being multiplied by a precoding matrix by the precoder 304. A transmission signal per each antenna processed by the above mentioned manner is mapped to a time-frequency resource element by the resource element mapper 305, inputted to the OFDM signal generator 306, and may be then transmitted via an each antenna port.

In a wireless communication system, in case that a user equipment transmits a signal in UL, PAPR (peak-to-average ratio) may cause a problem compared to a case that a base station transmits a signal in DL. Hence, as mentioned earlier with reference to FIG. 2 and FIG. 3, unlike OFDMA scheme used for transmitting a signal in DL, SC-FDMA (single carrier-frequency division multiple access) scheme is used to transmit a signal in UL.

Figure 4:
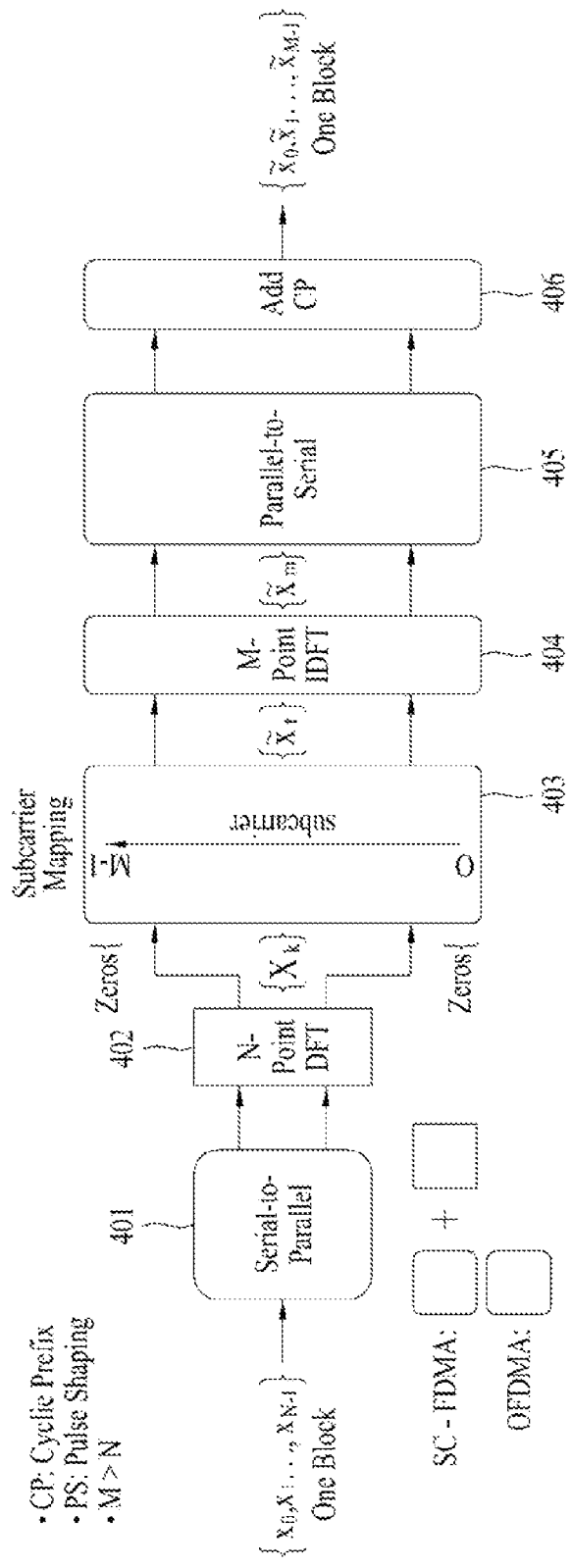
FIG. 4 is a diagram for an SC-FDMA scheme and an OFDMA scheme to which the present invention is applied.

FIG. 4 is a diagram for an SC-FDMA scheme and an OFDMA scheme to which the present invention is applied. 3GPP system adopts OFDMA in DL and adopts SC-FDMA in UL.

Referring to FIG. 4, both a user equipment transmitting a signal in UL and a base station transmitting a signal in DL identically include a serial-to-parallel converter 401, a sub-carrier mapper 403, M-point IDFT module 404, and a CP (cyclic prefix) adding module 406. Yet, the user equipment transmitting a signal using SC-FDMA scheme additionally includes N-point DFT module 402. The N-point DFT module 402 makes a transmission signal have a single carrier property in a manner of offsetting a prescribed part of IDFT processing impact of the M-point IDFT module 404.

The SC-FDMA scheme should satisfy a single carrier characteristic. FIG. 5 is a diagram for examples of mapping an input symbol to a subcarrier in frequency domain while satisfying a single carrier property. According to one of FIG. 5(a) and FIG. 5(b), if a DFT symbol is assigned to a subcarrier, it may be able to obtain a transmission signal satisfying a single carrier property. FIG. 5(a) indicates a localized mapping method and FIG. 5(b) indicates a distributed mapping method, respectively.

Figure 6:
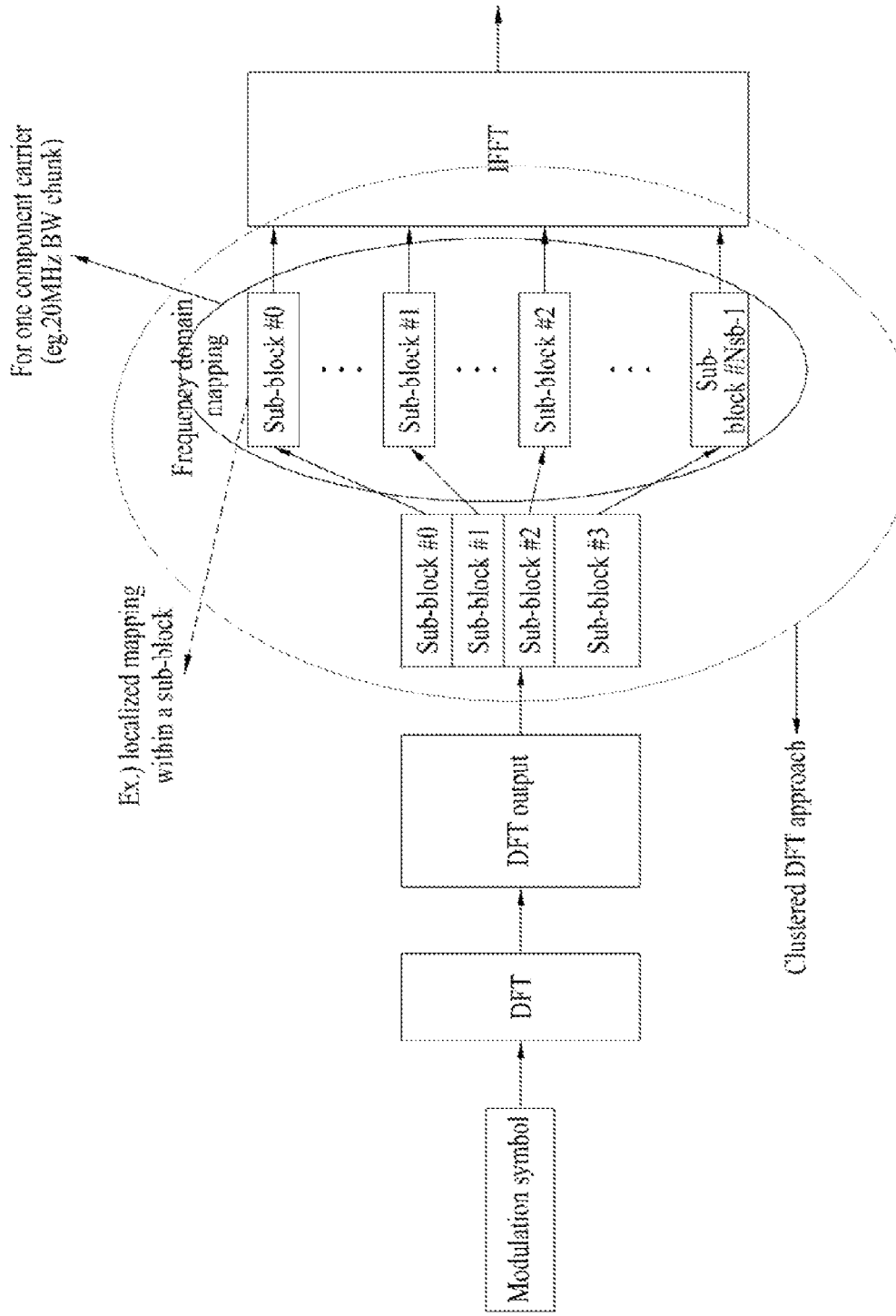
FIG. 6 is a diagram for a signal processing process that samples outputted from a DFT process are mapped to a single carrier in a clustered SC-FDMA.
Figure 7:
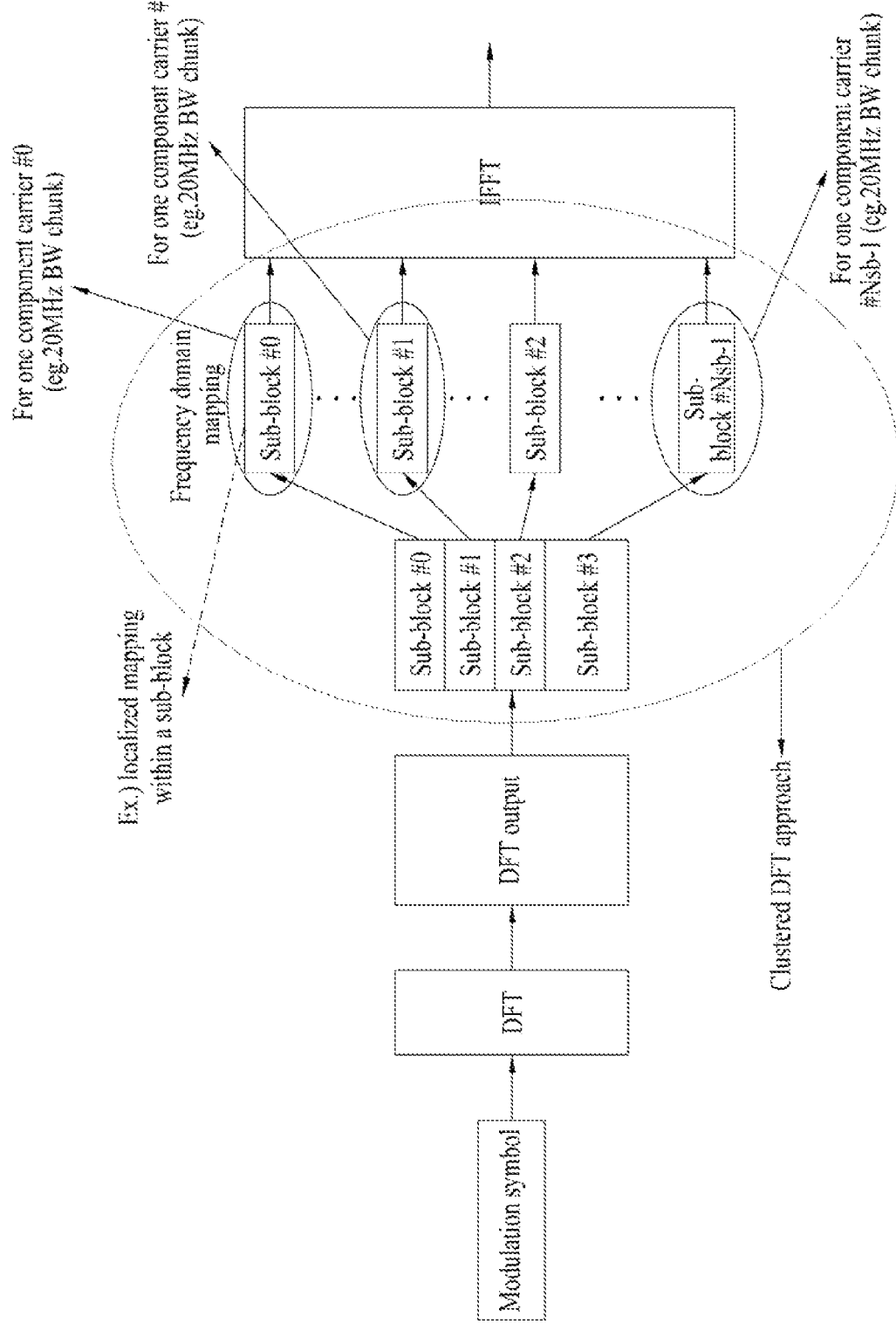
FIG. 7 and FIG. 8 are diagrams for a signal processing process that samples outputted from a DFT process are mapped to multi-carriers in a clustered SC-FDMA.
Figure 8:
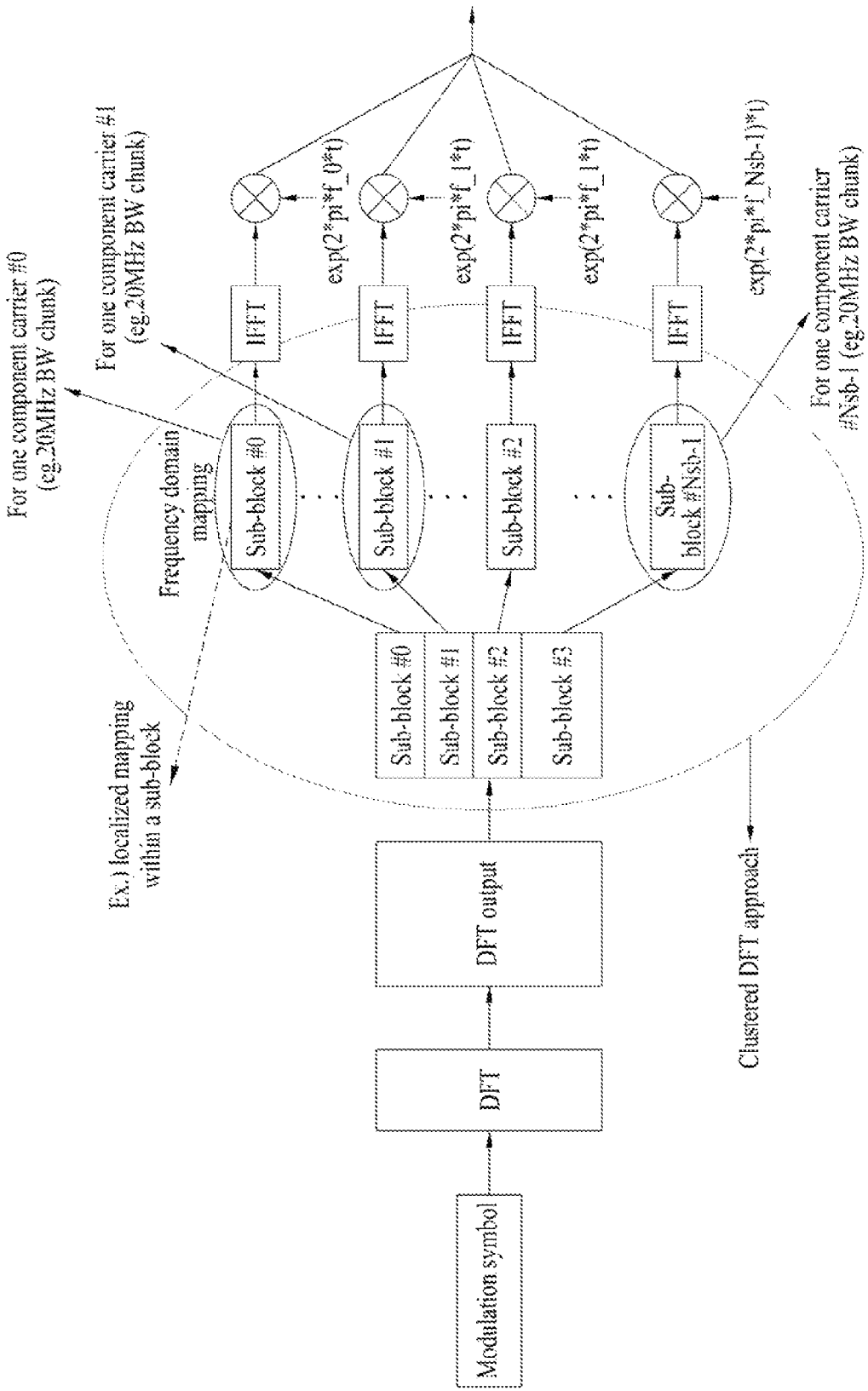

Meanwhile, a clustered DFT-s-OFDM scheme can be selected by a transmitter 100a/100b. The clustered DFT-s-OFDM scheme is a variation of a legacy SC-FDMA scheme. The clustered DFT-s-OFDM scheme divides a signal underwent a precoder into several pieces of sub-blocks and then non-contiguously maps the sub-blocks to a subcarrier. FIG. 6 to FIG. 8 indicates examples that an input symbol is mapped to a single carrier by the clustered DFT-s-OFDM scheme.

FIG. 6 is a diagram for a signal processing process that samples outputted from a DFT process are mapped to a single carrier in a clustered SC-FDMA. FIG. 7 and FIG. 8 are diagrams for a signal processing process that samples outputted from a DFT process are mapped to multi-carriers in a clustered SC-FDMA. FIG. 6 indicates an example to which an intra-carrier clustered SC-FDMA is applied. FIG. 7 and FIG. 8 indicate examples to which an inter-carrier clustered SC-FDMA is applied. FIG. 7 depicts a case that a signal is generated via a single IFFT block in case that subcarrier spacing is aligned between neighboring component carriers when component carriers are contiguously assigned in frequency domain. FIG. 8 depicts a case that a signal is generated via a plurality of IFFT blocks when component carriers are non-contiguously assigned in frequency domain.

Figure 9:
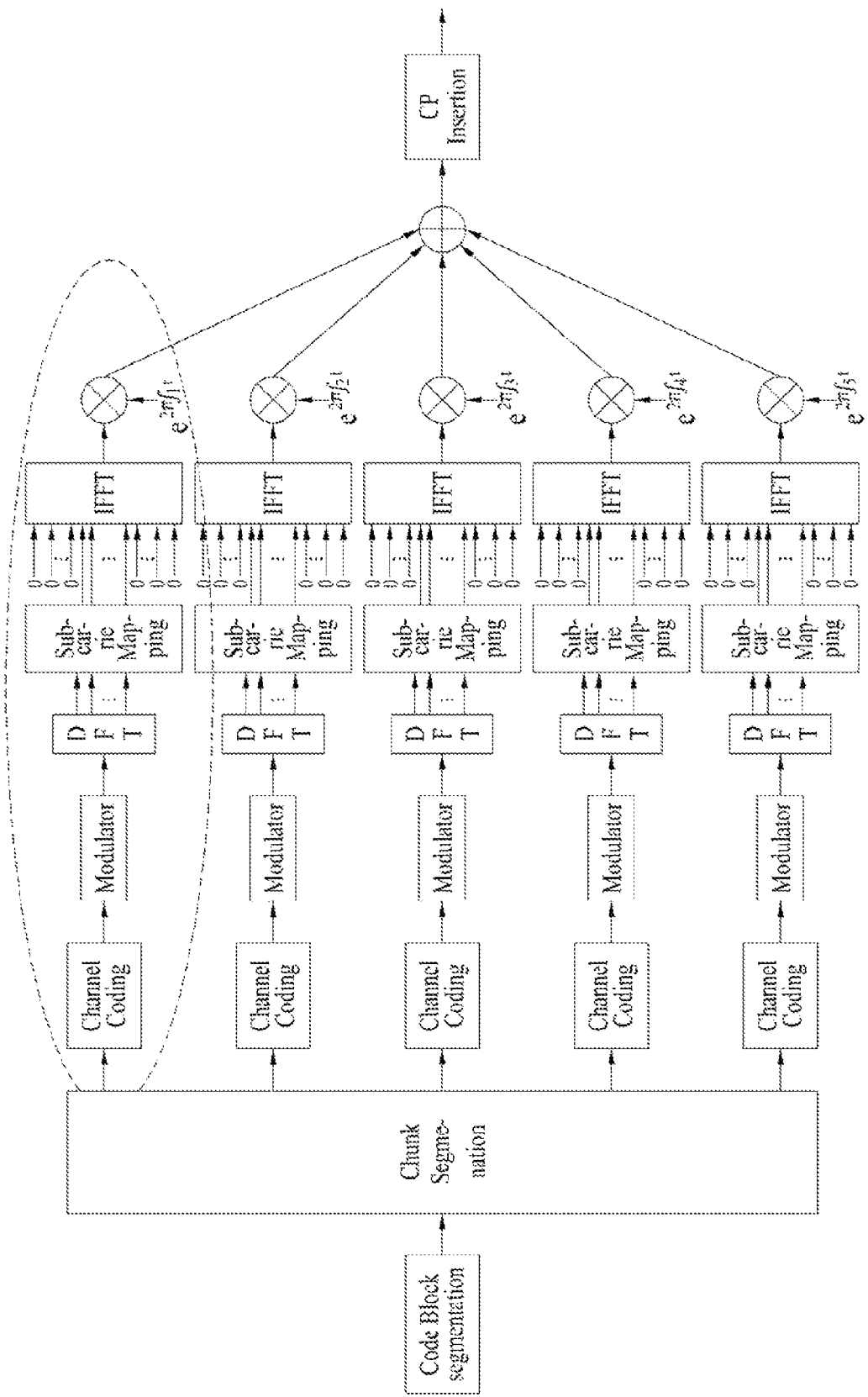
FIG. 9 is a diagram for a signal processing process of a segmented SC-FDMA.

FIG. 9 is a diagram for a signal processing process of a segmented SC-FDMA. As a relation configuration between a DFT and an IFFT becomes 1-to-1 in a manner of applying the number of IFFT identical to the random number of DFT, a segmented SC-FDMA simply extends DFT spread of a legacy SC-FDMA and a frequency subcarrier mapping configuration of the IFFT. Hence, the segmented SC-FDMA may be represented as N×SC-FDMA or N×DFT-s-OFDMA. In the present specification, the N×SC-FDMA or N×DFT-s-OFDMA is commonly named as the segmented SC-FDMA. Referring to FIG. 9, in order to mitigate a condition of a single carrier property, the segmented SC-FDMA performs a DFT process in a group unit in a manner of binding a total time domain modulation symbols into the N (N is an integer greater than 1) number of groups.

Figure 10:
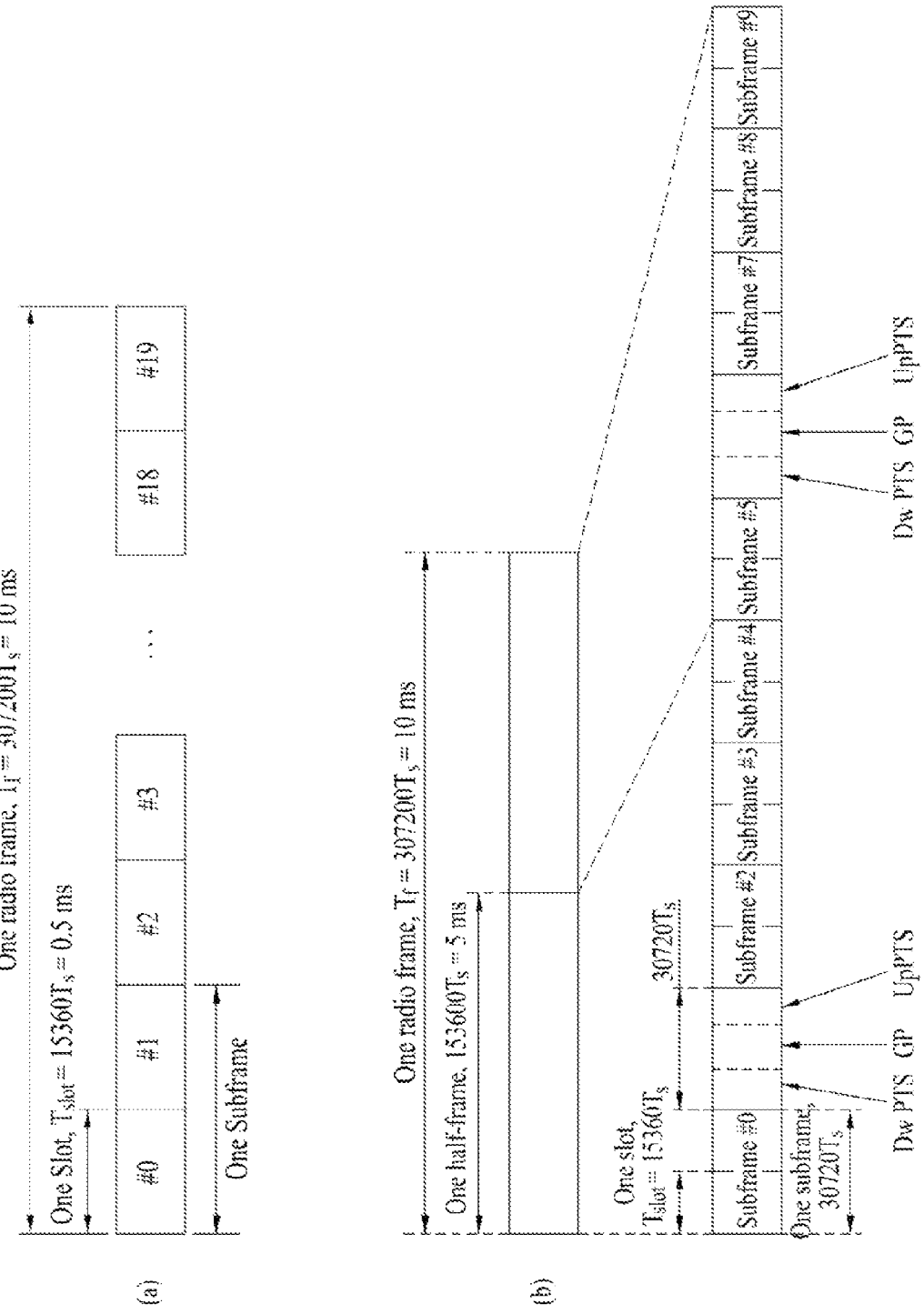
FIG. 10 is a diagram for examples of a radio frame structure used in a wireless communication system.

FIG. 10 is a diagram for examples of a radio frame structure used in a wireless communication system. In particular, FIG. 10 (a) exemplifies a radio frame according to a frame structure type 1 (FS-1) of 3GPP LTE/LTE-A. FIG. 10 (b) exemplifies a radio frame according to a frame structure type 2 (FS-2) of 3GPP LTE/LTE-A. A frame structure of FIG. 10 (a) may be applicable to both a FDD (frequency division duplex) mode and a half FDD (H-FDD) mode. A frame structure of FIG. 10 (b) may be applicable to a TDD (time division duplex) mode.

Referring to FIG. 10, a radio frame used in 3GPP LTE/LTE-A has a length of 10 ms (307200 $T_S$) and configured with 10 subframes of an equal length. A respective number can be given to 10 subframes in a radio frame. In this case, $T_S$ indicates a sampling time and may be represented as 'Ts=1/(15 kHz×2048). Each subframe has a length of 1 ms and is configured with 2 slots. 20 slots in a radio frame may be sequentially numbered from 0 to 19. Each slot has a length of 0.5 ms. A time taken to transmit one subframe is called a transmission time interval (hereinafter abbreviated TTI). A time resource can be identified by a radio frame number (or radio frame index), a subframe number (or subframe index), a slot number (or slot index), or the like.

A radio frame can be differently configured depending on a duplex mode. For instance, since a DL transmission and an UL transmission are classified by a frequency in a FDD mode, a radio frame includes either a DL subframe or an UL subframe.

On the contrary, since a DL transmission and an UL transmission are classified by time in a TDD mode, a subframe in a frame is divided into a DL subframe and an UL subframe.

Figure 11:
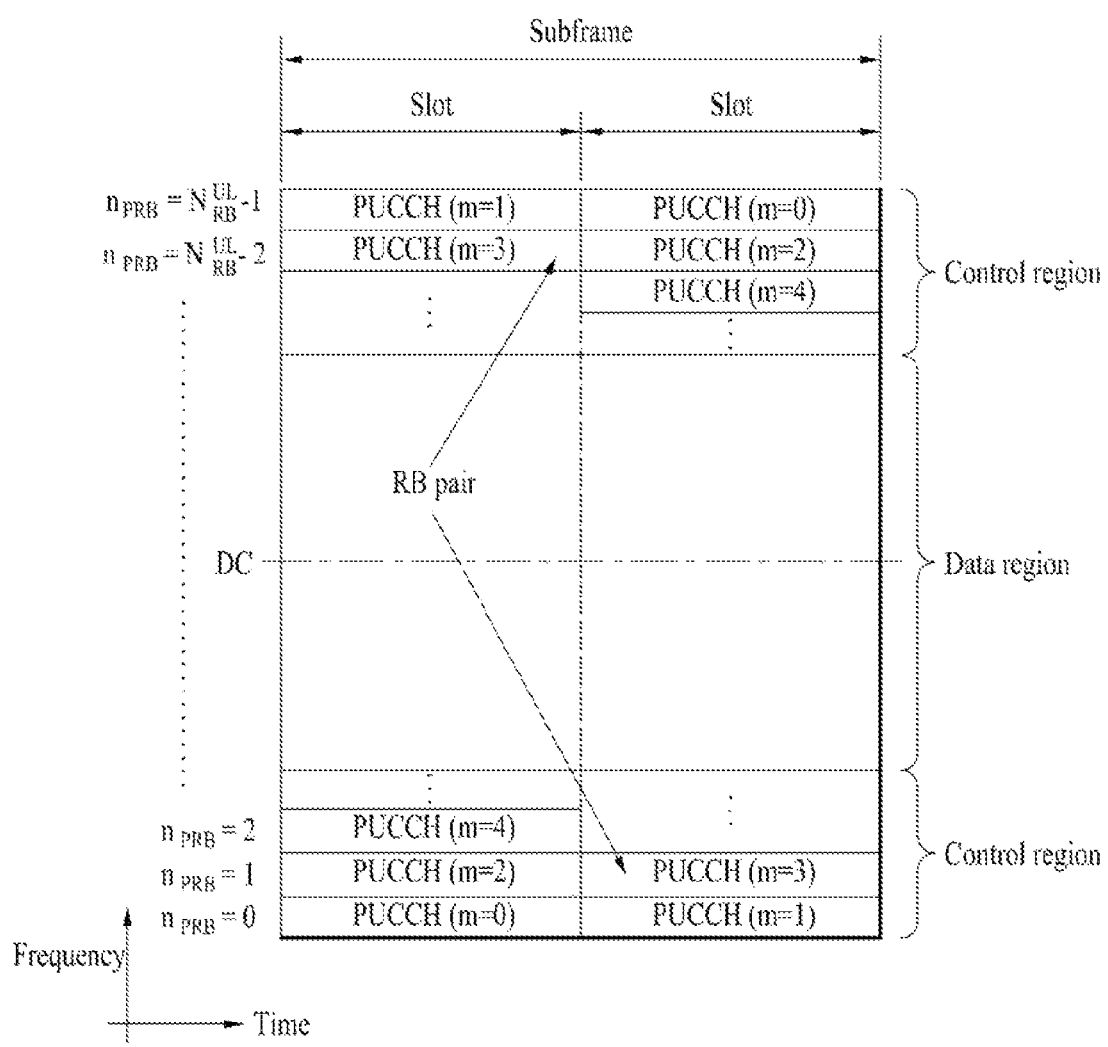
FIG. 11 is a diagram for an uplink subframe structure.

FIG. 11 is a diagram for an uplink subframe structure to which the present invention is applied. Referring to FIG. 11, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data. Yet, according to LTE release 8 or release 9, if a user equipment adopts SC-FDMA scheme, PUCCH and PUSCH cannot be simultaneously transmitted to maintain a single carrier property.

Uplink control information (UCI) transmitted via PUCCH has a different size and usage depending on a PUCCH format. And, a size of UL control information may vary according to a code rate. For instance, PUCCH format can be defined as follows.

(1) PUCCH format 1: used for on-off keying (OOK), scheduling request (SR)

(2) PUCCH format 1a and 1b: used for transmitting ACK/NACK (acknowledgement/Negative acknowledgement) information 1) PUCCH format 1a: 1-bit ACK/NACK information modulated by BPSK 2) PUCCH format 1b: 2-bits ACK/NACK information modulated by QPSK (3) PUCCH format 2: modulated by QPSK and used for transmitting CQI (4) PUCCH format 2a and 2b: used for simultaneously transmitting CQI and ACK/NACK information Table 1 indicates modulation schemes according to a PUCCH format and the number of bits per subframe. Table 2 indicates the number of reference signal (RS) per slot according to a PUCCH format. Table 3 indicates a position of an SC-FDMA symbol of a reference signal (RS) according to a PUCCH format. In the Table 1, PUCCH format 2a and 2b correspond to a case of a normal cyclic prefix (CP).

TABLE 1

| PUCCH format | Modulation scheme | Bit number per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal cyclic prefix | Extended cyclic prefix |
| --- | --- | --- |
| 1, 1a, 1b | 3 | 2 |
| 2 | 2 | 1 |
| 2a, 2b | 2 | N/A |

TABLE 3

| | SC-FDMA symbol position of reference signal | |
| --- | --- | --- |
| PUCCH format | Normal cyclic prefix | Extended cyclic prefix |
| 1, 1a, 1b | 2, 3, 4 | 2, 3 |
| 2, 2a, 2b | 1, 5 | 3 |

In an UL subframe, subcarriers far from a DC (direct current) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency $f_0$ in a frequency up converting process performed by OFDMA/SC-FDMA signal generator.

PUCCH for one user equipment is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier in two slots. Since PUCCH for a user equipment is assigned to the RB pair in a subframe irrespective of whether a frequency hopping is applied, an identical PUCCH is transmitted from each of the slots in the subframe via an RB, i.e., totally, the identical PUCCH is transmitted twice in the subframe.

In the following description, an RB pair in a subframe used for transmitting PUCCH is named as a PUCCH region. And, the PUCCH region and a code used in the PUCCH region are named as a PUCCH resource. In particular, PUCCH resources different from each other have PUCCH regions different from each other, respectively. Or, the PUCCH resources different from each other may have codes different from each other in an identical PUCCH region. For clarity, PUCCH transmitting ACK/NACK information is named as ACK/NACK PUCCH, PUCCH transmitting CQI/PMI/RI information is named as CSI (channel state information) PUCCH, and PUCCH transmitting SR information is named as SR PUCCH.

A base station explicitly or implicitly allocates a PUCCH resource required for a user equipment to transmit UL control information to the user equipment.

Such UL control information (UCI) as ACK/NACK (acknowledgement/negative ACK) information, CQI (channel quality indicator) information, PMI (precoding matrix indicator) information, RI (rank information), and SR (scheduling request) information and the like can be transmitted in a control region of an UL subframe.

In a wireless communication system, a user equipment and a base station transmit and receive a signal, data, and the like to/from each other. When the base station transmits data to the user equipment, the user equipment decodes the received data. If the user equipment succeeds in decoding the data, the user equipment transmits ACK to the base station. If the user equipment fails in decoding the data, the user equipment transmits NACK to the base station. In case of an opposite case, in particular, in case that the user equipment transmits data to the base station, the aforementioned is identically applied as well. In a 3GPP LTE system, the user equipment receives PDSCH and the like from the base station and transmits ACK/NACK for the PDSCH to the base station through an implicit PUCCH, which is determined by PDCCH carrying scheduling information on the PDSCH. In this case, if the user equipment cannot receive data, it may be considered as a DTX (discontinuous transmission) state, may be processed as a case that there is no received data according to a predetermined rule, or may be identically processed as NACK (although data is received, decoding is not successful).

Figure 12:
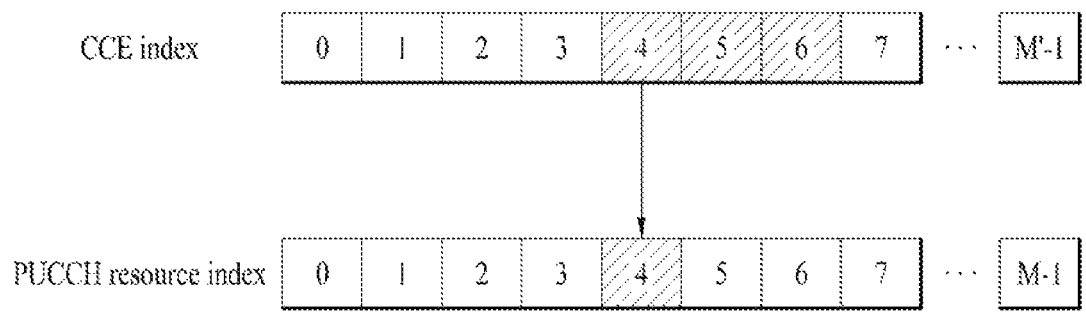
FIG. 12 is a diagram for a structure determining PUCCH for ACK/NACK transmission.

FIG. 12 is a diagram for a structure configured to determine PUCCH for ACK/NACK transmission to which the present invention is applied.

A PUCCH resource used for transmitting ACK/NACK information is not allocated to a user equipment in advance. Instead, a plurality of user equipments in a cell uses a plurality of PUCCH resources in a manner of dividing on every timing point of transmission. Specifically, the PUCCH resource used by the user equipment to transmit ACK/NACK information is implicitly determined based on PDCCH carrying scheduling information on PDSCH via which a corresponding downlink data is transmitted. In a downlink subframe, a whole region to which PDCCH is transmitted is configured with a plurality of CCEs (control channel elements) and PDCCH transmitted to the user equipment is configured with at least one CCE. The CCE includes a plurality of (e.g., 9) REGs (resource element groups). One REG consists of 4 REs (resource elements) adjacent to each other except a reference signal (RS). The user equipment transmits ACK/NACK information via an implicit PUCCH resource induced or calculated by a function of a specific CCE index (e.g., first or lowest CCE index) among indexes of CCEs configuring a received PDCCH.

Referring to FIG. 12, a lowest CCE index of PDCCH corresponds to a PUCCH resource index used for transmitting ACK/NACK. As depicted in FIG. 12, if it is assumed that scheduling information for PDSCH is transmitted to the user equipment via the PDCCH configured with CCE index 4~6, the user equipment transmits ACK/NACK to the base station via such a PUCCH resource corresponding to PUCCH induced or calculated by a CCE index 4, which is the lowest CCE among the CCEs configuring the PDCCH, as the PUCCH resource corresponding to CCE index 4.

FIG. 12 shows an example that there exist maximum M' number of CCEs in a downlink subframe and maximum M number of PUCCH resources in an uplink subframe. Although M' and M may be identical to each other, M' value can be designed to be different from the M value. And, it is also possible to make CCE mapping and PUCCH resource mapping overlap each other. For instance, PUCCH resource index can be determined as follows.

$$n^{(1)}_{PUCCH} = n_{CCE} + N^{(1)}_{PUCCH} \qquad \text{[Formula 1]}$$

$n^{(1)}_{PUCCH}$ indicates a PUCCH resource index to transmit ACK/NACK information and $N^{(1)}_{PUCCH}$ indicates a signal value delivered from an upper layer. $n_{CCE}$ indicates a smallest value among CCE indexes used to transmit PDCCH.

Figure 13:
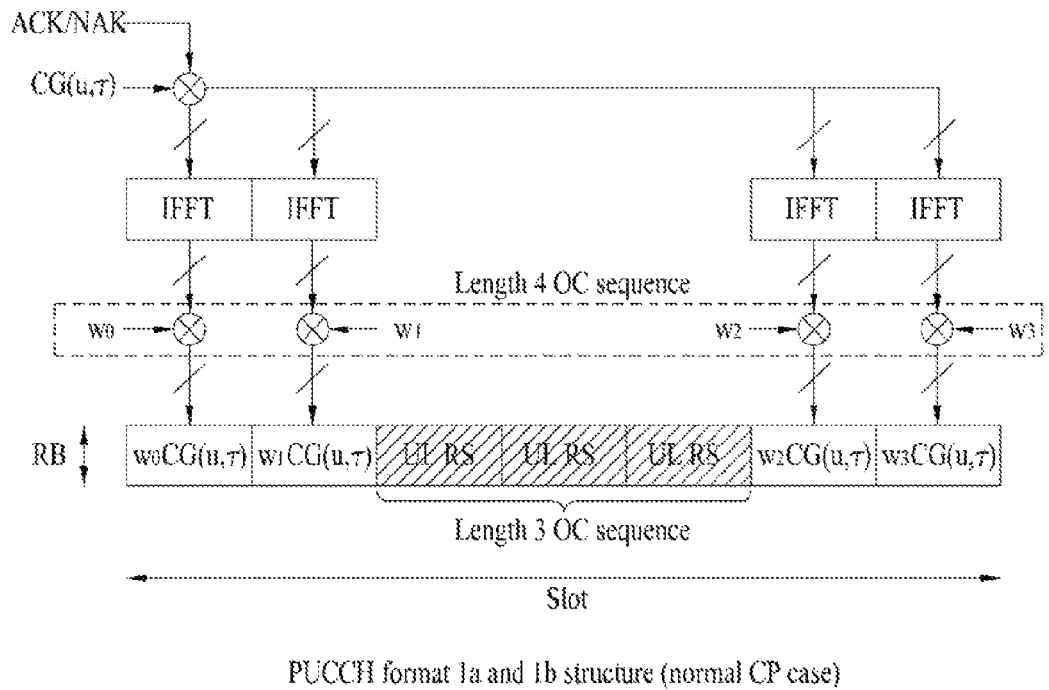
FIG. 13 and FIG. 14 are diagrams for slot level structures of a PUCCH format 1a and 1b for ACK/NACK transmission.
Figure 14:
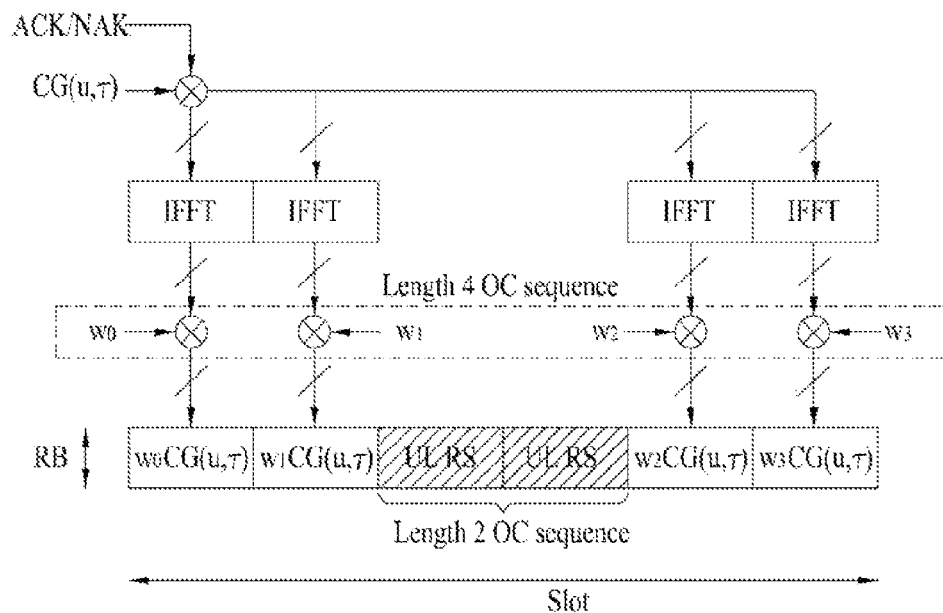

FIG. 13 and FIG. 14 are diagrams for slot level structures of a PUCCH format 1a and 1b used for transmitting ACK/NACK.

FIG. 13 indicates a PUCCH format 1a and 1b in case of a normal cyclic prefix. FIG. 14 indicates a PUCCH format 1a and 1b in case of an extended cyclic prefix. According to the PUCCH format 1a and 1b, uplink control information of an identical content is repeated in a subframe by a slot unit. An ACK/NACK signal is transmitted from a user equipment via different resources, which are configured with cyclic shifts (CS) (frequency domain code) different from each other of CG-CAZAC (computer-generated constant amplitude zero auto correlation) sequence and an orthogonal cover code (orthogonal cover) (OC or OCC) (time domain spreading code). For instance, the OC includes a Walsh/DFT orthogonal code. If the number of CSs correspond to 6 and the number of OCs correspond to 3, total of 18 user equipments can be multiplexed in an identical PRB (physical resource block) on the basis of a single antenna. Orthogonal sequence w0, w1, w2, and w3 can be applied in a random time domain (after FFT modulation) or in a random frequency domain (before FFT modulation). A slot level structure of PUCCH format 1 to transmit SR (scheduling request) information is identical to the PUCCH format 1a and 1b. There exists a difference only in a modulating method.

In order to transmit SR information and ACK/NACK for a semi-persistent scheduling, a PUCCH resource consisted of a CS, an OC, a PRB (physical resource block) and a RS (reference signal) can be allocated to a user equipment via an RRC (radio resource control) signaling. As mentioned earlier in FIG. 12, for a dynamic ACK/NACK (or ACK/NACK for a non-persistent scheduling) feedback and ACK/NACK feedback for PDCCH indicating SPS cancellation, the PUCCH resource can be implicitly allocated to a user equipment using a lowest CCE index of PDCCH corresponding to PDSCH or PDCCH indicating SPS cancellation.

Figure 15:
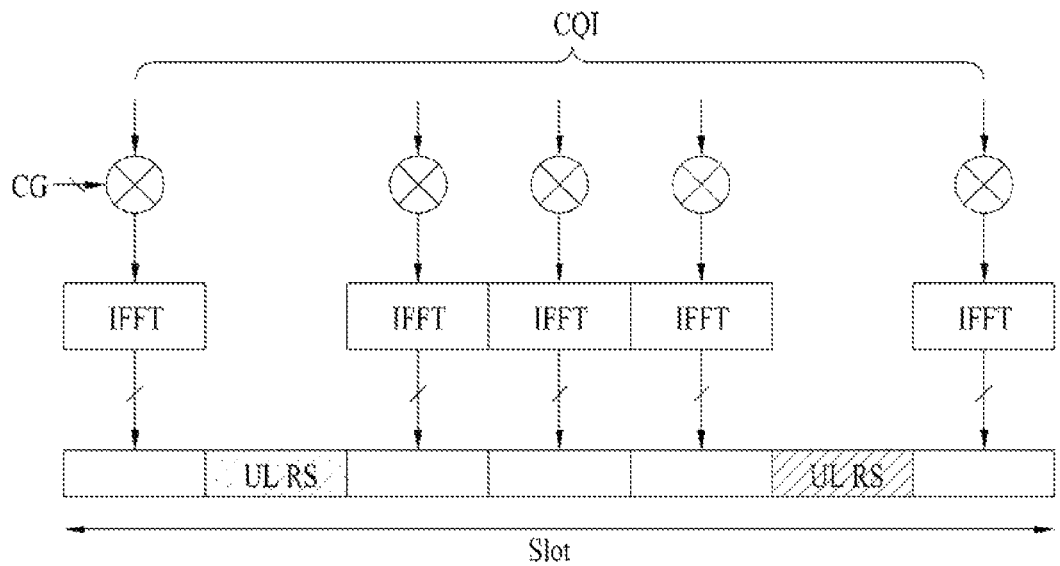
FIG. 15 is a diagram for PUCCH format 2, 2a, and 2b in case of a normal cyclic prefix.
Figure 16:
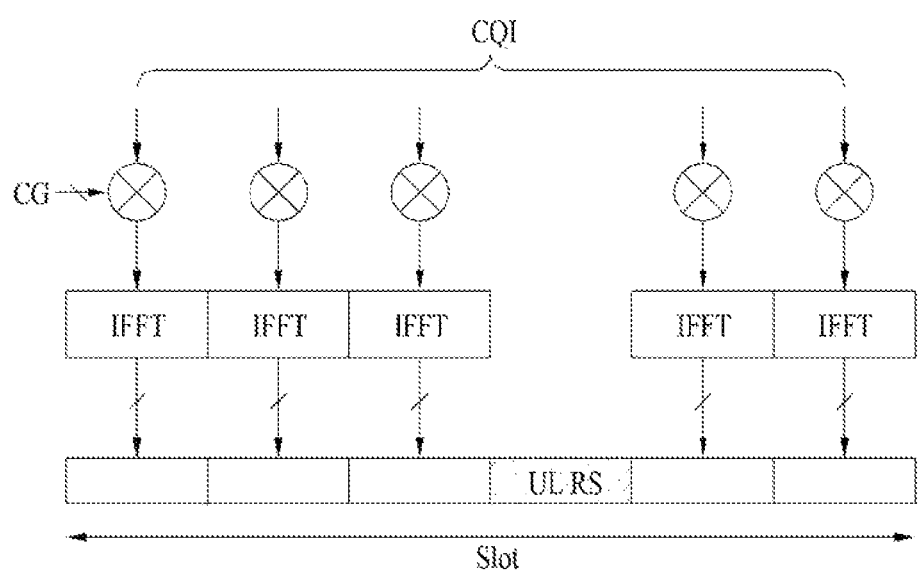
FIG. 16 is a diagram for PUCCH format 2, 2a, and 2b in case of an extended cyclic prefix.

FIG. 15 is a diagram for PUCCH format 2, 2a, and 2b in case of a normal cyclic prefix. FIG. 16 is a diagram for PUCCH format 2, 2a, and 2b in case of an extended cyclic prefix. Referring to FIG. 15 and FIG. 16, in case of a normal CP, one subframe includes 10 QPSK data symbols besides an RS symbol. Each of the QPSK symbols is spread by CS in frequency domain and then mapped to a corresponding SC-FDMA symbol. SC-FDMA symbol level CS hopping can be applied to randomize inter-cell interference. RS can be multiplexed by CDM using a cyclic shift. For instance, if the available number of CS corresponds to 12 or 6, 12 or 6 user equipments can be multiplexed in an identical PRB. In summary, a plurality of user equipments can be multiplexed by CS+OC+PRB and CS+PRB in the PUCCH format 1/1a/1b and PUCCH format 2/2a/2b, respectively.

Table 4 and Table 5 show orthogonal sequence (OC) of length 4 and orthogonal sequence of length 3 used for the PUCCH format 1/1a/1b.

TABLE 4

| Sequence index | Orthogonal sequence |
|---|---|
| 0 | [+1 +1 +1 +1] |
| 1 | [+1 −1 +1 −1] |
| 2 | [+1 −1 −1 +1] |

TABLE 5

| Sequence index | Orthogonal sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 shows orthogonal sequence (OC) for a reference signal used for the PUCCH format 1/1a/1b.

TABLE 6

| Sequence index | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 is a diagram of ACK/NACK channelization for PUCCH format 1a and 1b. FIG. 17 shows a case that $\Delta_{shift}^{PUCCH}=2$.

Figure 18:
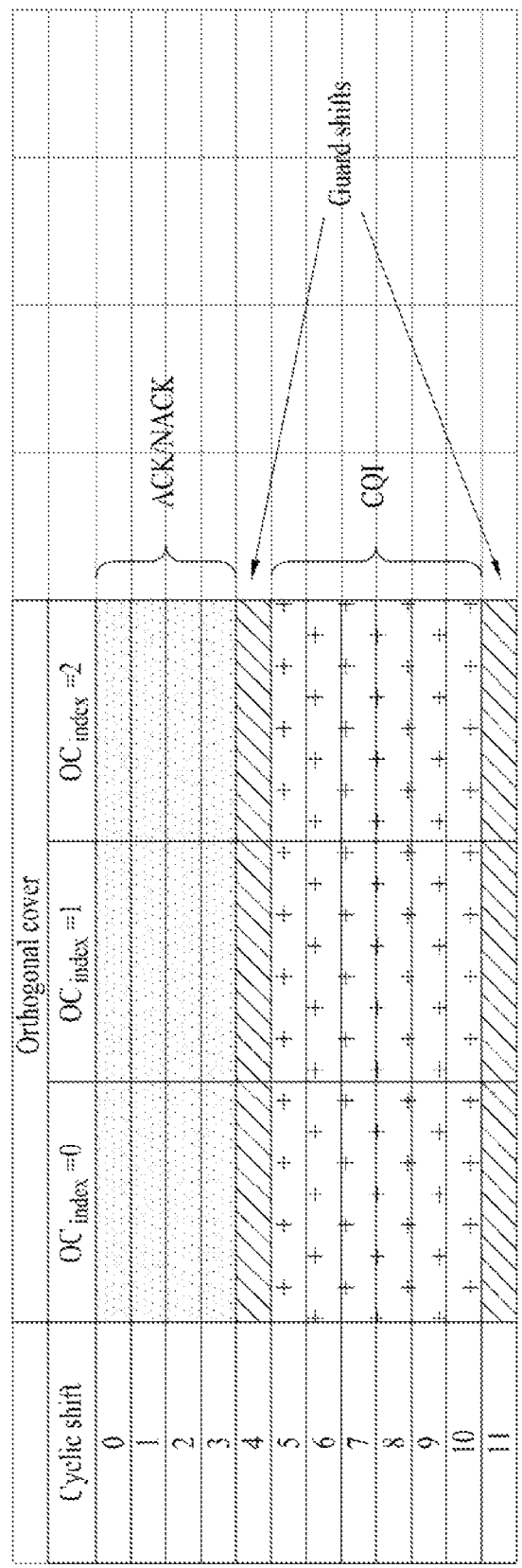
FIG. 18 is a diagram of channelization for a structure mixed by PUCCH format 1/1a/1b and format 2/2a/2b in an identical PRB.

FIG. 18 is a diagram of channelization for a structure mixed by PUCCH format 1/1a/1b and format 2/2a/2b in an identical PRB.

Remapping of cyclic shift hopping (CS) hopping and an orthogonal cover (OC) can be applied as follows.

(1) symbol-based cell-specific CS hopping to randomize inter-cell interference (2) Slot level CS/OC remapping 1) For inter-cell interference randomization 2) slot-based approach for mapping between ACK/NACK channel and resource (k)

Meanwhile, a resource ($n_r$) for the PUCCH format 1/1a/1b includes combination in the following.

(1) CS (=identical to DFT orthogonal code in a symbol level) ($n_{CS}$)

(2) OC (orthogonal cover in a slot level)

(3) Frequency RB (resource block) ($n_{rb}$)

If index indicating CS, OC, and RB corresponds to $n_{CS}$, $n_{OC}$, and $n_{rb}$, respectively, a representative index $n_r$ includes $n_{CS}$, $n_{OC}$, and $n_{rb}$. The $n_r$ satisfies '$n_r=(n_{CS}, n_{OC}, n_{rb})$'.

A combination of CQI, PMI, RI, and CQI with ACK/NACK can be delivered via PUCCH format 2/2a/2b. Reed Muller (RM) channel coding may be applied.

For instance, a channel coding for an UL CQI in an LTE system is described as follows. A bit stream $a_0$, $a_1$, $a_2$, $a_3$, . . . , $a_{A-1}$ is channel coded using (20, A) RM code. Table 7 shows a basic sequence for the (20, A) code. $a_0$ and $a_{A-1}$ indicate MSB (most significant bit) and LSB (least significant bit), respectively. In case of an extended cyclic prefix, maximum transmission bit corresponds to 11-bits except a case that CQI and ACK/NACK are simultaneously transmitted. After the bit is coded to 20-bits using the RM code, QPSK modulation can be applied. Prior to the QPSK modulation, the coded bit can be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

A channel coding bit $b_0$, $b_1$, $b_2$, $b_3$, . . . , $b_{B-1}$ can be generated by Formula 2.

$$b_i = \sum_{n=0}^{A-1} (a_n \cdot M_{i,n}) \bmod 2 \qquad \text{[Formula 2]}$$

In this case, i satisfies 'i=0, 1, 2, . . . , B−1'.

Table 8 indicates an UCI (uplink control information) field used for a wideband report (single antenna port, transmit diversity) or open loop spatial multiplexing PDSCH CQI feedback.

TABLE 8

| field | bandwidth |
|---|---|
| wideband CQI | 4 |

Table 9 indicates uplink control information (UCI) field used for wideband CQI and PMI feedback and the field reports closed loop spatial multiplexing PDSCH transmission.

TABLE 9

| | bandwidth | | | |
|---|---|---|---|---|
| | 2 antenna ports | | 4 antenna ports | |
| field | rank = 1 | rank = 2 | rank = 1 | rank > 1 |
| wideband CQI | 4 | 4 | 4 | 4 |
| Spatial discretization CQI | 0 | 3 | 0 | 3 |
| PMI (Precoding Matrix Index) | 2 | 1 | 4 | 4 |

Table 10 indicates uplink control information (UCI) field used for RI feedback for a wideband report.

TABLE 10

| | Bit widths | | |
|---|---|---|---|
| field | 2 antenna ports | 4 antenna ports | |
| field | 2 antenna ports | Maximum 2 layers | Maximum 4 layers |
| RI (Rank Indication) | 1 | 1 | 2 |

Figure 19:
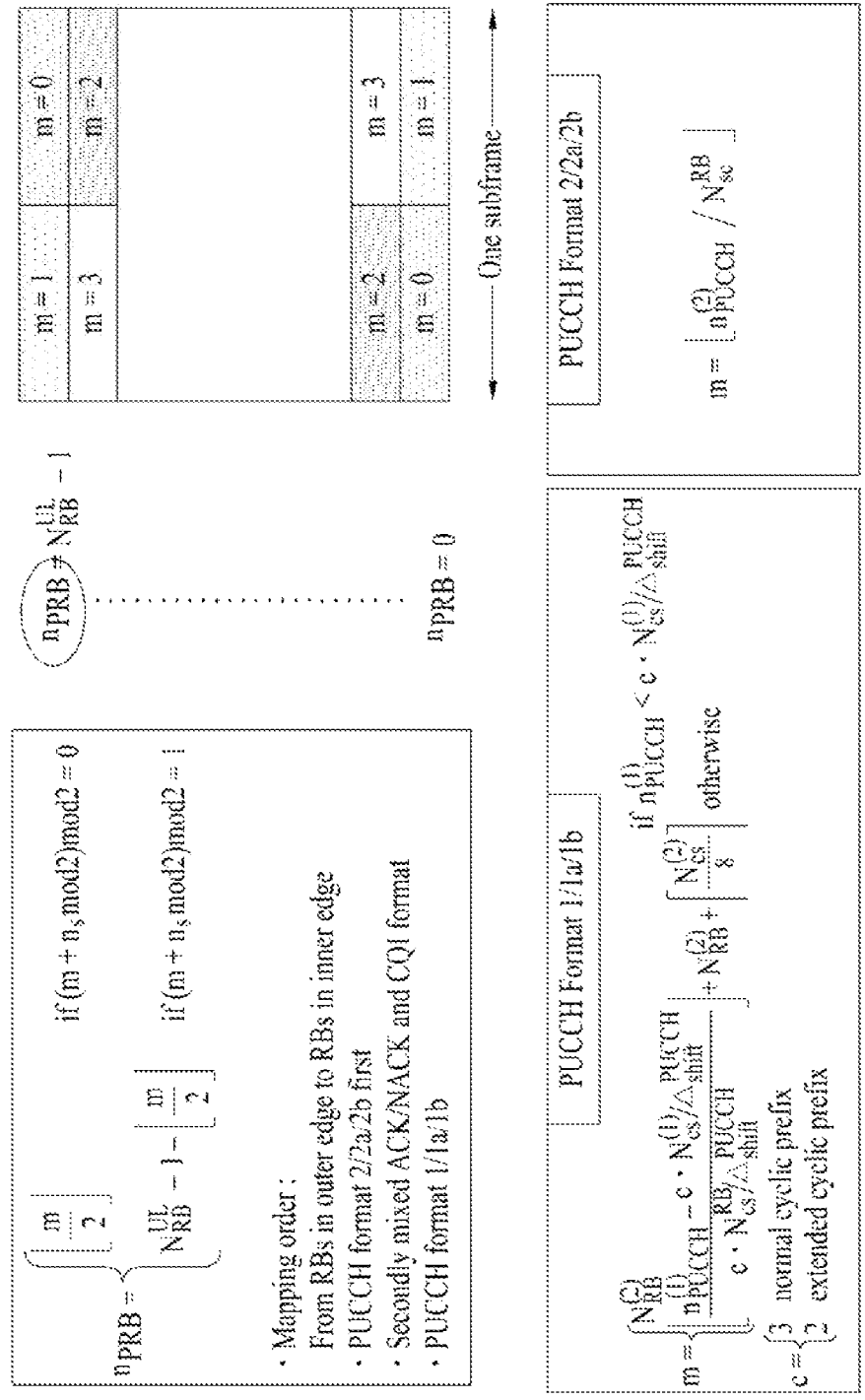
FIG. 19 is a diagram for physical resource block (PRB) allocation.

FIG. 19 is a diagram for physical resource block (PRB) allocation. As depicted in FIG. 19, a PRB can be used for transmission of PUCCH in slot $n_s$.

A multi-carrier system or a carrier aggregation system is a system using a plurality of carriers having a smaller bandwidth compared to a target bandwidth in a manner of aggregating a plurality of the carriers. When a plurality of the carriers having a smaller bandwidth compared to the target bandwidth are aggregated, the bandwidth of the aggregated carriers may be limited to a bandwidth used by a legacy system to have backward compatibility. For instance, a legacy LTE system supports 1.4 MHz, 3 MHz, 5 MHz, 10 MHz, 15 MHz, and 20 MHz. And, LTE-A (LTE-advanced) system, which is enhanced from a LTE system, can support a bandwidth greater than 20 MHz by using the bandwidths supported by the LTE only. Or, a carrier aggregation can be supported in a manner of defining a new bandwidth irrespective of the bandwidth used by the legacy system. The terminology of multi-carrier is a terminology capable of being used in a manner of being mixed with carrier aggregation or bandwidth aggregation. The carrier aggregation may be a common name for a contiguous carrier aggregation and a non-contiguous carrier aggregation. And, the carrier aggregation may be a common name for intra-band carrier aggregation and an inter-band carrier aggregation.

Figure 20:
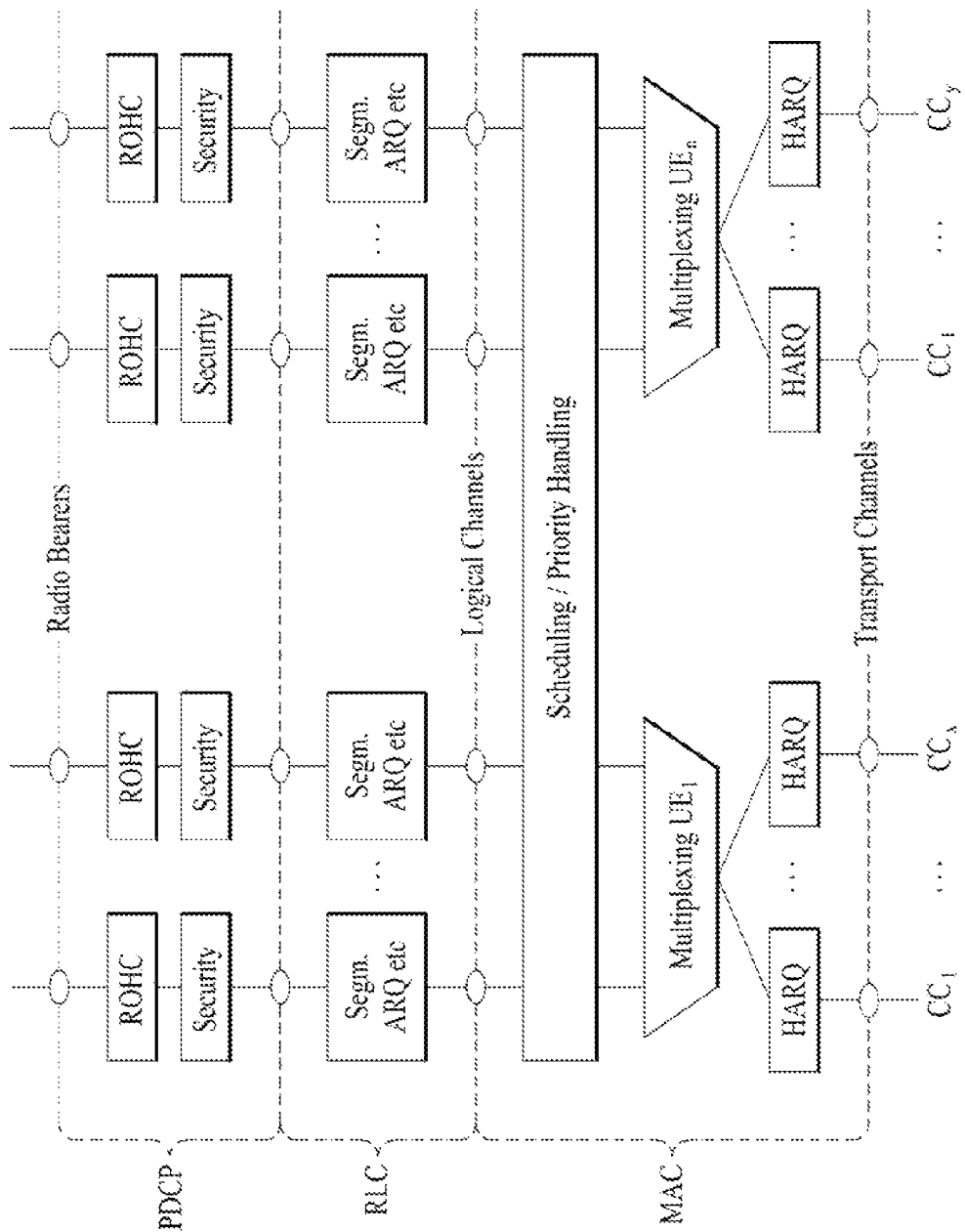
FIG. 20 is a diagram for a concept that a base station manages downlink component carriers (DL CCs)
Figure 21:
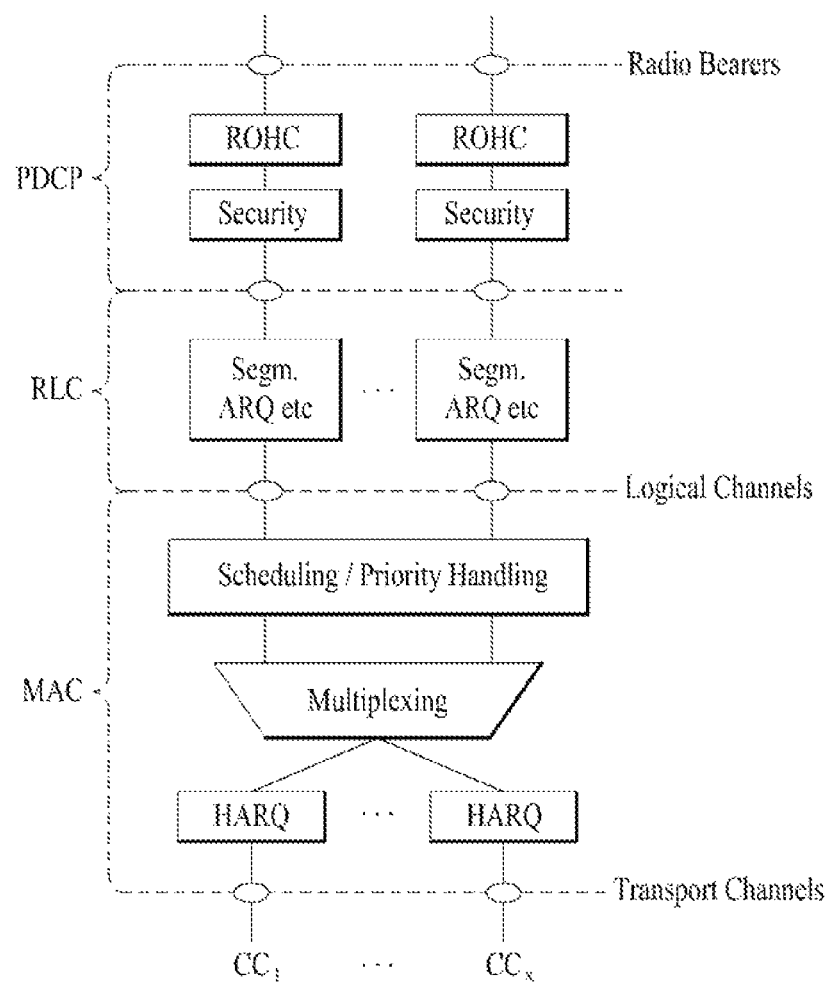
FIG. 21 is a diagram for a concept that a user equipment manages uplink component carriers (UL CCs)

FIG. 20 is a diagram for a concept that a base station manages downlink component carriers (DL CCs) and FIG. 21 is a diagram for a concept that a user equipment manages uplink component carriers (UL CCs). For clarity, an upper layer is explained in the following description in a manner that the upper layer is simplified into MAC in FIG. 19 and FIG. 20.

Figure 22:
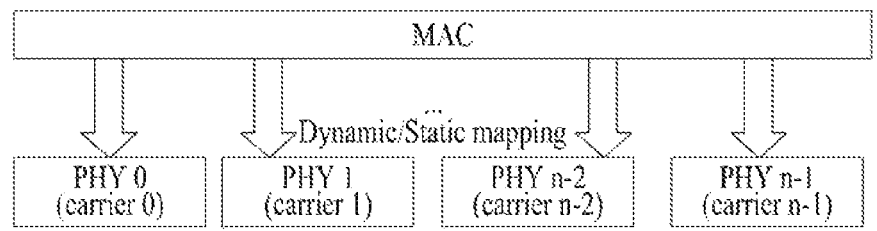
FIG. 22 is a diagram for a concept that one MAC manages multi-carriers in a base station.
Figure 23:
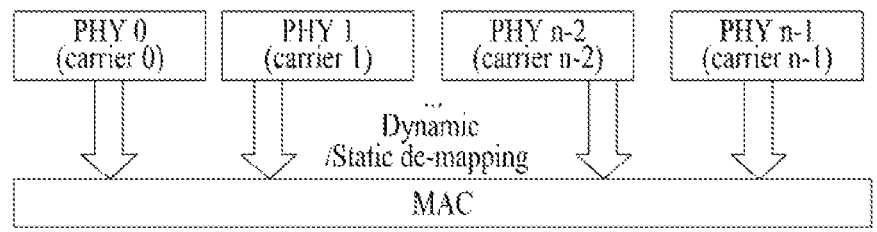
FIG. 23 is a diagram for a concept that one MAC manages multi-carriers in a user equipment.

FIG. 22 is a diagram for a concept that one MAC manages multi-carriers in a base station. FIG. 23 is a diagram for a concept that one MAC manages multi-carriers in a user equipment.

Referring to FIG. 22 and FIG. 23, one MAC manages and operates at least one frequency carrier and then performs transmission and reception. Since the frequency carriers managed by the one MAC are not necessary to be contiguous to each other, it is more flexible in terms of managing a resource. In FIG. 22 and FIG. 23, for clarity, assume that one PHY means one component carrier. In this case, one PHY is not necessary to be an independent RF (radio frequency) device. Although one independent RF device means one PHY in general, this is not a mandatory. One RF device may include a plurality of PHYs.

Figure 24:
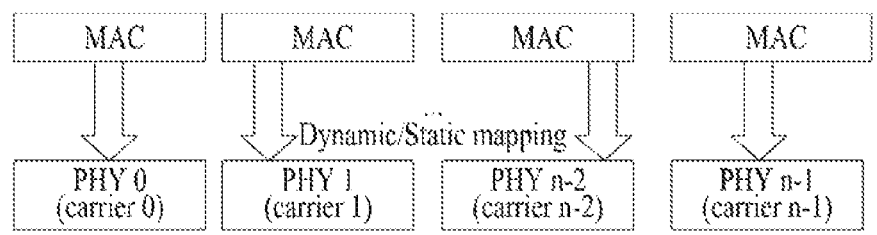
FIG. 24 is a diagram for a concept that pluralities of MACs manage multi-carriers in a base station.
Figure 25:
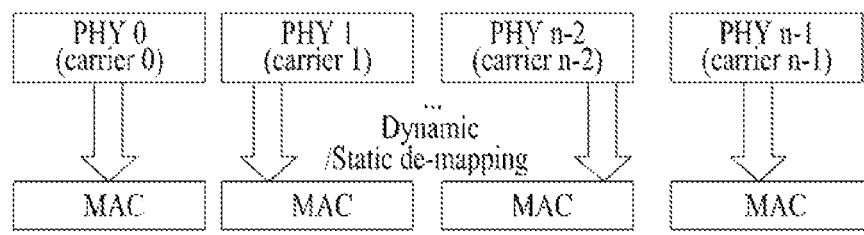
FIG. 25 is a diagram for a concept that pluralities of MACs manage multi-carriers in a user equipment.
Figure 26:
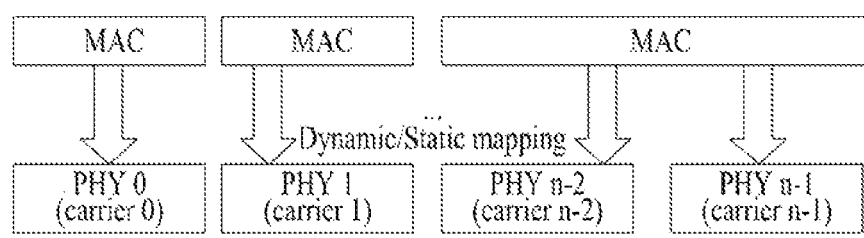
FIG. 26 is a diagram for a different concept that pluralities of MACs manage multi-carriers in a base station.
Figure 27:
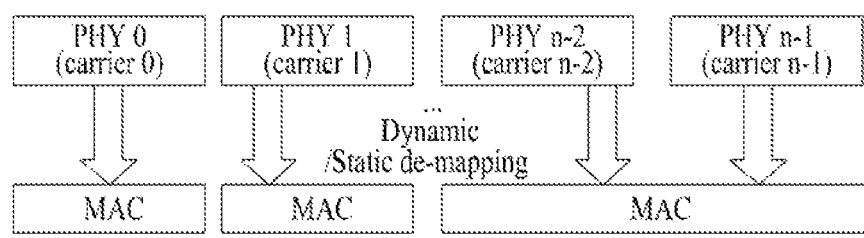
FIG. 27 is a diagram for a different concept that pluralities of MACs manage multi-carriers in a user equipment.

FIG. 24 is a diagram for a concept that pluralities of MACs manage multi-carriers in a base station. FIG. 25 is a diagram for a concept that pluralities of MACs manage multi-carriers in a user equipment. FIG. 26 is a diagram for a different concept that pluralities of MACs manage multi-carriers in a base station. FIG. 27 is a diagram for a different concept that pluralities of MACs manage multi-carriers in a user equipment.

Besides the structures shown in FIG. 22 and FIG. 23, a plurality of carriers can be controlled not by one MAC but by a plurality of MACs as depicted in FIG. 24 to FIG. 27.

As depicted in FIG. 24 and FIG. 25, each of the carriers can be controlled by each of a plurality of MACs by one-to-one. Or, as depicted in FIG. 26 and FIG. 27, each of the MACs controls each of the carriers by one-to-one for a part of the carriers and one or more remaining carriers can be controlled by one MAC.

The aforementioned system is a system including a plurality of carriers from 1 to N. Each of the carriers can be used in a manner of being contiguous or non-contiguous to each other. This may be applicable to both uplink and downlink without distinction. A TDD system is configured to manage N numbers of multiple carriers including DL/UL transmission in each of the carriers and a FDD system is configured to use a plurality of carriers for UL and DL, respectively. In case of the FDD system, The FDD system can also support asymmetrical carrier aggregation where the number of aggregated carriers and/or a bandwidth of the aggregated carriers aggregated are different from each other in UL and DL.

When the number of component carriers aggregated in UL and the number of the component carriers aggregated in DL are identical to each other, it is able to configure all component carriers to be compatible with a legacy system. Yet, a component carrier not considering compatibility is also included in the scope of the present invention.

Figure 28:
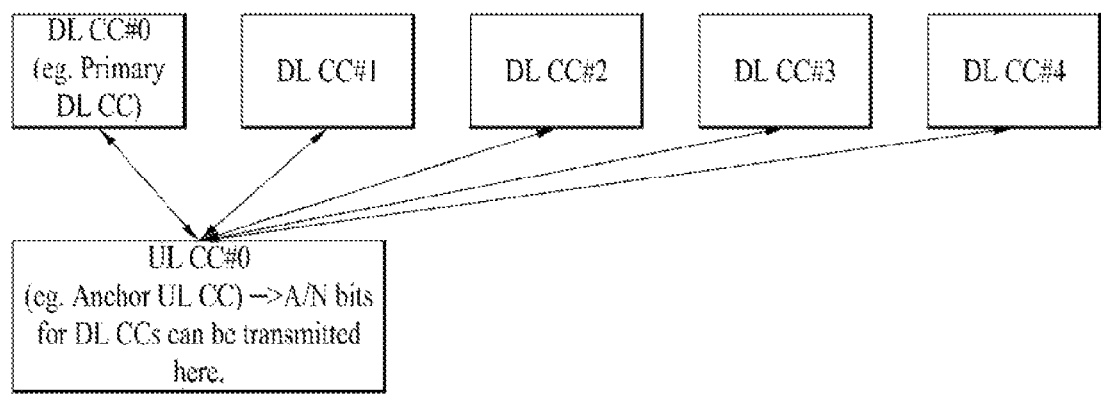
FIG. 28 is a diagram for asymmetrical carrier aggregation that 5 downlink component carriers (DL CCs) are linked to one uplink component carrier (UL CC)

FIG. 28 is a diagram for an example of asymmetrical carrier aggregation configured with 5 downlink component carriers (DL CCs) and one uplink component carrier (UL CC). The exemplified asymmetrical carrier aggregation may be configured in terms of UL control information (UCI) transmission. A specific UCI (e.g. ACK/NACK response) on a plurality of DL CCs is transmitted in a manner of being collected in one UL CC. And, in case that a plurality of UL CCs are configured, a specific UCI (e.g., ACK/NACK response on DL CCs) is transmitted on a predetermined UL CC (e.g., a primary CC, a primary cell, or a PCell). For clarity, if it is assumed that each DL CC can carry maximum 2 codewords and the number of ACK/NACK for each CC is dependent on the maximum number of codeword configured for the each CC, (for instance, if the maximum number of codeword of a specific CC configured by a base station corresponds to 2, although a specific PDCCH uses one codeword in the CC, ACK/NACK is made by 2 corresponding to the maximum number of codeword in the CC) at least 2 bits per each CC are necessary for UL ACK/NACK bit. In this case, ACK/NACK bit of at least 10 bits is required to transmit ACK/NACK for the data received on 5 DL CCs on a single UL CC. If DTX (discontinuous transmission) state is also necessary to be separately distinguished according to DL CC, at least 12 bits (=$5^6$=3125=11.61 bits) are required to transmit ACK/NACK. Since a legacy PUCCH format 1a and 1b can transmit ACK/NACK as many as 2 bits, this structure cannot transmit increased ACK/NACK information. Although carrier aggregation is exemplified as a reason for increasing the amount of uplink control information, this sort of situation may occur due to the increase of the number of antennas, TDD system, existence of a backhaul subframe in a relay system, and the like. Similar to the ACK/NACK, if control information related to a plurality of DL CCs is transmitted on a single UL CC, the amount of control information to be transmitted also increases. For instance, in case of transmitting CQI/PMI/RI on a plurality of DL CCs, UCI payload may increase. Meanwhile, although the present invention exemplifies ACK/NACK information for a codeword, there exist a transport block corresponding to the codeword and it is apparent that the ACK/NACK can be applied as the ACK/NACK for the transport block.

An UL anchor CC (UL PCC (primary CC), also called UL primary CC) depicted in FIG. 28 is a CC on which PUCCH resource or UCI is transmitted. The UL anchor CC can be cell-specifically or UE-specifically determined. For instance, a user equipment can determine a CC attempting a first random access as a primary CC. In this case, feedback for DTX state can be explicitly performed or the feedback for DTX state may be performed to share a state identical to NACK.

LTE-A uses a concept of a cell to manage a radio resource. A cell can be defined by a combination of a DL resource and a UL resource. In this case, the UL resource is not an essential element. Hence, a cell can consist of the DL resource only or both the DL resource and the UL resource. If carrier aggregation is supported, a linkage between a carrier frequency of a DL resource (or DL CC) and a carrier frequency of a UL resource (or UL CC) can be indicated by system information. A cell operating on a primary frequency resource (or PCC) is called a primary cell (PCell) and a cell operating on a secondary frequency resource (or SCC) may be called a secondary cell (SCell). The PCell may correspond to the cell used by a UE to perform an initial connection establishment or a connection re-establishment. The PCell may correspond to the cell indicated in a handover process. According to LTE-A release 10, only one PCell can exist when carrier aggregation is performed. The SCell is configurable after an RRC connection has been established. And, the SCell may be usable to provide an additional radio resource. Both the PCell and the SCell can be commonly called a serving cell. Hence, if a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell exists. And, one PCell and at least one SCell are included in the whole of serving cells. For carrier aggregation, after an initial security activating process has started, a network may be able to configure at least one SCell for the UE supporting the carrier aggregation in addition to the PCell configured in the early stage of a connection establishment process. Hence, a PCC corresponds to a PCell, a primary (radio) resource, or a primary frequency resource. These terminologies can be used in a manner of being mixed with each other. Similarly, an SCC corresponds to a SCell, a secondary (radio) resource, or a secondary frequency resource. These terminologies can be used in a manner of being mixed with each other.

In the following description, a method of efficiently transmitting increased UL control information is described with reference to drawings. Specifically, a new PUCCH format, a signal processing process, a resource allocating method and the like to transmit increased UL control information are proposed. The new PUCCH format proposed by the present invention is called a CA (carrier aggregation) PUCCH format or a PUCCH format 3 since a legacy LTE release 8/9 has defined up to format 2. A technical idea of the PUCCH format proposed by the present invention can be easily applied to a random physical channel (e.g., PUSCH) as well using an identical or similar scheme. For instance, embodiment of the present invention can be applied to a periodic PUSCH structure periodically transmitting control information or a non-periodic PUSCH structure non-periodically transmitting control information.

Following drawings and embodiment correspond to UCI/RS symbol structure of a subframe/slot level applied to the PUCCH format 3. The embodiment is explained centering on a case that UCI/RS symbol structure of PUCCH format 1/1a/1b (normal CP) of a legacy LTE is used. Yet, the depicted UCI/RS symbol structure of a subframe/slot level defined by the PUCCH format 3 is just an example. Hence, the present invention may be non-limited to a specific structure. In the PUCCH format 3 according to the present invention, the number of UCI/RS symbols, a position of UCI/RS symbols, and the like can be freely modified in accordance with a system design. For instance, the PUCCH format 3 according to embodiment of the present invention can be defined using an RS symbol structure of PUCCH format 2/2a/2b of a legacy LTE.

The PUCCH format 3 according to embodiment of the present invention can be used to transmit UL control information of a random type/size. For instance, the PUCCH format 3 according to embodiment of the present invention can transmit such information as HARQ ACK/NACK, CQI, PMI, RI, SR, and the like. This sort of information may have a payload of a random size. For clarity, drawings and embodiment are explained centering on a case that the PUCCH format 3 according to the present invention transmits the ACK/NACK information.

FIG. 29 to FIG. 32 is diagram for an example of a structure of PUCCH format 3 to which the present invention is applied and a signal processing process therefor. In particular, FIG. 29 to FIG. 32 is a diagram for an example of a structure of a DFT-based PUCCH format. According to the DFT-based PUCCH structure, PUCCH is transmitted in a manner that DFT precoding is performed and time domain OC (orthogonal cover) is applied with SC-FDMA level. In the following description, the DFT-based PUCCH format is commonly called the PUCCH format 3.

Figure 29:
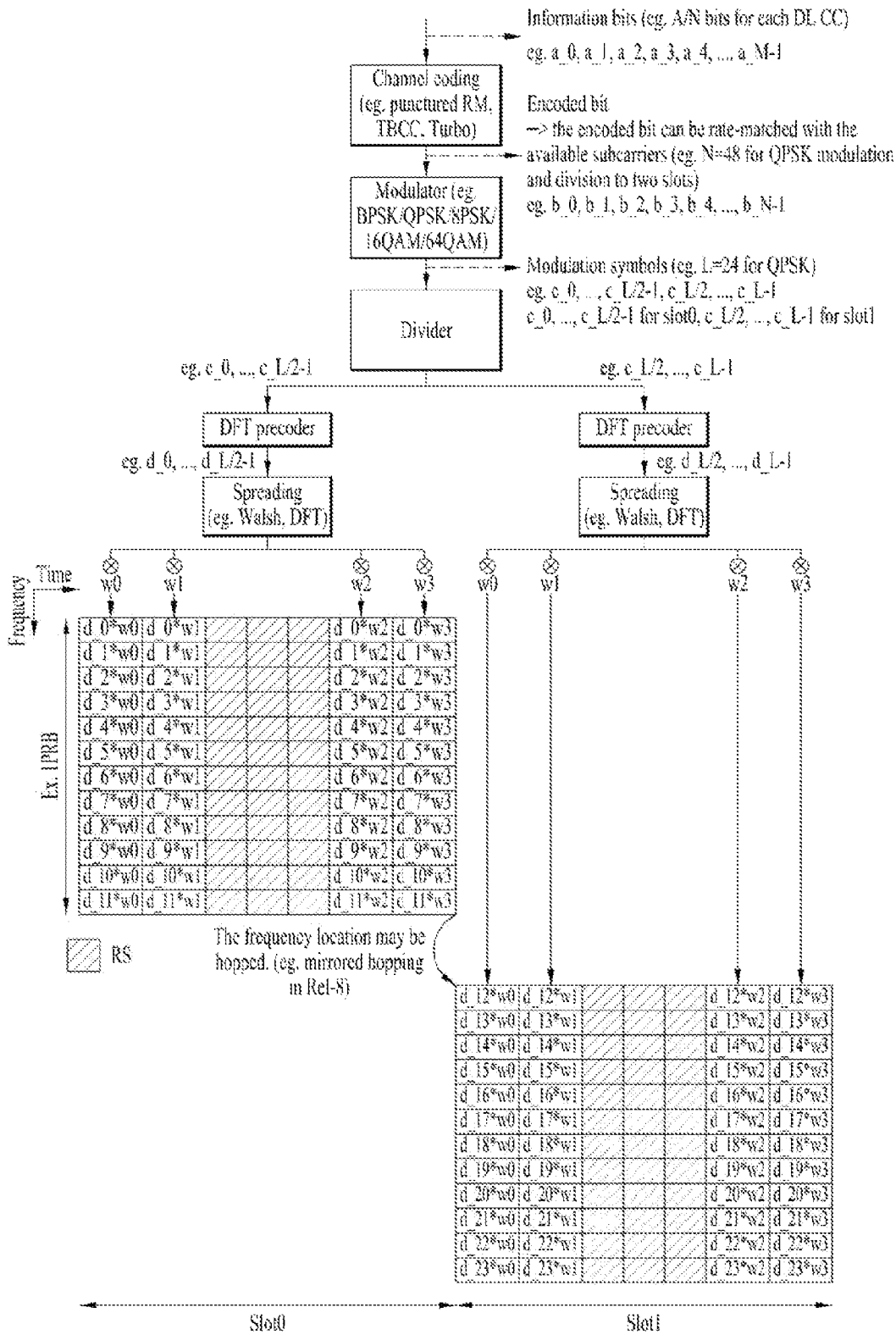
FIG. 29 to FIG. 32 is diagram for a structure of a PUCCH format 3 to which the present invention is applied and a signal processing process therefor.

FIG. 29 is a diagram for an example of a structure of the PUCCH format 3 using an orthogonal code (OC) where an SF corresponds to 4. Referring to FIG. 29, a channel coding block performs a channel coding on transmission bit a_0, a_1, . . . , a_M−1 (e.g., multiple ACK/NACK bits) and then generates a coding bit (encoded bit, coded bit, or coding bit) (or codeword) b_0, b_1, . . . , b_N−1. M indicates a size of the transmission bit and N indicates a size of the coding bit. The transmission bit includes UL control information (UCI), for instance, multiple ACK/NACK for a plurality of data (or PDSCH) received via a plurality of DL CCs are included in the transmission bit. In this case, the transmission bit a_0, a_1, . . . , a_M−1 is joint-coded irrespective of a type/number/size of the UCI consisting of the transmission bit. For instance, if the transmission bit includes multiple ACK/NACK on a plurality of DL CCs, a channel coding is not performed according to a DL CC and an individual ACK/NACK bit. Instead, the channel coding is performed for a whole of bit information. By doing so, a single codeword can be generated. Although it is not limited to this, the channel coding includes simple repetition, simplex coding, RM (Reed Muller) coding, punctured RM coding, TBCC (tail-biting convolutional coding), LDPC (low-density parity-check), or turbo coding. Although it is not depicted, the coding bit can be rate-matched in consideration of a modulation order and an amount of resource. A rate matching function is included as a part of a channel coding block or can be performed by a separate function block. For instance, the channel coding block obtains a single codeword by performing RM coding on a plurality of control information (32, 0) and may be then able to perform a circular buffer rate matching for the codeword.

A modulator modulates the coding bits b_0, b_1, . . . , b_N−1 and then generates modulation symbols c_0, c_1, . . . , c_L−1. L indicates a size of the modulation symbols. A modulation scheme is performed in a manner of modifying a size and phase of a transmission signal. For instance, the modulation scheme includes n-PSK (phase shift keying), n-QAM (quadrature amplitude modulation) (n is an integer equal to or greater than 2). Specifically, the modulation scheme may include BPSK (Binary PSK), QPSK (Quadrature PSK), 8-PSK, QAM, 16-QAM, 64-QAM, and the like.

A divider divides the modulation symbols c_0, c_1, . . . , c_L−1 into each slot. An order/pattern/scheme for dividing the modulation symbols into each slot is not specially limited. For instance, the divider can sequentially divide the modulation symbols into each slot from the front (localized scheme). In this case, as depicted in the drawing, the modulation symbols c_0, c_1, . . . , c_L/2−1 are divided into a slot 0 and the modulation symbols c_L/2, c_L/2+1, . . . , c_L−1 can be divided into a slot 1. When the modulation symbols are divided into each slot, interleaving (or permutation) can be performed for the modulation symbols. For instance, a modulation symbol of an even number is divided into the slot 0 and a modulation symbol of an odd number can be divided into the slot 1. An order of the modulation process and an order of the dividing process may be reversed.

A DFT precoder performs DFT precoding (e.g. 12-point DFT) on the modulation symbols divided into each slot to generate a single carrier waveform. Referring to FIG. 29, the modulation symbols c_0, c_1, . . . , c_L/2−1 divided into the slot 0 are DFT-precoded to DFT symbols d_0, d_1, . . . , D_L/2−1 and the modulation symbols c_L/2, c_L/2+1, . . . , c_L−1 divided into the slot 1 are DFT-precoded to DFT symbols d_L/2, d_L/2+1, . . . , d_L−1. The DFT precoding can be replaced by a different corresponding linear operation (e.g., Walsh precoding).

A spreading block spreads a DFT-performed signal in an SC-FDMA symbol level (time domain). The time domain spread of the SC-FDMA symbol level is performed using a spreading code (sequence). The spreading code includes a quasi-orthogonal code and an orthogonal code. The quasi-orthogonal code includes a PN (pseudo noise) code, by which the present invention may be non-limited. The orthogonal code includes a Walsh code and a DFT code, by which the present invention may be non-limited. For clarity, the present specification is explained centering on the orthogonal code as a representative example of the spreading code. Yet, this is just an example. The orthogonal code can be replaced by the quasi-orthogonal code. A maximum value of a spreading code size (or a spreading factor (SF)) is limited by the number of SC-FDMA symbols used for transmitting control information. As an example, in case that 4 SC-FDMA symbols are used to transmit the control information in a slot, orthogonal codes (w0, w1, w2, and w3) of length 4 can be used according to a slot. The SF may mean the extent of spreading and may be related to a multiplexing order of a user equipment or a multiplexing order of an antenna. The SF may vary (1, 2, 3, 4, . . . etc.) depending on a system requirement, may be defined in advance between a user equipment and a base station, or may be informed to a user equipment via a downlink control information (DCI) or an RRC signaling. As an example, in case that one of SC-FDMA symbols used for control information is punctured in order to transmit an SRS, a spreading code where an SF is reduced (e.g., SF=3 instead of SF=4) can be applied to the control information of the corresponding slot.

A signal generated by passing through the above process is mapped to a subcarrier within a PRB, undergoes an IFFT, and then is converted to a time domain signal. A CP is added to the time domain signal and a generated SC-FDMA symbol is transmitted by RF unit.

Each of the aforementioned processes is explained in more detail in a manner of assuming a case that ACK/NACK for 5 DL CCs is transmitted. If each DL CC is able to transmit 2 PDSCHs, ACK/NACK bit for the each DL CC may correspond to 12 bits if DTX state is included. If QPSK modulation and time spreading where SF=4 are assumed, a coding block size (after a rate-matching) may correspond to 48 bits. A coding bit is modulated to 24 QPSK symbols and generated QPSK symbols are divided into each slot in groups of 12. The 12 QPSK symbols in each slot are converted to 12 DFT symbols via a 12-point DFT calculation. The 12 DFT symbols in each slot are mapped to 4 SC-FDMA symbols in time domain in a manner of being spread using a spreading code where SF=4. Since 12 bits are transmitted via [2 bits*12 subcarriers* 8 SC-FDMA symbols], a coding rate may correspond to 0.0625 (=12/192). And, if an SF corresponds to 4, maximum 4 user equipments per one PRB can be multiplexed.

Figure 30:
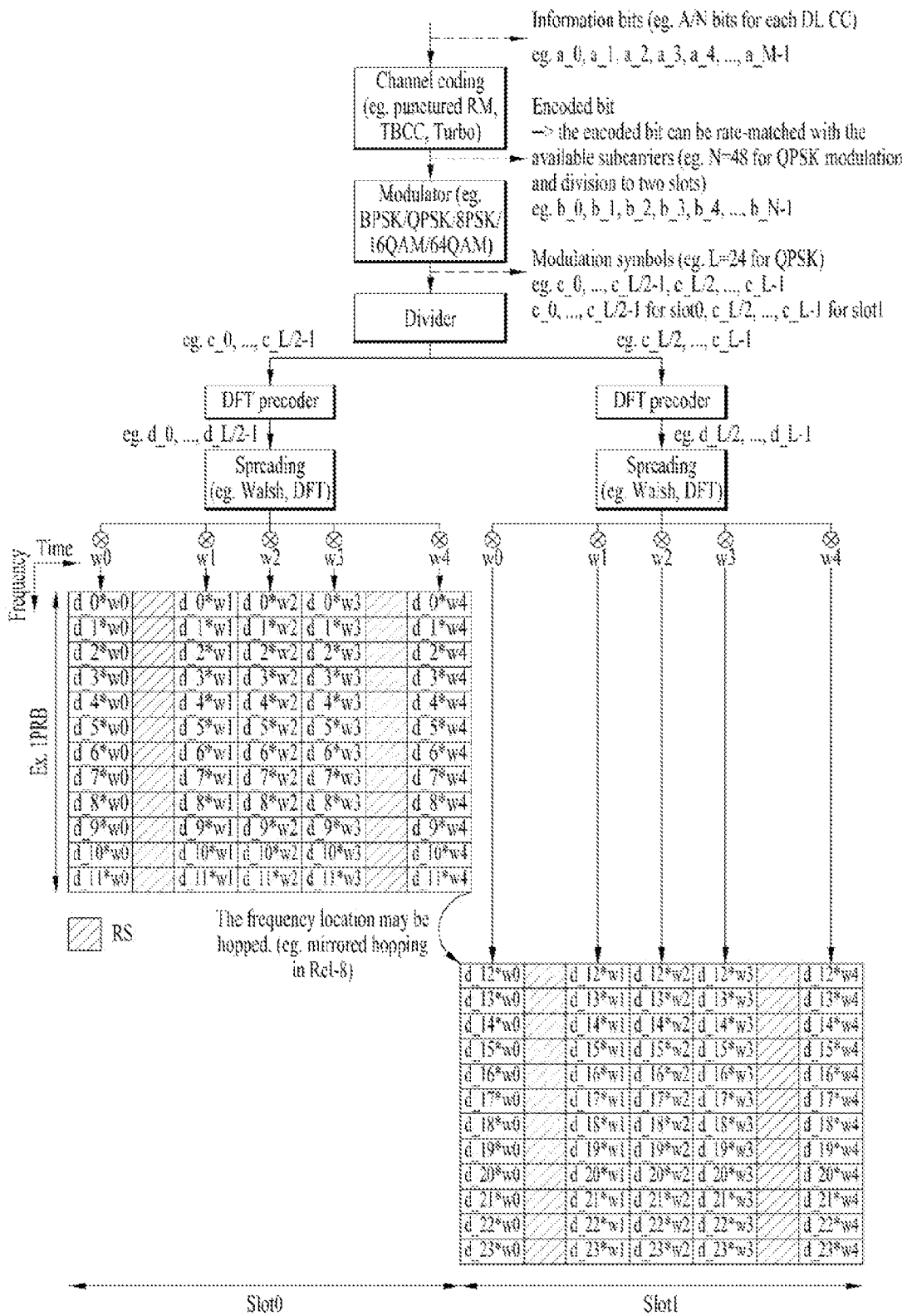

FIG. 30 is a diagram for an example of a PUCCH format 3 structure using an orthogonal code (OC) where SF=5.

A basic signal processing process in FIG. 30 is identical to the content explained with reference to FIG. 29. Yet, the number/position of UL control information (UCI) SC-FDMA symbols and that of RS SC-FDMA symbols are differentiated compared to FIG. 29. In this case, a spreading block may be applied in advance in the front end of a DFT precoder.

In FIG. 30, an RS may succeed a structure of an LTE system. For instance, a cyclic shift can be applied to a basic sequence. Multiplexing capacity of a data part becomes 5 due to a condition where SF=5. Yet, the multiplexing capacity of an RS part is determined according to $\Delta_{shift}^{PUCCH}$ which corresponds to a cyclic shift space. For instance, $12/\Delta_{shift}^{PUCCH}$ is given as the multiplexing capacity. In this case, in case of $\Delta_{shift}^{PUCCH}=1$, $\Delta_{shift}^{PUCCH}=2$, $\Delta_{shift}^{PUCCH}=3$, the multiplexing capacity becomes 12, 6, and 4, respectively. In FIG. 30, the multiplexing capacity of the data part becomes 5 due to a condition where SF=5. On the other hand, the multiplexing capacity of the RS part becomes 4 in case of $\Delta_{shift}^{PUCCH}$. Hence, the total multiplexing capacity may be limited to 4, which corresponds to a smaller value among the two multiplexing capacities.

Figure 31:
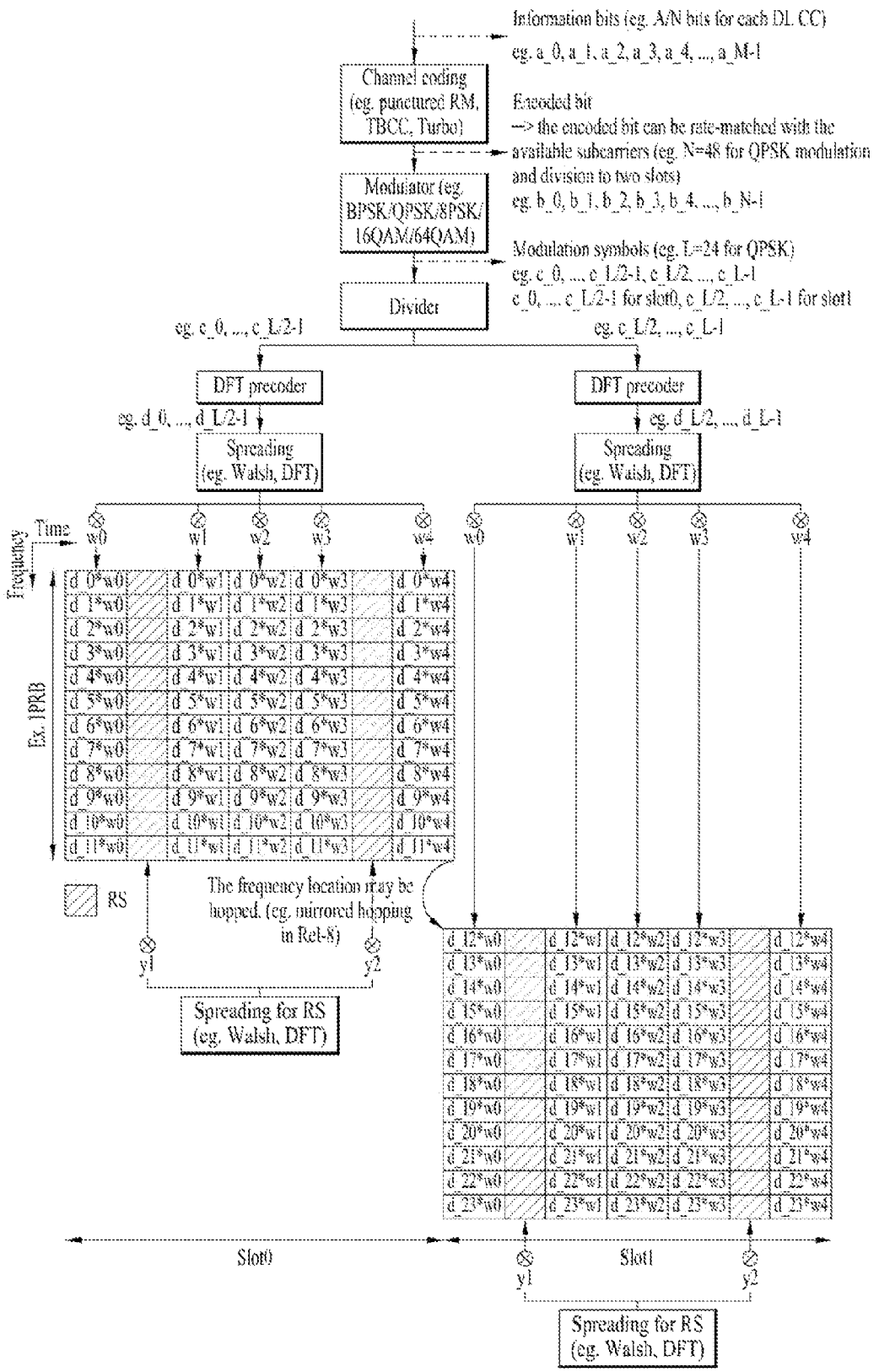

FIG. 31 is a diagram for an example of a PUCCH format 3 structure where a multiplexing capacity may increase in a slot level.

The SC-FDMA symbol level spreading described earlier in FIG. 29 and FIG. 30 can be applied to an RS to increase the total multiplexing capacity. Referring to FIG. 31, if a Walsh cover (or DFT code cover) is applied in a slot, the multiplexing capacity increases as much as twice. By doing so, the multiplexing capacity also becomes 8 even in case of $\Delta_{shift}^{PUCCH}$. Hence, the multiplexing capacity of a data part is not degraded. In FIG. 31, [y1 y2]=[1 1], [y1 y2]=[1 −1], or a form of linear conversion (e.g., [j j] [j −j], [1 j] [1 −j] and the like) can be used as an orthogonal cover code for the RS.

Figure 32:
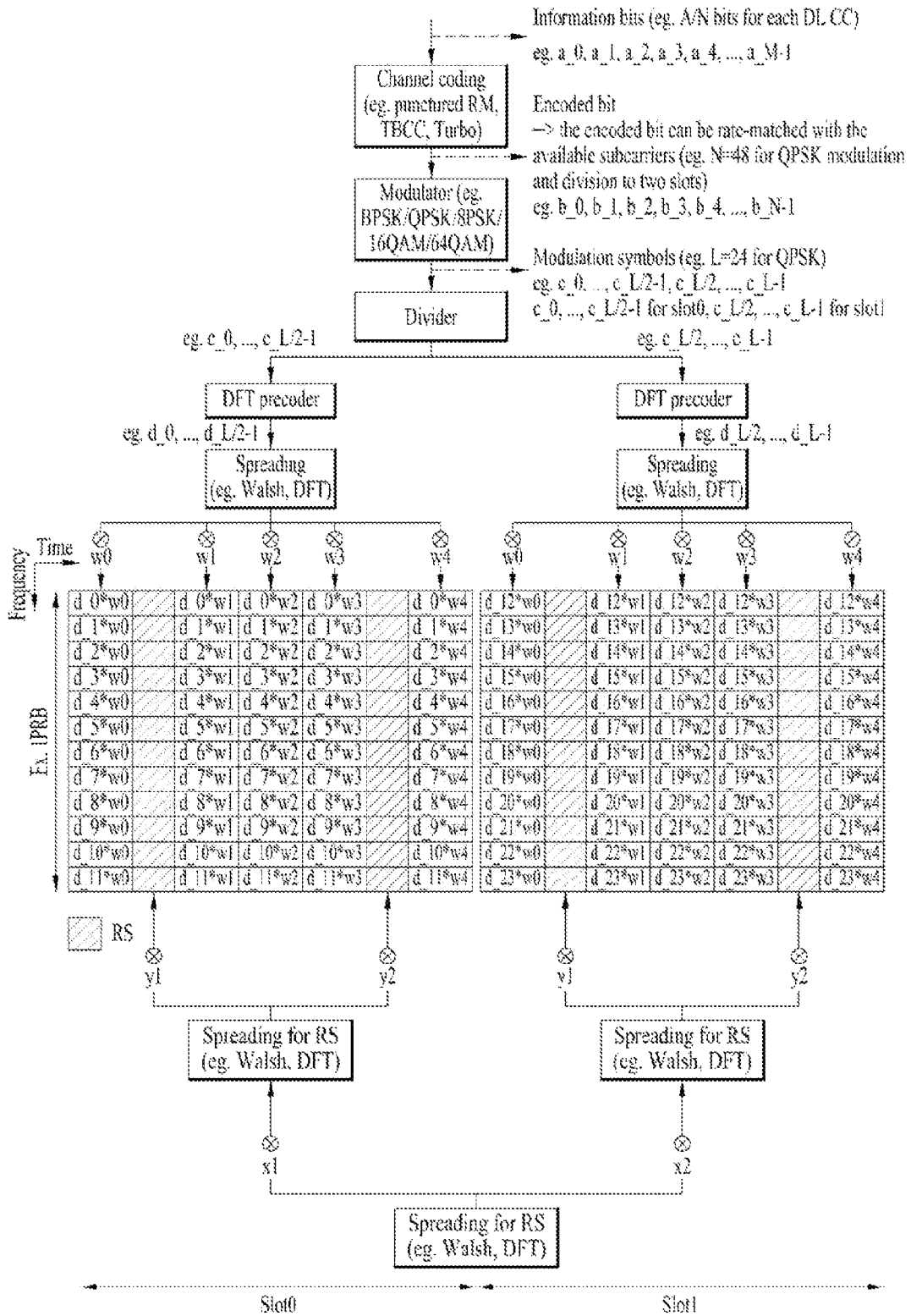

FIG. 32 is a diagram for an example of a PUCCH format 3 structure where a multiplexing capacity may increase in a subframe level.

If a frequency hopping is not applied in a slot level, a multiplexing capacity can be increased as much as twice by applying a Walsh cover in a slot unit. As mentioned earlier, [x1 x2]=[1 1] or [1 −1] can be used as an orthogonal cover code. A conversion form of the [x1 x2]=[1 1] or [1 −1] can be used as well.

For reference, the PUCCH format 3 processing process is not limited to the orders depicted in FIG. 29 to FIG. 30.

FIG. 33 is a diagram for a transmission structure of ACK/NACK information using a channel selection to which the present invention is applied. Referring to FIG. 33, two PUCCH resources or PUCCH channels (PUCCH resource #0 and #1 or PUCCH channel #0 and #1) can be configured for a PUCCH format 1b to transmit ACK/NACK information of 2 bits.

In case that ACK/NACK information of 3 bits is transmitted, 2 bits among the ACK/NACK information of 3 bits can be represented by the PUCCH format 1b and a remaining 1 bit can be represented in a manner that which PUCCH resource is selected among the 2 PUCCH resources. For instance, since 1 bit (two cases) can be represented by selecting one of cases including a case that ACK/NACK information is transmitted using a PUCCH resource #0 and a case that ACK/NACK information is transmitted using a PUCCH resource #1, the ACK/NACK information of the total 3 bits can be represented.

Table 11 indicates an example that ACK/NACK information of 3 bits is transmitted using a channel selection. In this case, assume that two PUCCH resource are configured.

TABLE 11

| ACK/NACK | Ch1 RS | Ch1 Data | Ch2 RS | Ch2 Data |
|---|---|---|---|---|
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |

TABLE 11-continued

| ACK/NACK | Ch1 RS | Ch1 Data | Ch2 RS | Ch2 Data |
|---|---|---|---|---|
| A, N, A | 0 | 0 | 1 | −j |
| A, A, N | 0 | 0 | 1 | j |
| A, A, A | 0 | 0 | 1 | −1 |

In Table 11, 'A' means ACK information and 'N' means NACK information or NACK/DTX information. '1, −1, j, and −j' mean 4 complex modulation symbols where b(0) and b(1), which correspond to transmission information of 2 bits transmitted in a PUCCH format, underwent QPSK modulation. The b (0) and b (1) correspond to binary transmission bits transmitted using a selected PUCCH resource. For instance, the binary transmission bit b (0) and b (1) can be transmitted via a PUCCH resource in a manner of being mapped to a complex modulation symbol according to Table 12.

TABLE 12

| modulation | Binary transmission bit b(0), b(1) | Complex modulation symbol |
|---|---|---|
| QPSK | 0, 0 | 1 |
|  | 0, 1 | −j |
|  | 1, 0 | j |
|  | 1, 1 | −1 |

FIG. 34 is a diagram for a transmission structure of ACK/NACK information using an enhanced channel selection to which the present invention is applied. For clarity, PUCCH #0 and PUCCH #1 are depicted in time/frequency domain different from each other in FIG. 34. Yet, the PUCCH #0 and the PUCCH #1 can be configured to use codes different from each other in an identical time/frequency domain. Referring to FIG. 34, two PUCCH resources (PUCCH resource #0 and #1) can be configured for a PUCCH format 1a to transmit ACK/NACK information of one bit.

In case that ACK/NACK information of 3 bits is transmitted, 1 bit among the ACK/NACK information of 3 bits can be represented by the PUCCH format 1b and another 1 bit can be represented in a manner that which PUCCH resource (PUCCH resource #0 and #1) is selected to transmit the ACK/NACK information. And, the other 1 bit can be differently represented according to whether a reference signal for a prescribed resource is transmitted. In this case, although it is preferable to transmit the reference signal in time/frequency domain of firstly selected PUCCH resources (PUCCH resource #0 and #1), it may also be able to transmit the reference signal in time/frequency domain of an original PUCCH resource of the reference signal.

In particular, in case that the ACK/NACK information is transmitted via the PUCCH resource #0 and a reference signal for a resource corresponding to the PUCCH resource #0 is transmitted and in case that the ACK/NACK information is transmitted via the PUCCH resource #1 and a reference signal for a resource corresponding to the PUCCH resource #1 is transmitted, since 2 bits (4 cases) can be represented by selecting a case among the cases including a case that the ACK/NACK information is transmitted via the PUCCH resource #0 and a reference signal for a resource corresponding to the PUCCH resource #1 is transmitted and a case that the ACK/NACK information is transmitted via the PUCCH resource #0 and a reference signal for a resource corresponding to the PUCCH resource #1 is transmitted, the ACK/NACK information of the total 3 bits can be represented.

Table 13 indicates an example that the ACK/NACK information of 3 bits is delivered using an enhanced channel selection. In this case, assume a case that two PUCCH resources are configured to transmit the ACK/NACK information.

TABLE 13

| ACK/NACK | Ch1 | | Ch2 | |
| --- | --- | --- | --- | --- |
| | RS | Data | RS | Data |
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Unlike Table 12 using a channel selection, Table 13 using an enhanced channel selection may have a meaning in that a symbol mapped to a PUCCH resource can be implemented by BPSK modulation. Yet, unlike an example of Table 13, it is also possible to implement a complex symbol by QPSK modulation using PUCCH format 1b. In this case, the number of bits capable of being transmitted by an identical PUCCH resource may increase.

FIG. 33 to FIG. 34 is explained with reference to an example that 2 PUCCH resources are configured to transmit ACK/NACK information of 3 bits. Yet, the number of transmission bits of the ACK/NACK information and the number of PUCCH resources may be variously configured. Moreover, it is apparent that the identical principle can be applied to a case that different UL control information is transmitted instead of the ACK/NACK information or a case that different UL control information is transmitted together with the ACK/NACK information as well.

Table 14 indicates an example that two PUCCH resources are configured and six ACK/NACK states are transmitted using a channel selection.

TABLE 14

| HARQ-ACK(0), HARQ-ACK(1) | $n^{(1)}_{PUCCH}$ | b(0), b(1) |
| --- | --- | --- |
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 15 indicates an example that three PUCCH resources are configured and 11 ACK/NACK states are transmitted using a channel selection.

TABLE 15

| HARQ-ACK(0), HARQ-ACK(1), HARQ-ACK(2) | $n^{(1)}_{PUCCH}$ | b(0), b(1) |
| --- | --- | --- |
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 16 indicates an example that four PUCCH resources are configured and 20 ACK/NACK states are transmitted using a channel selection.

TABLE 16

| HARQ-ACK(0), HARQ-ACK(1), HARQ-ACK(2), HARQ-ACK(3) | $n^{(1)}_{PUCCH}$ | b(0), b(1) |
| --- | --- | --- |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

Meanwhile, a user equipment collects (e.g., multiplexing, bundling, and the like) responses for cases where a plurality of ACK/NACK feedbacks received from PCell DL CC and SCell(s) DL CC are required and then transmits the responses in UL CC in the PCell using a single PUCCH.

A case that HARQ ACK/NACK feedback is required for a DL CC may include 3 types as follows.

First of all, the HARQ ACK/NACK feedback may be required for a case of Table 17 in the following.

TABLE 17

For a PDSCH(s) transmission indicated by the detection of a corresponding PDCCH(s) in subframe(s) n − k, where k ∈ K and K is a set of M elements {$k_0$, $k_1$, ... $k_{M-1}$} depending on the subframe n and the UL-DL configuration.

Table 17 means PDSCH(s) requiring a general A/N feedback. The PDSCH may exist in both a DL PCell and Scells. For clarity, the aforementioned case is called 'PDSCH with PDCCH' in the following description.

Subsequently, the HARQ ACK/NACK feedback may be required for a case of Table 18 in the following.

TABLE 18

For a PDCCH(s) indicating downlink SPS release in subframe(s) n − k, where k ∈ K and K is a set of
M elements {$k_0, k_1, \ldots k_{M-1}$} depending on the subframe n and the UL-DL configuration.

Table 18 means A/N feedback for PDCCH(s) indicating SPS release. In this case, only one 'PDSCH without corresponding PDCCH' can exist in a single subframe through at least one DL cell. While the A/N feedback for PCDDH(s) indicating DL SPS release is performed, A/N feedback for PDCCH(s) indicating DL SPS activation may not be performed. And, the above-mentioned PDCCH may exist in a DL PCell only. For clarity, the aforementioned case is called 'DL SPS release' in the following description.

Subsequently, the HARQ ACK/NACK feedback may be required for a case of Table 19 in the following.

TABLE 19

For a PDSCH(s) transmission where there is not a corresponding PDCCH detected in subframe(s) n − k,
where k ∈ K and K is a set of M elements {$k_0, k_1, \ldots k_{M-1}$} depending on the subframe n and the
UL-DL configuration.

Table 19 corresponds to PDSCH(s) without PDCCH(s). Table 19 means A/N feedback for SPS (semi-persistent scheduling). In this case, only one 'PDSCH without corresponding PDCCH' can exist in a single subframe through at least one DL cell. And, the above-mentioned PDSCH may exist in a DL PCell only. For clarity, the aforementioned case is called 'DL SPS' in the following description.

Yet, the HARQ ACK/NACK feedback event explained with reference to Table 17 to Table 19 is just an example. The HARQ ACK/NACK feedback event may be performed in case that a different event occurs as well.

Meanwhile, in the Table 17 to the Table 19, 'M' indicates the number of elements of a set k. And, definition of a 'k' corresponding to HARQ-ACK transmission timing for a DL reception can be represented as Table 20 in the following according to a position (n) of a subframe and TDD UL-DL configuration.

Figure 35:
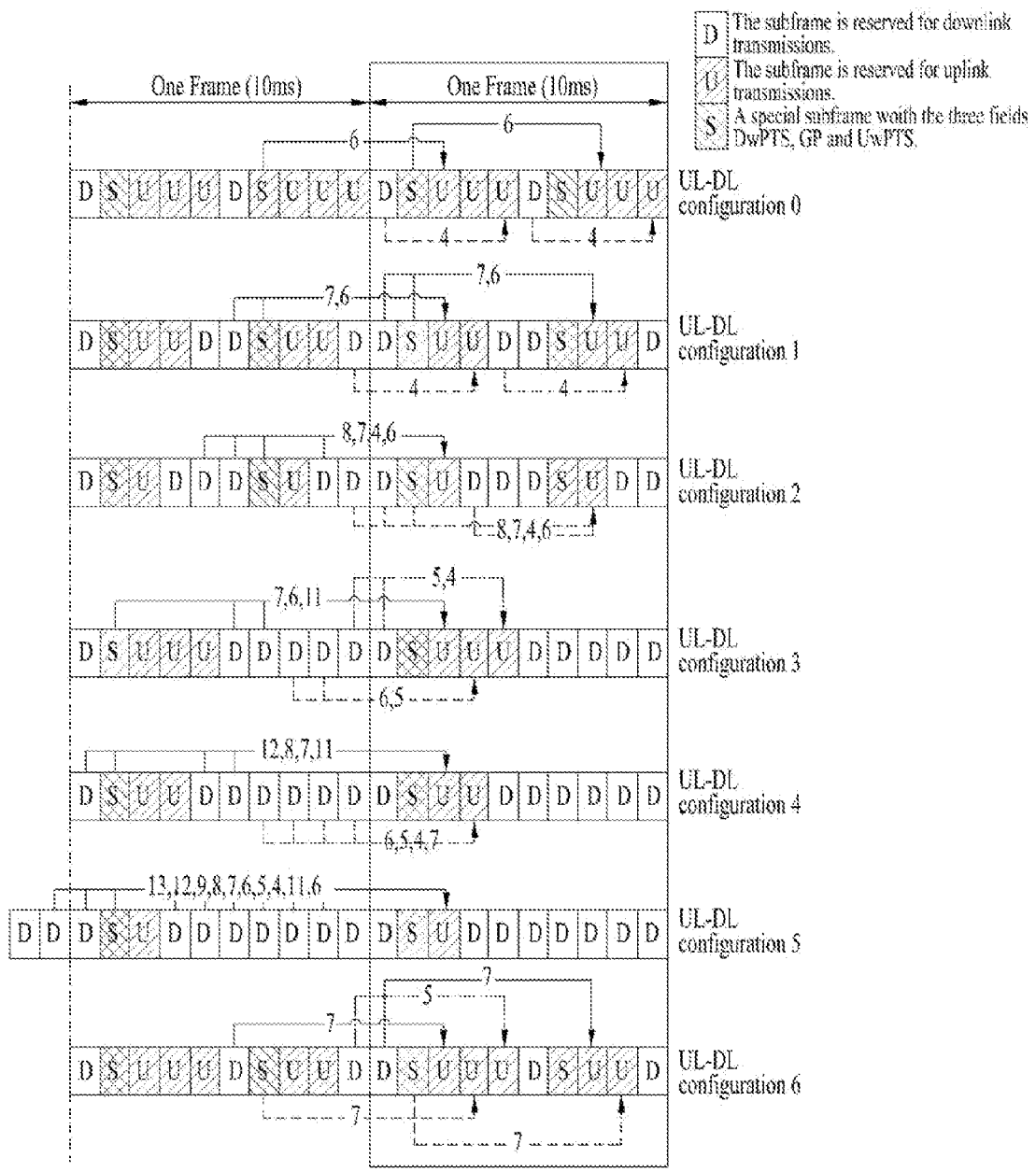
FIG. 35 is a diagram for an example of ACK/NACK feedback in TDD in relation to the present invention.

And, the Table 20 can be represented as FIG. 35.

When ACK/NACK feedback is performed in UL subframes of a second frame among two frames, FIG. 35 indicates that Table 20 shows previous ACK/NACK feedback for DL subframes.

For instance, in case of a UL-DL configuration 0 indicated in the very top of FIG. 35, 6 UL subframes exist in a frame.

And, ACK/NACK feedback for a special subframe (of a previous frame), which corresponds to a sixth previous subframe of a first UL subframe of a second frame, is performed in the first UL subframe of the second frame. And, the ACK/NACK feedback is not performed in a second UL subframe. And, in a third UL subframe, the ACK/NACK feedback for a DL subframe, which corresponds to fourth previous subframe of the third UL subframe, is performed. And, in a fourth UL subframe, the ACK/NACK feedback for a special subframe, which corresponds to a sixth previous subframe of the fourth UL subframe, is performed. And, in a fifth UL subframe, the ACK/NACK feedback is not performed. And, in a sixth UL subframe, the ACK/NACK feedback for a DL subframe, which corresponds to a fourth previous subframe of the sixth UL subframe, is performed.

As a different example, in case of a UL-DL configuration 1 indicated in the second top of FIG. 35, 4 UL subframes exist in a frame. In a first UL subframe of a second frame, feedback is performed in a manner of collecting (multiplexing or bundling) ACK/NACKs for a DL subframe of a previous frame and a subframe, which correspond to a seventh and sixth previous subframe of the first UL subframe of the second frame, respectively. And, in a second UL subframe, the ACK/NACK feedback for a DL subframe (of a previous frame), which corresponds to a fourth previous subframe of the second UL subframe, is performed. And, in a third UL subframe, feedback is performed in a manner of collecting (multiplexing or bundling) ACK/NACKs for a DL subframe and a special subframe, which correspond to a seventh and sixth previous subframe of the third UL subframe, respectively. And, in a fourth UL subframe, the

TABLE 20

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

ACK/NACK feedback for a DL subframe (of a previous frame), which corresponds to a fourth previous subframe of the fourth UL subframe, is performed. For clarity, explanations on operations in different UL-DL configurations are omitted. Yet, identical comprehension of the aforementioned examples in the UL-DL configuration 0 and 1 is applied to the operations of different configurations as well.

In particular, a position of DL subframe of which the ACK/NACK feedback is performed in each of the UL subframes vary depending on a TDD UL-DL configuration and a position of a UL subframe in a TDD.

And, in case of FDD, 'M' is always 1 and 'k' always satisfies $\{k_0\}=\{4\}$.

Meanwhile, a cross-scheduling from a PCell to SCell(s) can be supported but a cross-scheduling from the SCell(s) to the PCell may not be supported.

In this case, if there exist cell(s) cross-scheduled from a different cell, additional PDSCH assignment may not be performed in the cell(s). in particular, scheduling of a specific cell can be performed by the specific cell.

Meanwhile, a cross scheduling indicates that a control channel transmitted on a primary component carrier (primary CC) schedules a data channel transmitted on the primary component carrier or a different component carrier using a carrier indicator field (CIF).

Figure 36:
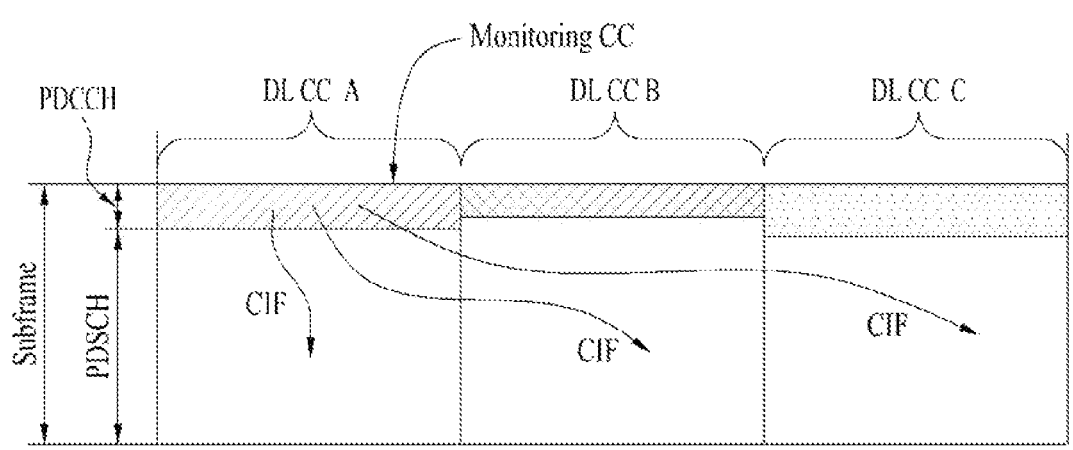
FIG. 36 is a diagram for an example to which a cross carrier scheduling scheme is applied in relation to the present invention.

FIG. 36 is a diagram for an example to which a cross carrier scheduling scheme is applied. In particular, in FIG. 36, the number of cells (or component carriers) assigned to a relay node correspond to 3. As mentioned earlier in the foregoing description, FIG. 36 shows a cross carrier scheduling scheme using a CIF. In this case, assume a DL cell (or component carrier) #A corresponds to a primary DL component carrier (i.e., primary cell (PCell) and a remaining component carrier #B and a component carrier #C correspond to secondary component carriers (i.e., secondary cell (SCell).

For clarity, assume that a UE is configured to perform a communication via two component carriers (CCs) in the following description.

And, one of the component carriers is called a primary CC (PCC or PCell) and the other is called a secondary CC (SCC or SCell).

And, assume that the UE receives various control signals such as PDCCH and the like and data transmission and reception of the SCell is cross-carrier scheduled by a control signal of the PCell.

For clarity, following description is explained under an assumption of a FDD system where there exist a CC #1 (DL PCell, LTE-A frequency band), a CC #3 (UL PCell, LTE-A frequency band), and a CC #2 (SCell, unlicensed band).

Regarding a CA environment, an intra-band CA is firstly considered in general. A band used in the intra-band and an inter-band means an operating band. The operating band can be defined as follows.

In particular, the operating band means a frequency range operating within E-UTRA in a manner of being paired or unpaired. The operating band may be defined as a specific set according to a technical requirement.

For instance, an actual operating band used in LTE can be defined as Table 21 as follows.

TABLE 21

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note
[1]Band 6 is not applicable.

And, the intra-band CA means a plurality of DL component carriers and/or UL component carriers positioned at adjacent to each other in a frequency.

In other word, the intra-band CA means that a carrier frequency of a plurality of the DL component carriers and/or a carrier frequency of a plurality of the UL component carriers are positioned at an identical (operating) band.

Hence, a plurality of the component carriers can be designed under an assumption that they have a propagation characteristic similar to each other via the intra-band CA. In this case, the propagation characteristic includes such various characteristics as propagation/path delay, propagation/path loss, fading channel impact, and the like capable of being affected by a different impact according to a frequency (or a center frequency).

Meanwhile, a UE catches uplink transmission timing for a primary cell UL CC.

Along with the aforementioned assumption (e.g., similar propagation/path delay between CCs), uplink transmission timing of a secondary cell is used as identical to uplink transmission timing of a primary cell. Yet, transmission timing of a PRACH (physical random access channel) may be different from that of the primary cell.

By doing so, a UL subframe boundary between cells in a UE can be identically matched with each other. Hence, the UE can perform a communication in a CA environment with a single radio frequency (RF) stage only.

Yet, due to a problem of assigning a frequency to a mobile communication provider for a mobile communication (remaining frequency assignment, reuse of a frequency used for a different usage, and the like), at least one cell may not be adjacent to a different cell(s) in a frequency in the CA environment.

For instance, if there exist 2 cells constructing a CA environment, a carrier frequency of one cell may correspond to 800 MHz (UL/DL) and a carrier frequency of another cell may corresponds to 2.5 GHz (UL/DL).

As a different example, a carrier frequency of one cell may correspond to 800 MHz (UL/DL) and a carrier frequency of another cell may correspond to 2.6 GHz (UL/DL).

As a further different example, a carrier frequency of one cell may correspond to 700 MHz (UL/DL) and a carrier frequency of another cell may correspond to 1.7 GHz in UL and 2.1 GHz in DL (TDD). In this case, the carrier frequency may mean a carrier frequency between DL CCs or the carrier frequency between UL CCs.

As mentioned in the foregoing description, an environment apart from a frequency domain may be called an inter-band CA.

In other word, the inter-band CA may mean that a carrier frequency of a plurality of DL component carriers and/or a carrier frequency of a plurality of UL component carriers are positioned at bands different from each other.

In the aforementioned inter-band CA environment, the assumption that propagation characteristic between cells is similar to each other cannot be maintained anymore.

In particular, it is not able to assume that (UL) subframe boundary between cells is identically matched with each other anymore in the inter-band CA environment. Hence, uplink transmission timings different from each other between cells are necessary. In order for a UE to perform a communication in the inter-band CA environment, the UE may use a plurality of RF (radio frequency) stages.

Meanwhile, PDSCH (corresponding PDCCH may or may not be included) corresponding to transmission time ($n^{th}$ subframe) of PUCCH or detection time of PDCCH indicating DL SPS release can be defined as follows.

First of all, in a FDD environment, PDSCH or PDCCH indicating DL SPS release in a subframe n−4 indicates PUCCH in a subframe n.

Secondly, in a TDD environment, PDSCH or PDCCH indicating DL SPS release in a subframe n−k indicates PUCCH in a subframe n.

In this case, DAI (UL-DL configuration 1-6) may mean the accumulated number of PDCCH(s) in an assigned PDSCH transmission and PDCCH indicating a DL SPS release for DCI format 1/1a/1B/1D/2/2A/2B/2C.

Figure 37:
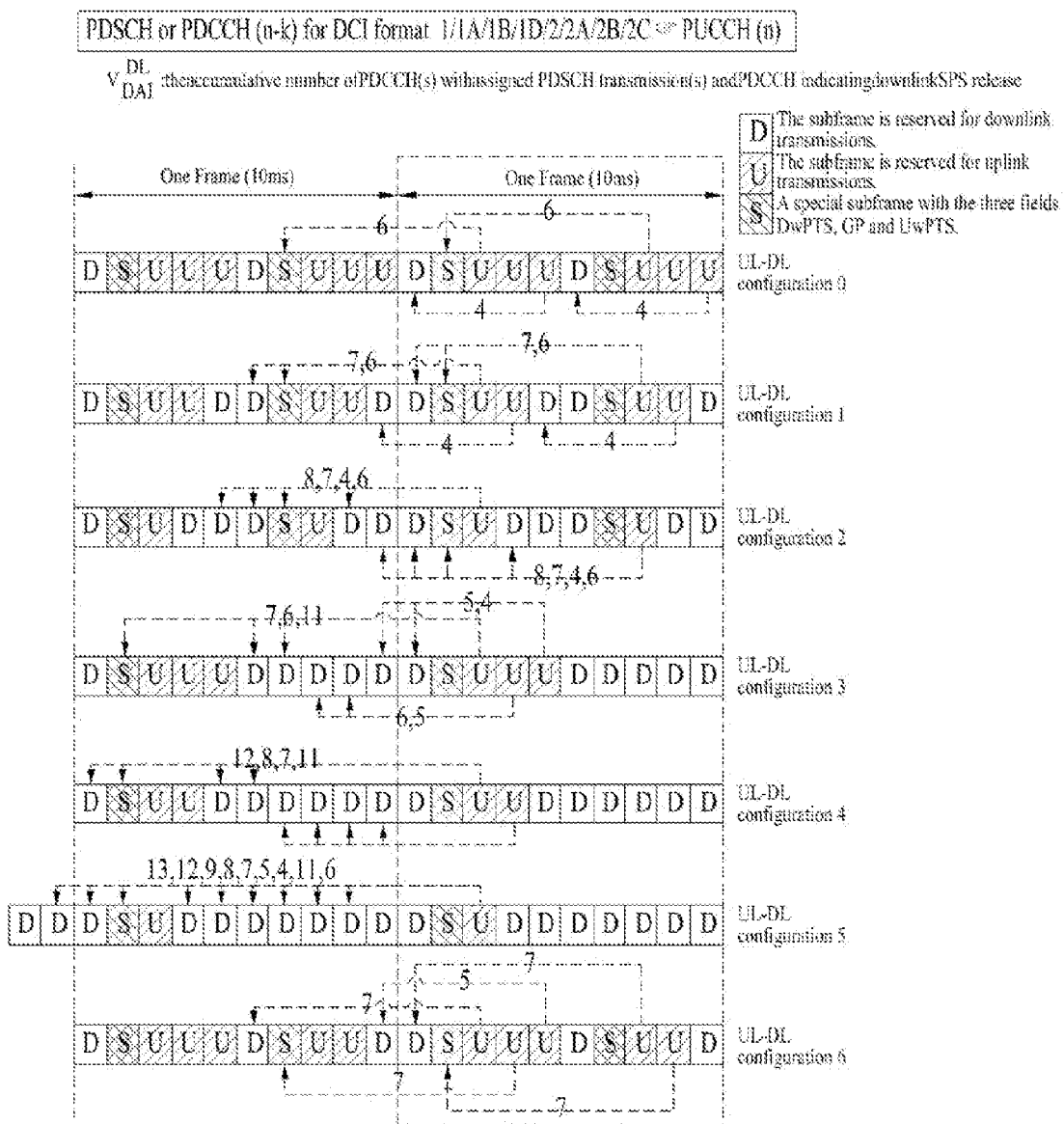
FIG. 37 is a diagram of PDSCH or PDCCH (n−4) for DCI format 1, 1A, 1B, 1D, 2, 2A, 2B, and 2C.

FIG. 37 is a diagram of PDSCH or PDCCH (n−4) for DCI format 1, 1A, 1B, 1D, 2, 2A, 2B, and 2C.

Meanwhile, detection time of a DCI format 0/4 (0 or 4) corresponding to transmission time ($n^{th}$ subframe) of PUSCH can be defined as follows.

In TDD, the DCI format 0/4 in a subframe n−k' indicates PUSCH in a subframe n.

In this case, DAI, $V_{DAI}^{UL}$ (UL-DL configuration 1-6) means the total numbers of subframes including PDSCH transmission indicating a DL SPS release in all subframes for the DCI format 0/4 and PDCCH.

Table 22 summarizes contents on UL, which is related to an index K for TDD.

TABLE 22

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |

TABLE 22-continued

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 4 | | | 4 | 4 | | | | | | |
| 5 | | | 4 | | | | | | | |
| 6 | | | 7 | 7 | 5 | | | 7 | 7 | |

Figure 38:
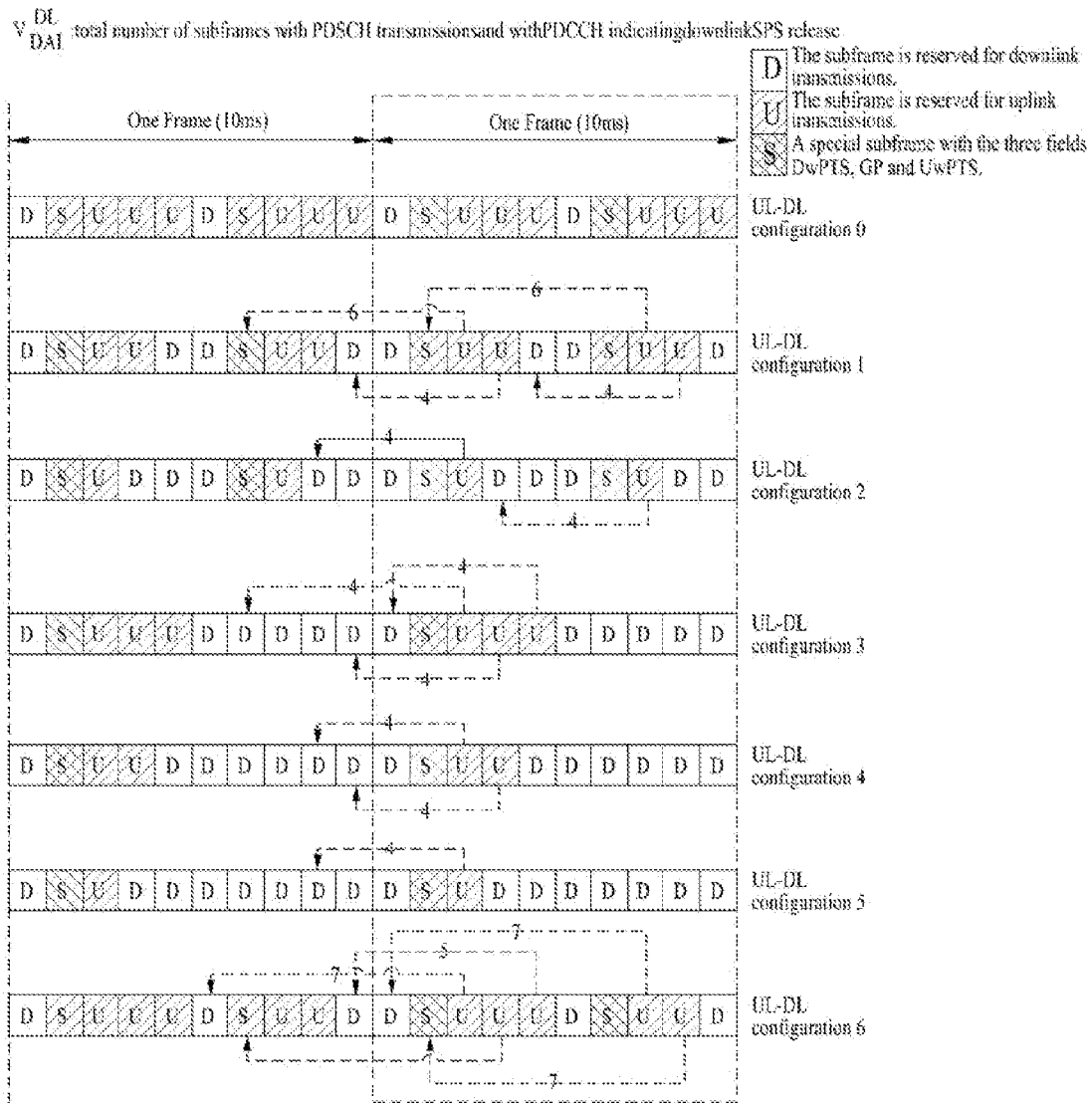
FIG. 38 is a diagram for an example of PDCCH (n−k') for DCI format 0/4 indicating PUSCH (n)

FIG. 38 is a diagram for an example of PDCCH (n−k') for DCI format 0/4 indicating PUSCH (n).

Meanwhile, PUSCH transmission time corresponding to detection time ($n^{th}$ subframe) of PDCCH or PHICH can be defined as follows.

First of all, in case of FDD and a normal HARQ operation environment, PDCCH using a DCI format 0/4 and/or PHICH transmission in a subframe n indicates PUSCH in a subframe n+4.

Secondly, in case of FDD and a subframe bundling operation environment, PDCCH using a DCI format 0 in a subframe n and/or PHICH transmission in a subframe n−5 indicates a first PUSCH in a subframe n+4.

And, in case of TDD, a normal HARQ operation environment, and UL/DL configuration 1-6 environment, PDCCH using a DCI format and/or PHICH transmission in a subframe n indicates PUSCH in a subframe n+k.

And, in case of TDD, a normal HARQ operation environment, and UL/DL configuration 0, in relation to PDCCH using a DCI format and/or PHICH transmission in a subframe n, (1) if MSB of a UL index is set to 1 in the PDCCH using uplink DCI format or if PHICH is received in a subframe 0 or 5 of a resource corresponding to $I_{PHICH}=0$, it indicates PUSCH in a subframe n+k. (2) If LSB of a UL index in a DCI format 0/4 is set to 1, if PHICH is received in a subframe 0 or 5 of a resource corresponding to $I_{PHICH}=0$, or if PHICH is received in a subframe 1 or 6, it indicates PUSCH in a subframe n+7. (3) If both MSB and LSB of a UL index in PDCCH using an uplink DCI format are set within a subframe n, it indicates PUSCH in a subframe n+k and a subframe n+7.

Meanwhile, in case of TDD, subframe bundling operation environment, and UL/DL configuration 1-6, PDCCH using a DCI format 0 in a subframe n and/or PHICH transmission in a subframe n−1 indicates first PUSCH in a subframe n+k.

And, in case of TDD, subframe bundling operation environment, and UL/DL configuration 0, in relation to PDCCH using a DCI format 0 and/or PHICH transmission in a subframe n−1, (1) if MSB of a UL index in a DCI format 0 is set to 1 or if $I_{PHICH}$ corresponds to 0, it may indicate first PUSCH in a subframe n+k. (2) In case of TDD, subframe bundling operation environment, and TDD UL/DL configuration 0, If LSB of a UL index within PDCCH using a DCI format 0 in a subframe n is set to 1 or $I_{PHICH}$ corresponds to 0, it indicates PUSCH in a subframe n+7.

Table 23 is a table summarizing k value in TDD configuration 0-6.

TABLE 23

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |

TABLE 23-continued

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 5 | | | | | | | | | 4 | |
| 6 | | 7 | 7 | | | | 7 | 7 | | 5 |

And, Table 24 is a table summarizing k value in TDD configuration 0, 1 and 6.

TABLE 24

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 9 | 6 | | | | 9 | 6 | | |
| 1 | | | 2 | | 3 | | | 2 | | 3 |
| 6 | | 5 | 5 | | | | 6 | 6 | | 8 |

Figure 39:
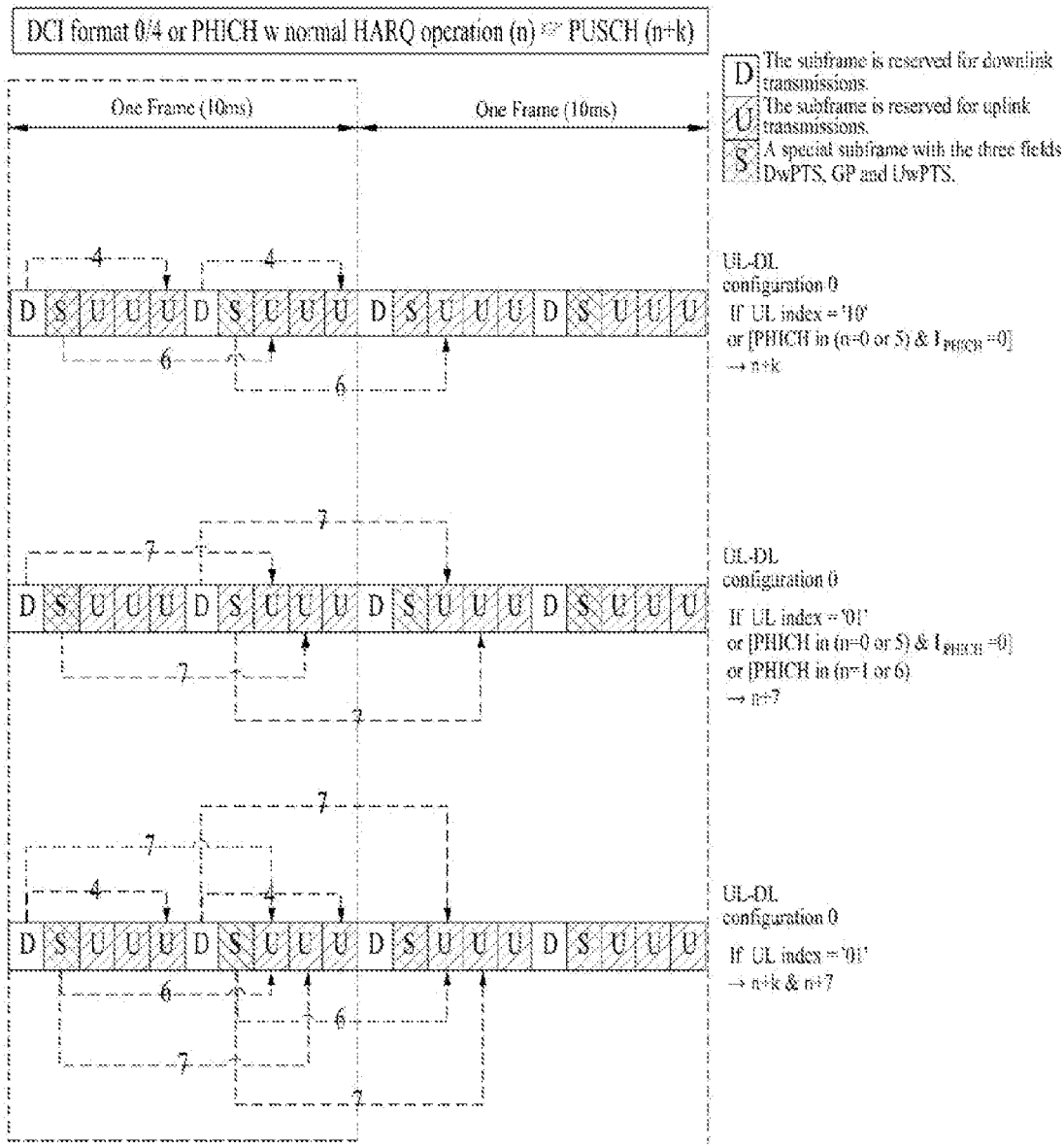
FIG. 39 is a diagram for an example that DCI format 0/4 or PHICH, which performs a normal HARQ operation, indicates PUSCH (n+k)

FIG. 39 is a diagram for an example that DCI format 0/4 or PHICH, which performs a normal HARQ operation, indicates PUSCH (n+k).

Figure 40:
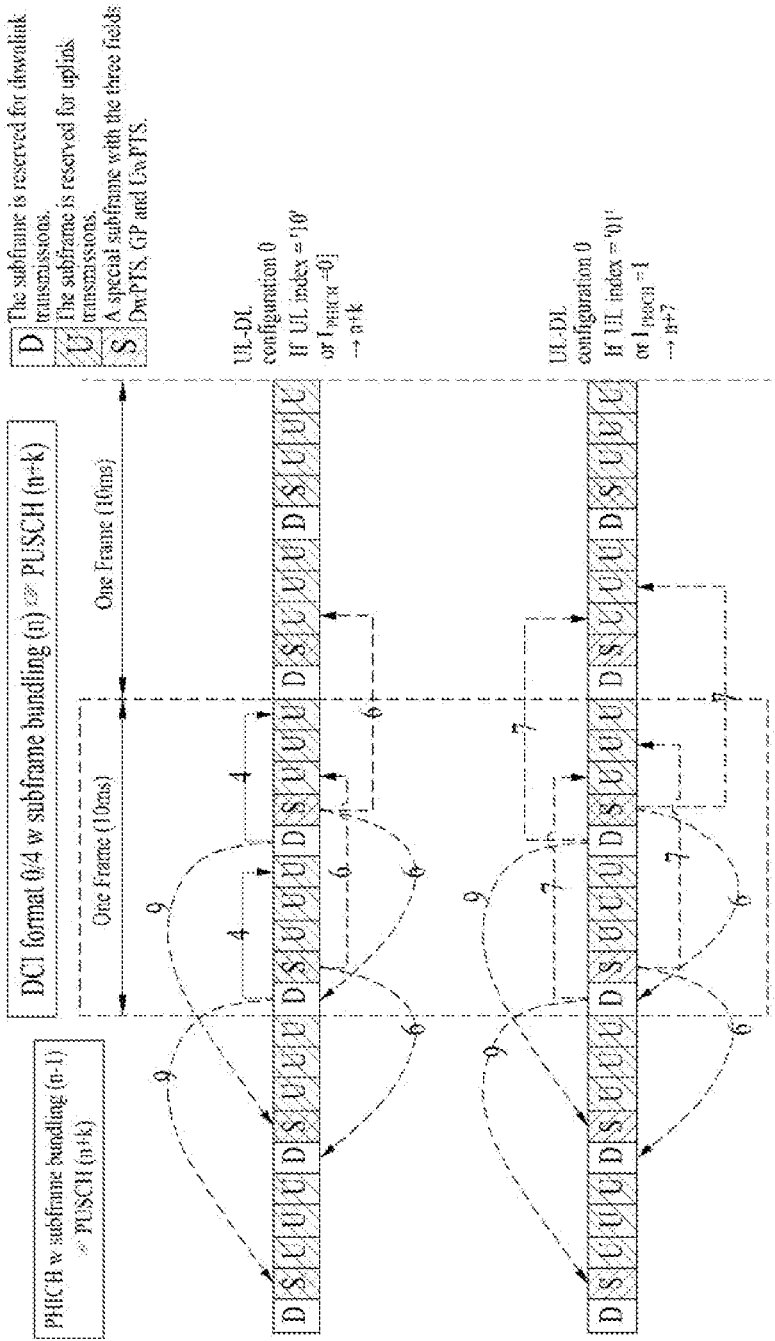
FIG. 40 is a diagram for an example that PHICH using a subframe bundling (n−1) indicates PUSCH (n+k)

FIG. 40 is a diagram for an example that PHICH using a subframe bundling (n−1) indicates PUSCH (n+k).

Figure 41:
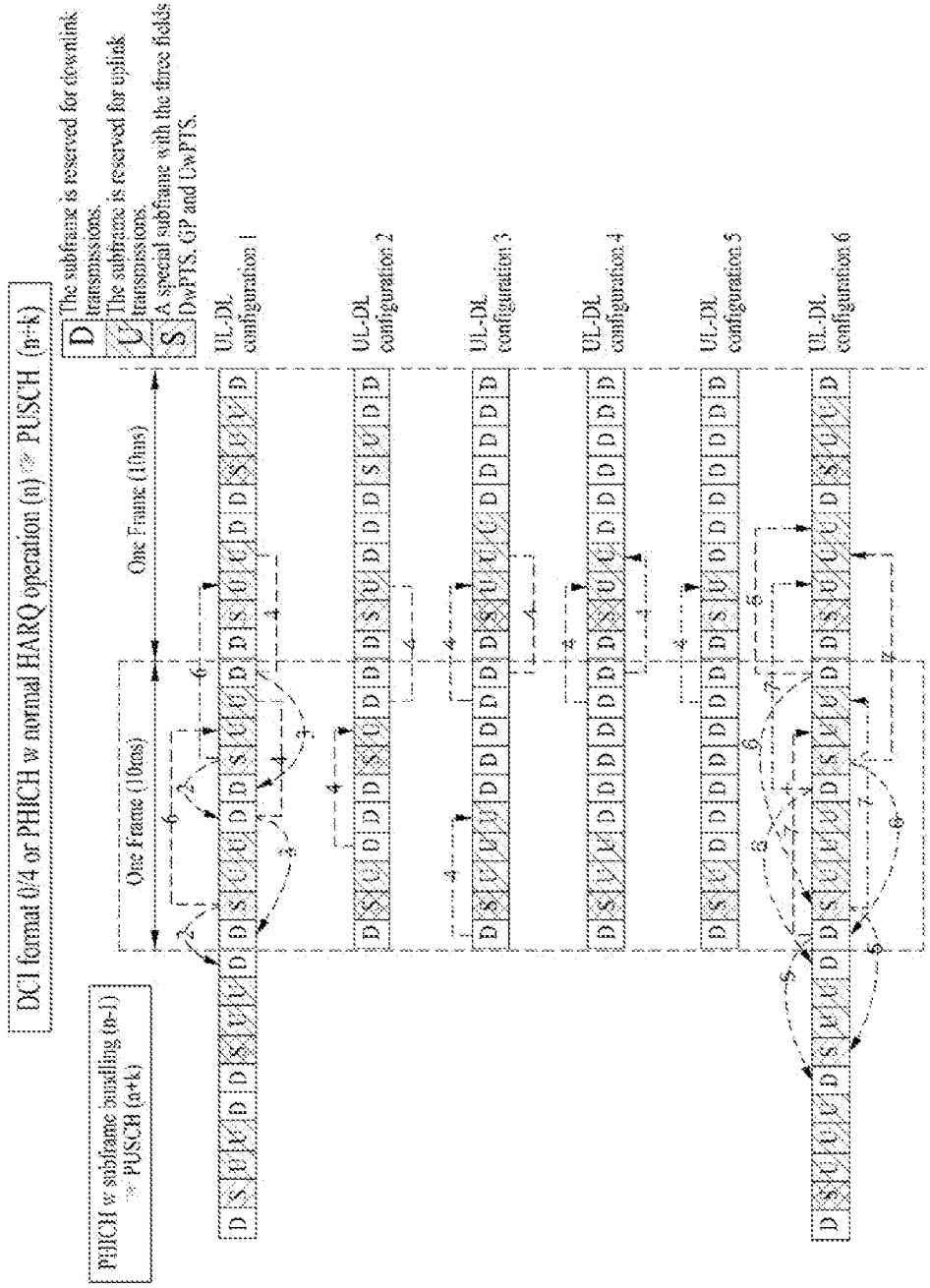
FIG. 41 is a diagram for a different example that PHICH using a subframe bundling (n−1) indicates PUSCH (n+k)

FIG. 41 is a diagram for a different example that PHICH using a subframe bundling (n−1) indicates PUSCH (n+k).

Meanwhile, PHICH reception time corresponding to transmission time ($n^{th}$ subframe) of PUSCH can be defined as follows.

In particular, in a FDD environment, PUSCH in a subframe n indicates PHICH in a subframe n+4.

Subsequently, in a TDD environment, PUSCH in a subframe n indicates PHICH in a subframe $n+k_{PHICH}$.

Table 25 indicates an example of $k_{PHICH}$ in TDD.

TABLE 25

| TDD UL/DL Configuration | subframe index | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | | 4 | 7 | 6 |
| 1 | | | | 4 | 6 | | | | 4 | 6 | |
| 2 | | | | 6 | | | | | 6 | | |
| 3 | | | | 6 | 6 | 6 | | | | | |
| 4 | | | | 6 | 6 | | | | | | |
| 5 | | | | 6 | | | | | | | |
| 6 | | | | 4 | 6 | 6 | | | 4 | 7 | |

Figure 42:
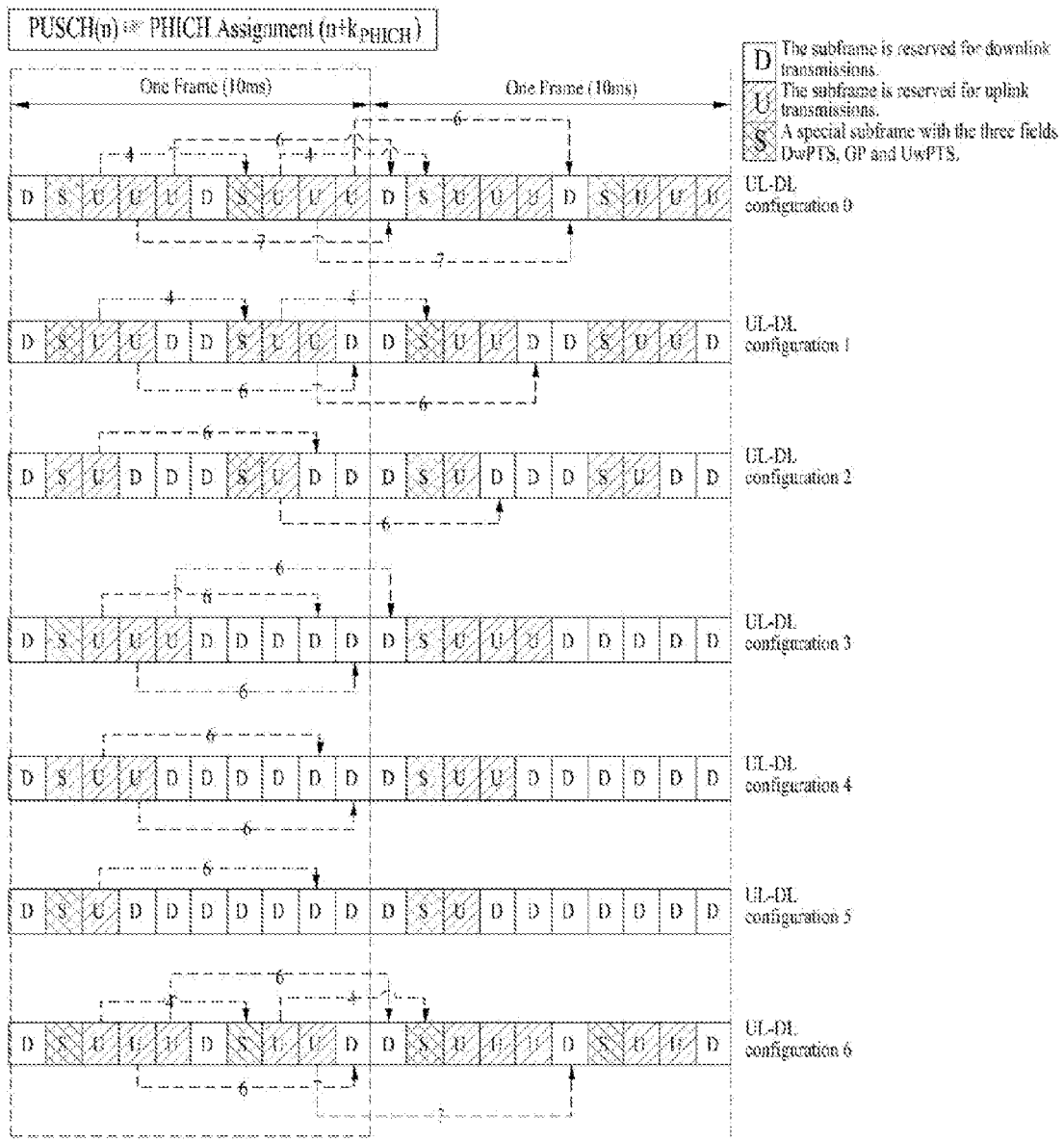
FIG. 42 is a diagram for an example that PUSCH (n) indicates PHICH in a subframe n+$k_{PHICH}$.

FIG. 42 is a diagram for an example that PUSCH (n) indicates PHICH in a subframe $n+k_{PHICH}$.

Meanwhile, reception time ($n^{th}$ subframe) of PHICH and transmission time of PUSCH corresponding to the response can be defined as follows.

First of all, in a FDD environment, PUSCH in a subframe 1-4 indicates PHICH in a subframe i.

Secondly, in case of TDD and UL/DL configuration 1-6, PUSCH in a subframe i−k indicates PHICH in a subframe i.

And, in case of TDD and UL/DL configuration 0, PUSCH in a subframe i−k indicates PHICH in a subframe i. In this case, the PUSCH in the subframe i−k may indicate PHICH in a resource corresponding to $I_{PHICH}=0$ and PUSCH in a subframe i−6 may indicate PHICH in a resource corresponding to $I_{PHICH}=1$ in a subframe i.

Table 26 indicates an example of k applied to TDD configuration 0-6.

TABLE 26

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | | 7 | 4 | | |
| 1 | | | 4 | | | 6 | | | 4 | | 6 |
| 2 | | | | | 6 | | | | | 6 | |
| 3 | | 6 | | | | | | | | 6 | 6 |
| 4 | | | | | | | | | | 6 | 6 |
| 5 | | | | | | | | | | 6 | |
| 6 | | 6 | 4 | | | | | 7 | 4 | | 6 |

Figure 43:
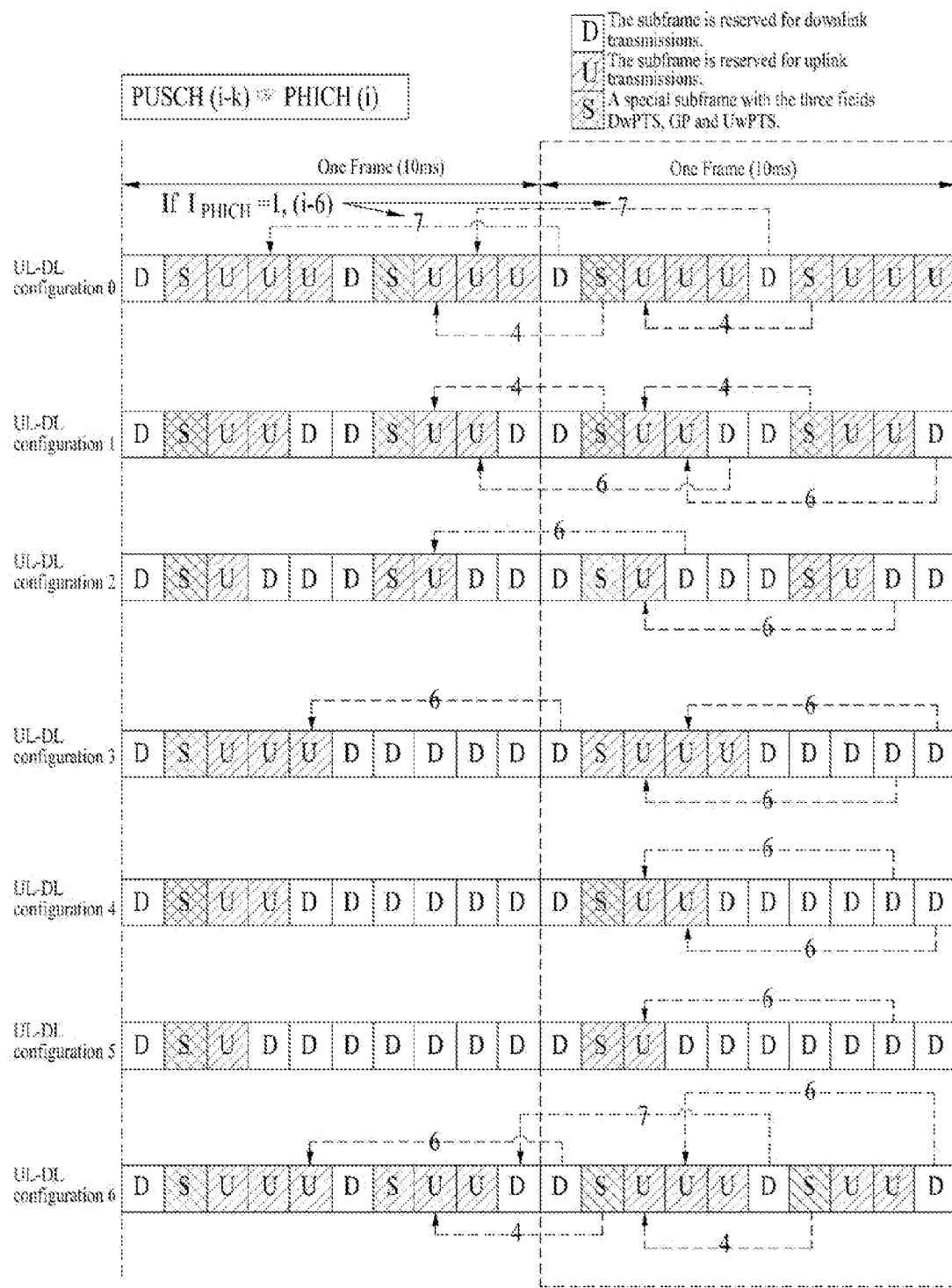
FIG. 43 is a diagram for an example that PUSCH (i−k) indicates PHICH (i)

FIG. 43 is a diagram for an example that PUSCH (i−k) indicates PHICH (i).

Meanwhile, LTE-A has discussed carrier aggregation and the carrier aggregation of maximum 5 cells is supported.

Yet, the carrier aggregation up to now has defined a method of using an identical frame structure (FDD or TDD) between configured serving cells only.

In case of using a TDD frame structure, the carrier aggregation has defined a method of using an identical UL/DL configuration between cells only.

In the following description, for clarity, the configured serving cells are simply called cells. And, for clarity, FDD and TDD can be replaced by a frame structure type 1 and a frame structure type 2, respectively in the following description.

For instance, similar to LTE-A Rel-10 TDD, if a UE has two or more RF stages, it is not necessary to use an identical UL-DL configuration between cells. In particular, a use of an identical UL-DL configuration between cells in LTE-S Rel-10 is supported to enable a UE to perform a communication with a single RF stage.

As a different example, as an inter-band CA environment is supported, if it is not able to assume that (UL) subframe boundary between cells is identically matched with each other or if UL transmission timings different from each other are defined or supported for each of the cells, it becomes available for each of the cells to use UL-DL configuration different from each other.

Moreover, each of the cells may use a FDD and a TDD frame structure different from each other.

As mentioned in the foregoing description, by using the FDD frame structure and the TDD frame structure different from each other between cells and/or by using UL/DL configuration different from each other in the TDD frame structure between cells, it may enable a base station to efficiently modify/manage configuration of the structure according to traffic load of DL and UL in a cell.

And, it may be able to efficiently modify/manage configuration of the DL and the UL according to a service type (e.g., MBSFN service) of a base station.

Hence, the present invention proposes to simultaneously configure the FDD and the TDD between cells.

In particular, the present invention intends to provide a method of transmitting control information in carrier aggregation in case that the FDD and the TDD simultaneously exist in cells.

The present invention proposes a scheme for a specific UE to efficiently support frame structures different from each other between cells.

In this case, priority of a plurality of served (or allocated) PCells or a PCell can be applied to both DL and UL or can be applied to either DL or UL.

For clarity, a method of using a plurality of uplink PCells or an uplink prioritized PCell is described in the detailed embodiment of the present invention in following description. Yet, in downlink, the present invention may be non-limited.

And, the present invention is provided to support feedback of UCI (uplink control information) via PUCCH. For clarity, although the present invention explains about HARQ ACK-NACK feedback among the UCI, the present invention may apply to such different UCI as CSI, RI, PMI, and the like as well as the ACK/NACK feedback. Moreover, the present invention can also apply to such a different signal/channel transmission as a sounding transmission.

Figure 44:
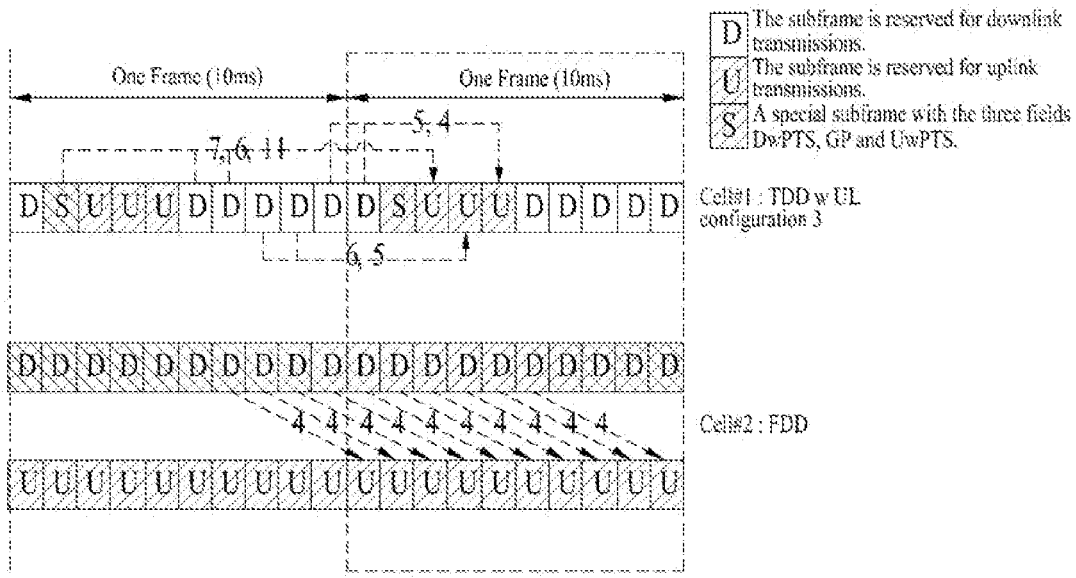
FIG. 44 is a diagram for an example of using a frame structure different from each other between cells in relation to the present invention.

FIG. 44 is a diagram for an example of using a frame structure different from each other between cells in relation to the present invention.

Referring to FIG. 44, a cell #1 uses a UL/DL configuration 3 while using a TDD frame structure. A cell #2 uses a FDD frame structure.

In FIG. 44, PUCCH transmission for A/N feedback in UL subframe in a following (right) frame among two frames is described in detail.

First of all, in case of TDD, a position of a DL subframe set, which should be transmitted in a specific UL subframe, is determined by a predetermined rule.

For instance, PUCCH transmission in a first UL subframe ($n^{th}$ subframe) transmits A/N feedback for DL transmissions performed in a seventh, a sixth, and an eleventh subframe (n−k subframe) previous of the first UL subframe.

Yet, in case of the FDD, PUCCH transmission in a $n^{th}$ UL subframe always transmits A/N feedback for DL transmission performed in a fourth subframe (n−4 subframe) previous of the $n^{th}$ UL subframe.

Since PUCCH transmission is permitted only in a single cell (PCell) in LTE-A release 10, the aforementioned PUCCH transmission timings different from each other cannot be applied as it is in LTE-A release-10.

And, it is necessary to have a rule for the number of A/N payload in transmitting a specific PUCCH.

As mentioned in the foregoing description, A/N response for a DL transmission performed in an n−k subframe is transmitted via PUCCH (if PUSCH exists in the subframe, the A/N response can be transmitted via PUSCH) in an $n^{th}$ subframe.

In this case, k value has a single value (K={$k_0$=4}) in FDD and corresponds to a set K={$k_0,k_1, \ldots k_{M-1}$} in TDD. The set may have values different from each other depending on TDD UL/DL configuration and a subframe index.

In LTE-A Rel-10 TDD, since all configured serving cells correspond to TDD and use an identical TDD UL-DL configuration, no matter what TDD UL-DL configuration of a prescribed cell is applied to the Table, its result becomes identical.

And, in LTE-A Rel-10 FDD, all configured serving cells correspond to FDD and always applies k=4 (M=1).

Hence, the present invention proposes criteria of applying the k set/values and the A/N payload and a method of using the criteria. The present invention can be identically applied to both an inter-band CA environment and an intra-band CA environment.

Yet, when the present invention is applied, the present invention may be non-limited to whether it is the inter-band CA or the intra-band CA.

And, the present invention may be non-limited to a structure actually transmitting UCI (e.g., PUCCH format 1a/1b, PUCCH format 3, PUCCH format 1b with channel selection, or the like).

LTE TDD has defined special subframes as well as DL/UL subframes.

The special subframes correspond to subframes where PDCCH and/or PDSCH assignment is available and UCI feedback may be required.

In other word, ACK/NACK feedback for the special subframes should be transmitted to a base station via UL.

Hence, for clarity, both DL subframes and the special subframes can be simply called DL (or spatial) subframes.

In the present invention, PCell(s) means a cell to which PUCCH can be transmitted thereto by a UE. On the contrary, a cell to which PUCCH is unable to be transmitted thereto is called SCell(s).

Although there is no clear name (or indication), the PCell(s) can be inferred from the cell(s) to which PUCCH can be transmitted among a plurality of cells.

Detail embodiments proposed by the present invention can be summarized as follows.

(1) First embodiment—a method of performing UCI feedback based on timing of a cell configured by FDD (2) Second embodiment—A method of performing UCI feedback based on timing of a cell configured by TDD (the second embodiment can be divided into a method of transmitting PUCCH in a cell configured by TDD only, a method of transmitting PUCCH in a cell configured by FDD only, a method of transmitting PUCCH in a cell configured by TDD only if UCI of TDD/FDD cells corresponds to a DL subframe in a cell configured by TDD, and a method of transmitting PUCCH in a cell configured by FDD only if UCI of a cell configured by the FDD corresponds to a UL subframe in a cell configured by TDD. Regarding this, it shall be described in detail).

(3) Third embodiment—a method of performing UCI feedback according to a frame structure of a PCell (4) Fourth embodiment—a method of managing multiple PCells (or multiple cell groups)

In the following description, the aforementioned each of the embodiments is explained in detail.

First Embodiment

The first embodiment of the present invention relates to a method of performing UCI feedback based on timing of a cell configured by FDD.

In particular, if there exist frame structures different from each other between cells, a system is configured to perform UCI feedback on the basis of a FDD (frame structure type 1) cell.

The aforementioned configuration can be set to perform the UCI feedback irrespective of a cell type (PCell or SCell) and a cell index. Or, the configuration can also be set to perform the UCI feedback according to the cell type and the cell index.

For instance, the system is configured to always perform the UCI feedback on the basis of a frame structure of a PCell and a FDD cell can be configured as the PCell.

In this case, the PCell can be configured as a cell including a lowest cell index (e.g., ServCellIndex) without an explicit indication.

Figure 45:
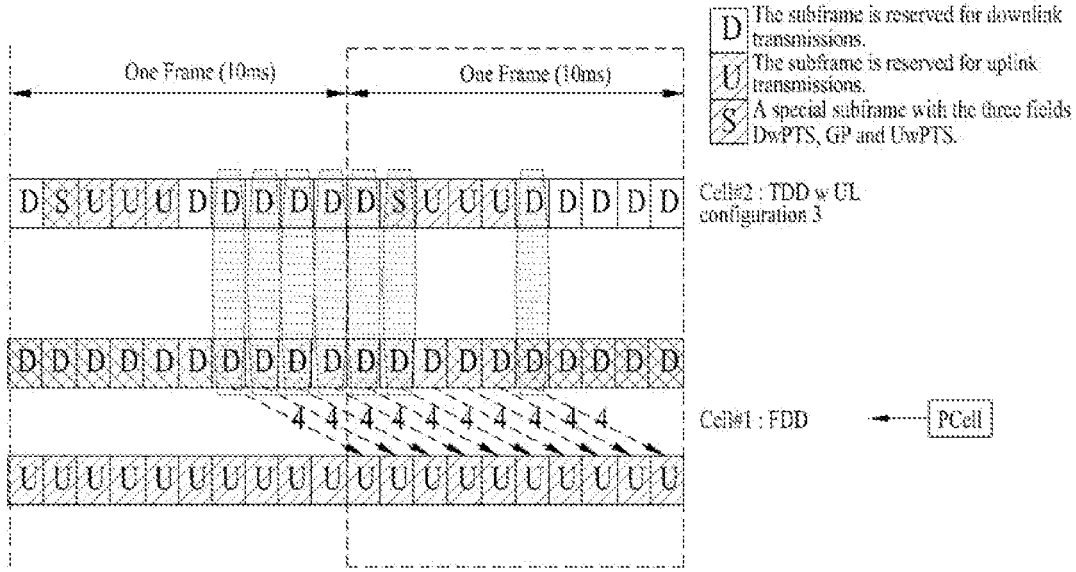
FIG. 45 is a diagram for an example of performing UCI feedback based on a cell configured by FDD in relation to the present invention.

FIG. 45 is a diagram for an example of performing UCI feedback based on a cell configured by FDD in relation to the present invention.

FIG. 45 indicates a relation between PUCCH transmission in a second frame among two frames and DL transmission in a previous subframe(s).

In FIG. 45, a cell #1 is configured by FDD (frame structure type 1) and a cell #2 is configured by TDD (frame structure type 2). In this case, the cell #1 using the FDD is configured as a PCell. (In this case, a cell having a lower index may be configured as the PCell).

And, a UE transmits A/N feedback for a DL transmission, which is transmitted in a subframe where n-k, k=4 according to a legacy UCI transmission scheme in FDD (or PCell), via PUCCH in $n^{th}$ subframe.

In this case, when there exists a different cell configured by TDD, if the subframe where n-k, k=4 of the cell configured by TDD corresponds to a DL (or special) subframe, A/N feedback for a DL transmission performed in the corresponding DL subframe and A/N feedback for the corresponding subframe in FDD (or PCell) are transmitted together in a manner of being multiplexed or bundled.

Meanwhile, as mentioned in the foregoing description, various methods of simultaneously transmitting A/N information of a FDD cell and that of a TDD cell can be used.

(1) First of all, a multiplexing scheme can be used. In particular, A/N information of corresponding (identical timing) subframes between the FDD cell and the TDD cell is transmitted in a manner of being multiplexed. Since the A/N information of the TDD cell is added, more increased A/N payload is transmitted compared to a case that there exist cells configured by FDD only.

If there exist cells configured by FDD only and bundling is not used in each subframe, payload may correspond to $$\sum_{i=0}^{no.\ of\ configured\ serving\ cell-1} TB_i$$

(In this case, $TB_i$ is the number of transport blocks configured according to a cell. In case of LTE release 10, the $TB_i$ corresponds to 1 or 2).

If a spatial bundling (bundling between codewords) is used, the payload is identical to the number of configured serving cells.

Yet, when TDD cell(s) exist, regarding the payload in each subframe, the payload increases (for instance, if bundling is not used, the payload increases as much as $$\sum_{i=0}^{no.\ of\ configured\ TDD\ serving\ cell-1} TB_i,$$

if spatial bundling is used, the payload increases as much as no. of configured TDD serving cell) in a position of a DL (or special) subframe in TDD cell(s). The payload is maintained as it is in a position of a UL subframe in TDD cell(s).

Meanwhile, in case that there exist FDD cell(s) and a plurality of TDD cells, all A/N of a plurality of the TDD cells can be separately multiplexed. Or, all A/N of a plurality of the TDD cells are bundled and the bundled A/N may be multiplexed with A/N of the FDD cell.

(2) Subsequently, a bundling scheme can be used. In particular, A/N informations of both a FDD cell and a TDD cell are transmitted in a manner of being bundled. A/N payload, which is identical to the payload of a case that cells are configured by FDD only, should be maintained. In this case, bundling means a logical AND (or OR) operation.

(3) And, a multiplexing or bundling scheme according to a payload can be used. A system can be configured to differently apply the aforementioned multiplexing scheme and the bundling scheme in accordance with a payload.

For instance, if a payload is less than 4-bit, multiplexing is performed. If a payload is greater than 4-bit, bundling is performed.

If the above criteria of the payload are determined by transmitting A/N information via PUCCH format 1b with channel selection, it may effectively reduce bundling loss.

As a different example, if a payload is less than 20-bit, it is able to make multiplexing to be performed and if a payload is greater than 20-bit, it is able to make bundling to be performed.

If the above criteria of the payload are determined by transmitting A/N information via PUCCH format 3, it may effectively reduce bundling loss.

Meanwhile, the aforementioned (1), (2), and/or (3) schemes can be configured in advance or can be separately configured by a higher layer configuration.

Second Embodiment

The second embodiment of the present invention corresponds to a method of performing UCI feedback based on timing of a cell configured by TDD.

According to the second embodiment, if there exist frame structures different from each other between cells, a system is configured to perform UCI feedback on the basis of a TDD (frame structure type 2) cell.

The aforementioned configuration can be set to perform the UCI feedback irrespective of a cell type (PCell or SCell) and a cell index. Or, the configuration can also be set to perform the UCI feedback according to the cell type and the cell index.

For instance, a system is configured to always perform the UCI feedback on the basis of a frame structure of PCell and a TDD cell can be configured as the PCell. In this case, the PCell can be configured as a cell including a lowest cell index (e.g., ServCellIndex) without an explicit indication.

Meanwhile, the second embodiment can be divided into a method of transmitting PUCCH in a cell configured by TDD only, a method of transmitting PUCCH in a cell configured by FDD only, a method of transmitting PUCCH in a cell configured by TDD only if UCI of TDD/FDD cells corresponds to a DL subframe in a cell configured by TDD, and a method of transmitting PUCCH in a cell configured by FDD only if UCI of a cell configured by the FDD corresponds to a UL subframe in a cell configured by TDD.

In the following description, each of the methods of the second embodiment is explained in detail.

1. A Method of Transmitting PUCCH in a Cell Configured by TDD Only

Figure 46:
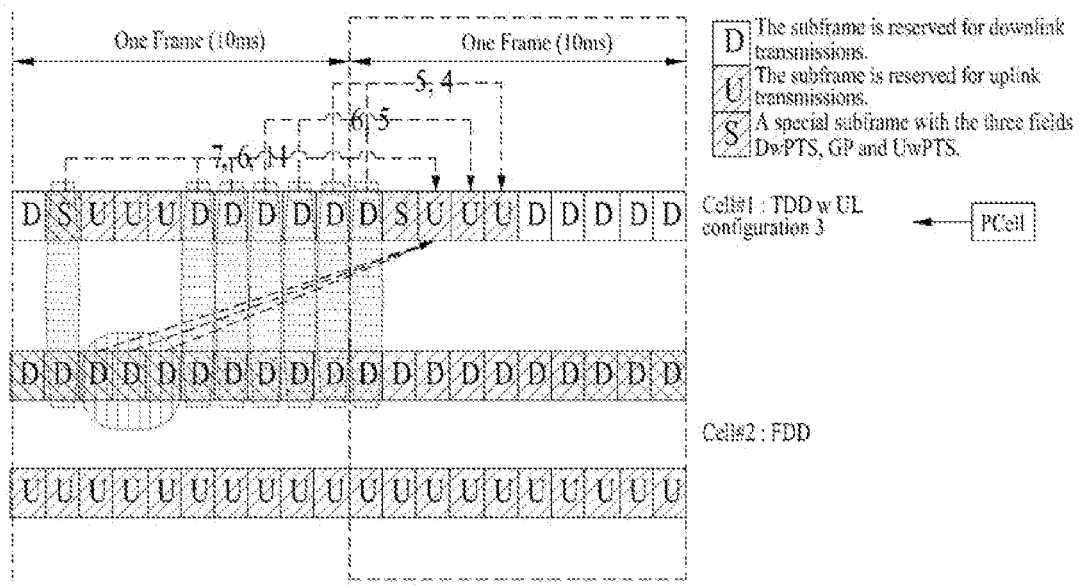
FIG. 46 is a detailed diagram for an example that PUCCH is transmitted in a cell configured by TDD only in relation to the present invention.

FIG. 46 is a detailed diagram for an example that PUCCH is transmitted in a cell configured by TDD only in relation to the present invention.

FIG. 46 indicates a relation between a PUCCH transmission in a second frame among two frames and a DL transmission in a previous subframe(s).

In FIG. 46, a cell #1 is configured by TDD (frame structure type 2) and a cell #2 is configured by FDD (frame structure type 1). In this case, the cell #1 using the TDD is configured as a PCell. (In this case, a cell having a lower index may be configured as the PCell).

And, a UE transmits A/N feedback for a DL transmission, which is transmitted in k-$k_m$ ($k_m \in K$, K={$k_0, k_1, \ldots k_{M-1}$}) subframe according to a legacy UCI transmission scheme in TDD (or PCell), via PUCCH in $n^{th}$ subframe.

In this case, if there exists a different cell configured by FDD, the PUCCH is transmitted in a cell (or PCell) configured by TDD. As depicted in FIG. 46 in a manner of being bundled between cells, A/N feedback for a DL transmission performed in the k-$k_m$ subframe of the cell configured by FDD and A/N feedback for the corresponding subframe in TDD (or PCell) are transmitted together in a manner of being multiplexed or bundled.

In this case, as depicted in FIG. 46, there exist DL subframes of the FDD cell corresponding to a UL subframe of the TDD cell such as 3~5 subframes of a first frame represented by vertical lines in the FDD cell.

Hence, A/N information of the FDD cell, which does not have a corresponding DL subframe (or special subframe) in the TDD cell, and A/N feedback in a UL subframe (third subframe (first UL subframe) in the second frame in the example of FIG. 46) to which A/N information feedback of a DL (or special) subframe of the TDD cell is transmitted are transmitted in a manner of being multiplexed or bundled.

As mentioned in the foregoing description, various methods of simultaneously transmitting A/N information of a FDD cell and that of a TDD cell can be used.

(1) First of all, a multiplexing scheme can be used. In particular, the A/N information of corresponding (identical timing) subframes between the FDD cell and the TDD cell is transmitted in a manner of being multiplexed. Since the A/N information of the FDD cell is added, more increased A/N payload is transmitted compared to a case that there exist cells configured by TDD only.

Meanwhile, in case that there exist cells configured by TDD only, (in case that both spatial bundling (bundling between codewords (or transports)) and time-domain bundling (bundling between subframes) are not used) payload in each subframe corresponds to $$\sum_{i=0}^{no.\ of\ configured\ serving\ cell-1} TB_i \cdot M$$

(In this case, $TB_i$ is the number of transport blocks configured according to a cell. In case of LTE release 10, the $TB_i$ corresponds to 1 or 2. M is a bundling window and can be determined by Table 10.1.3.1-1 of TS 36.213 v10.1.0.).

In case of using the spatial bundling only, the payload corresponds to $$\sum_{i=0}^{no.\ of\ configured\ serving\ cell-1} M.$$

When FDD cell(s) exist, regarding the payload in each subframe, the payload increases in a position of a DL (or special) subframe in the TDD cell(s) (for instance, in case that bundling is not used, the payload increases as much as $$\sum_{i=0}^{no.\ of\ configured\_FDD\ serving\ cell-1} TB_i \cdot M.$$

In case that the spatial bundling is used, the payload increases as much as $$\left.\sum_{i=0}^{no.\ of\ configured\_FDD\ serving\ cell-1} M.\right)$$

And, in order to multiplex A/N information for a subframe of the FDD cell corresponding to the TDD cell where a DL (or special) subframe does not exist, the payload increases more according to the contiguous number of the UL subframes in a position of a subframe adjacent (predetermined) to a position of a UL subframe of the TDD cell(s). (For instance, in case of not using bundling, the payload increases as much as (no. of consecutiveULsubframeinTDD)·

$$\sum_{i=0}^{no.\ of\ configured\_TDD\ serving\ cell-1} TB_i \cdot M$$

and in case of using the spatial bundling, the payload increases as much as (no. of consecutiveULsubframeinTDD)·

$$\left.\sum_{i=0}^{no.\ of\ configured\_FDD\ serving\ cell-1} M.\right)$$

And, the A/N information for a subframe of the FDD cell corresponding to the TDD cell where a DL (or special) subframe does not exist can be transmitted by performing a time-domain bundling. In this case, the payload increases according to the contiguous number of the UL subframes in a position of a subframe adjacent (predetermined) to a position of a UL subframe of the TDD cell(s). (For instance, in case of not using bundling, the payload increases as much as $$\sum_{i=0}^{no.\ of\ configured\_TDD\ serving\ cell-1} TB_i \cdot M$$

and in case of using the spatial bundling, the payload increases as much as $$\left.\sum_{i=0}^{no.\ of\ configured\_FDD\ serving\ cell-1} M.\right)$$

And, the time-domain bundling is performed for the A/N information for a subframe of the FDD cell corresponding to the TDD cell where a DL (or special) subframe does not exist. A bundling can be performed again for the time-domain bundled A/N information and A/N informations in a subframe adjacent (predetermined) to a position of a UL subframe in the TDD cell(s) (For clarity, it is explained as 2 types of bundling applied according to an order. Yet, only one bundling for all information may have an identical result). In this case, A/N transmission can be performed without an additional payload increase for the A/N information for a subframe of the FDD cell corresponding to the TDD cell where a DL (or special) subframe does not exist.

And, in case that TDD cell(s) and a plurality of FDD cells exist, all A/N of a plurality of the FDD cells can be separately multiplexed. Or, bundling is performed for the A/N of a plurality of the FDD cells and the bundled A/N may be multiplexed with A/N of the TDD cell.

(2) Subsequently, a bundling scheme can be used. In particular, A/N informations in an identical subframe of both a FDD cell and a TDD cell are transmitted in a manner of being bundled. A/N payload, which is identical to the A/N payload of a case that cells are configured by TDD only, should be maintained (in a position corresponding to a UL subframe of TDD). In this case, bundling means a logical AND (or OR) operation.

First of all, in order to multiplex A/N information for a subframe of the FDD cell corresponding to the TDD cell where a DL (or special) subframe does not exist, payload increases more according to the contiguous number of the UL subframes in a position of a subframe adjacent (predetermined) to a position of a UL subframe of the TDD cell(s). (For instance, in case of not using bundling, the payload increases as much as (no. of consecutiveULsubframeinTDD)·

$$\sum_{i=0}^{no.\ of\ configured\ TDD\ serving\ cell-1} TB_i \cdot M$$

and in case of using the spatial bundling, the payload increases as much as (no. of consecutiveULsubframeinTDD)·

$$\sum_{i=0}^{no.\ of\ configured\ FDD\ serving\ cell-1} M.\Bigg)$$

And, the A/N information for a subframe of the FDD cell corresponding to the TDD cell where a DL (or special) subframe does not exist can be transmitted by performing a time-domain bundling. In this case, the payload increases according to the contiguous number of the UL subframes in a position of a subframe adjacent (predetermined) to a position of a UL subframe of the TDD cell(s). (For instance, in case of not using bundling, the payload increases as much as $$\sum_{i=0}^{no.\ of\ configured\ TDD\ serving\ cell-1} TB_i \cdot M$$

and in case of using the spatial bundling, the payload increases as much as $$\sum_{i=0}^{no.\ of\ configured\ FDD\ serving\ cell-1} M.\Bigg)$$

And, the time-domain bundling is performed for the A/N information for a subframe of the FDD cell corresponding to the TDD cell where a DL (or special) subframe does not exist. A bundling can be performed again for the time-domain bundled A/N information and A/N informations in a subframe adjacent (predetermined) to a position of a UL subframe in the TDD cell(s) (For clarity, it is explained as 2 types of bundling applied according to an order. Yet, only one bundling for all information may have an identical result). In this case, A/N transmission can be performed without an additional payload increase for the A/N information for a subframe of the FDD cell corresponding to the TDD cell where a DL (or special) subframe does not exist.

(3) And, a multiplexing or bundling scheme according to a payload can be used. A system can be configured to differently apply the aforementioned multiplexing scheme and the bundling scheme in accordance with a payload.

For instance, if a payload is less than 4-bit, multiplexing is performed. If a payload is greater than 4-bit, bundling is performed.

If the above criteria of the payload are determined by transmitting A/N information via PUCCH format 1b with channel selection, it may effectively reduce bundling loss.

As a different example, if a payload is less than 20-bit, it is able to make multiplexing to be performed and if a payload is greater than 20-bit, it is able to make bundling to be performed. If the above criteria of the payload are determined by transmitting A/N information via PUCCH format 3, it may effectively reduce bundling loss.

The aforementioned (1), (2), or (3) schemes can be configured in advance or can be separately configured by a higher layer configuration.

2. A Method of Transmitting PUCCH in a Cell Configured by FDD Only

Figure 47:
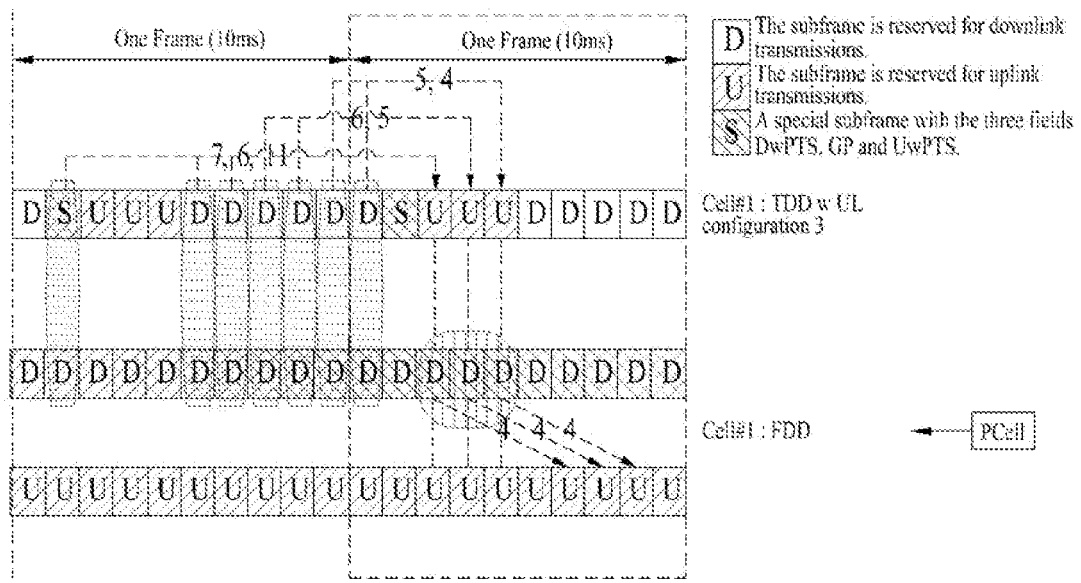
FIG. 47 is a detailed diagram for an example that PUCCH is transmitted in a cell configured by FDD only in relation to the present invention.

FIG. 47 is a diagram for an example that PUCCH is transmitted in a cell configured by FDD only in relation to the present invention.

FIG. 47 indicates a relation between a PUCCH transmission in a second frame among two frames and a DL transmission in a previous subframe(s).

In FIG. 47, a cell #1 is configured by TDD (frame structure type 2) and a cell #2 is configured by FDD (frame structure type 1). In this case, the cell #1 using the TDD is configured as a PCell. (In this case, a cell having a lower index may be configured as the PCell).

And, a UE transmits A/N feedback for a DL transmission, which is transmitted in $k-k_m$ ($k_m \in K$, $K=\{k_0, k_1, \ldots k_{M-1}\}$ in Table 10.1.3.1-1 of Ts 36.213 v10.1.0) subframe according to a legacy UCI transmission scheme in TDD (or PCell), via PUCCH in $n^{th}$ subframe.

In this case, if there exists a different cell configured by FDD, the PUCCH is transmitted to a cell (or PCell) configured by FDD. As depicted in drawing d in a manner of being bundled between cells, A/N feedback for a DL transmission performed in the $k-k_m$ subframe of the cell configured by FDD and A/N feedback for the corresponding subframe in TDD (or PCell) are transmitted together in a manner of being multiplexed or bundled.

In this case, as depicted in FIG. 47, there exist DL subframes of the FDD cell corresponding to positions of UL subframes of the TDD cell such as 3~5 subframes of a second frame represented by vertical lines in the FDD cell.

The A/N information of the FDD cell corresponding to the TDD cell where a DL subframe (or special subframe) does not exist follows A/N transmission timing of an original cell configured by FDD only.

In particular, the A/N information for a subframe where n-k, k=4 is transmitted in $n^{th}$ subframe of the FDD cell.

Via the PUCCH of a cell configured by FDD, A/N for subframes corresponding to a position of (DL or special) subframe of a cell configured by TDD follows a timing relation $(k-k_m(k_m \in K, K=\{k_0, k_1, \ldots k_{M-1}\}$ in Table 10.1.3.1-1 of TS 36.213 v10.1.0)) in TDD. The A/N for the subframes corresponding to the position of a UL subframe of the cell configured by TDD follows a timing relation (n-k, k=4) of an original FDD.

A UE transmits A/N feedback for a DL transmission, which is transmitted in $k-k_m$ ($k_m \in K$, $K=\{k_0, k_1, \ldots k_{M-1}\}$) subframe according to a legacy UCI transmission scheme in TDD (or PCell), via PUCCH in $n^{th}$ subframe.

In this case, if there exists a different cell configured by FDD, the PUCCH is transmitted in a cell (or PCell) configured by TDD. As depicted in a drawing c in a manner of being bundled between cells, A/N feedback for a DL transmission performed in the k–k$_m$ subframe of the cell configured by FDD and A/N feedback for the corresponding subframe in TDD (or PCell) are transmitted together in a manner of being multiplexed or bundled.

Unlike the aforementioned description, the A/N for the subframes of the FDD cell corresponding to a position of a UL subframe of the cell configured by TDD is identically maintained with a payload of the original FDD.

As mentioned in the foregoing description, various methods can be used to simultaneously transmit A/N information of corresponding (identical timing) subframes between the TDD cell and the FDD cell.

(1) First of all, a multiplexing scheme can be used. The multiplexing scheme is to transmit A/N information of corresponding (identical timing) subframes between a FDD cell and a TDD cell in a manner of multiplexing. In particular, since the A/N information of the TDD cell is added, more increased A/N payload is transmitted compared to a case that there exist cells configured by FDD only.

If there exist FDD cells only and bundling is not used in each subframe, the payload may correspond to $$\sum_{i=0}^{no.\ of\ configured\ serving\ cell-1} TB_i$$

(In this case, TB$_i$ is the number of transport blocks configured according to a cell. In case of LTE release 10, the TB$_i$ corresponds to 1 or 2).

If a spatial bundling (bundling between codewords) is used, the payload is identical to the number of configured serving cells. Yet, when TDD cell(s) exist, the payload in each subframe is described in the following. The payload increases (for instance, if bundling is not used, the payload increases as much as $$\sum_{i=0}^{no.\ of\ configured\ TDD\ serving\ cell-1} TB_i,$$

if spatial bundling is used, the payload increases as much as no. of configured TDD serving cell) in a position of a DL (or special) subframe in TDD cell(s). The payload is maintained as it is in a position of a UL subframe in TDD cell(s).

Meanwhile, in case that there exist a FDD cell(s) and a plurality of TDD cells, all A/N of a plurality of the TDD cells can be separately multiplexed. Or, all A/N of a plurality of the TDD cells are bundled and the bundled A/N may be multiplexed with A/N of the FDD cell.

(2) Subsequently, a bundling scheme can be used. In particular, A/N informations of both a FDD cell and a TDD cell are transmitted in a manner of being bundled. A/N payload, which is identical to the payload of a case that cells are configured by FDD only, should be maintained. In this case, bundling means a logical AND (or OR) operation.

(3) And, a multiplexing or bundling scheme according to a payload can be used. A system can be configured to differently apply the aforementioned multiplexing scheme and the bundling scheme in accordance with a payload.

For instance, if a payload is less than 4-bit, multiplexing is performed. If a payload is greater than 4-bit, bundling is performed.

If the above criteria of the payload are determined by transmitting A/N information via PUCCH format 1b with channel selection, it may effectively reduce bundling loss.

As a different example, if a payload is less than 20-bit, it is able to make multiplexing to be performed and if a payload is greater than 20-bit, it is able to make bundling to be performed. If the above criteria of the payload are determined by transmitting A/N information via PUCCH format 3, it may effectively reduce bundling loss.

Meanwhile, the aforementioned (1), (2), or (3) schemes can be configured in advance or can be separately configured by a higher layer configuration.

3. A Method of Transmitting PUCCH in a Cell Configured by TDD Only if UCI of TDD/FDD Cells Corresponds to a DL Subframe in a Cell Configured by TDD, and a Method of Transmitting PUCCH in a Cell Configured by FDD Only if UCI of a Cell Configured by the FDD Corresponds to a UL Subframe in a Cell Configured by TDD FIG. 48 is a diagram for an example of performing UCI feedback based on a cell configured by TDD in relation to the present invention.

Figure 48:
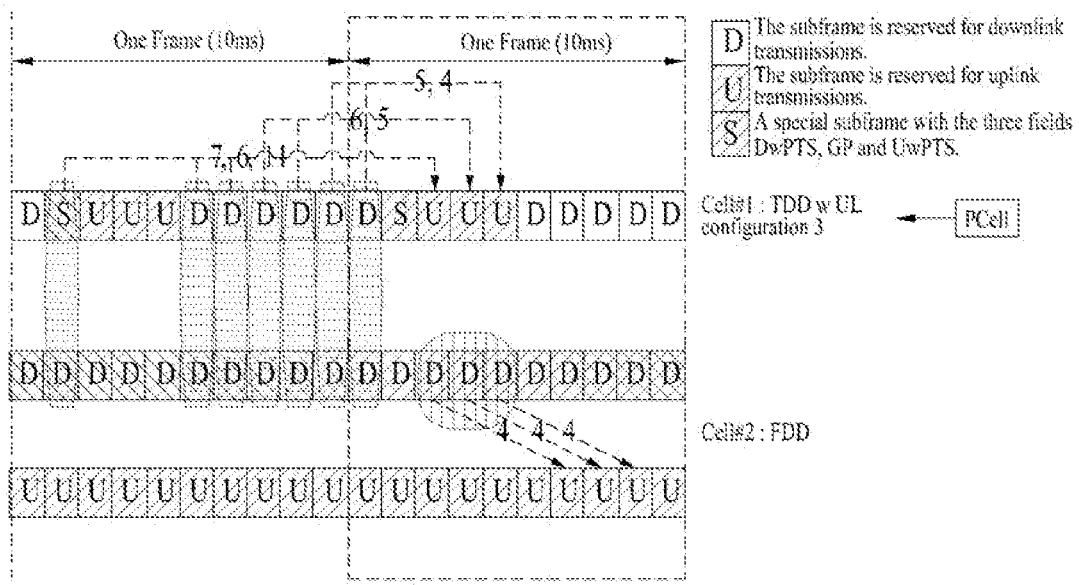
FIG. 48 is a diagram for an example of performing UCI feedback based on a cell configured by TDD in relation to the present invention.

FIG. 48 indicates a relation between a PUCCH transmission in a second frame among two frames and a DL transmission of a previous subframe(s).

Referring to FIG. 48, a cell #1 is configured by TDD (frame structure type 2) and a cell #2 is configured by FDD (frame structure type 1).

In this case, for clarity, the cell #1 is represented as a PCell. Yet, the PCell may become either a TDD cell or a FDD cell.

A UE transmits A/N feedback for a DL transmission, which is transmitted in k–k$_m$ (k$_m \in$K, K={k$_0$,k$_1$, ... k$_{M-1}$} in Table 10.1.3.1-1 of Ts 36.213 v10.1.0) subframe according to a legacy UCI transmission scheme in TDD (or PCell), via PUCCH in n$^{th}$ subframe of a cell configured by TDD.

In this case, if there exists a different cell configured by FDD, as depicted in FIG. 48 in a manner of being bundled between cells, A/N feedback for a DL transmission performed in the k–k$_m$ k subframe of the cell configured by FDD and A/N feedback for the corresponding subframe in TDD (or PCell) are transmitted together in a manner of being multiplexed or bundled.

And, as depicted in FIG. 48, there exist DL subframes of the FDD cell corresponding to positions of UL subframes of the TDD cell such as 3~5 subframes of a second frame represented by vertical lines in the FDD cell. The A/N information of the FDD cell corresponding to the TDD cell where a DL subframe (or special subframe) does not exist follows A/N transmission timing of an original cell configured by FDD only. In particular, the A/N information for a subframe where n–k, k=4 is transmitted in n$^{th}$ subframe of the FDD cell.

As mentioned in the foregoing description, various methods can be used to simultaneously transmit A/N information of corresponding (identical timing) subframes between the TDD cell and the FDD cell.

(1) First of all, a multiplexing scheme can be used. The multiplexing scheme is to transmit A/N information of corresponding (identical timing) subframes between a FDD cell and a TDD cell in a manner of multiplexing.

In particular, since the A/N information of the TDD cell or the FDD cell is added, more increased A/N payload is transmitted compared to a case that there exist cells configured by FDD or TDD only.

Meanwhile, in case that there exist cells configured by TDD only, (both spatial bundling (bundling between codewords (or transports)) and time-domain bundling (bundling between subframes) are not used) payload in each subframe corresponds to $$\sum_{i=0}^{no.\ of\ configured\ serving\ cell-1} TB_i \cdot M$$

(In this case, $TB_i$ is the number of transport blocks configured according to a cell. In case of LTE release 10, the $TB_i$ corresponds to 1 or 2. M is a bundling window and can be determined by Table 10.1.3.1-1 of TS 36.213 v10.1.0.). In case of using the spatial bundling only, the payload corresponds to $$\sum_{i=0}^{no.\ of\ configured\ serving\ cell-1} M.$$

When FDD cell(s) exist, the payload in each subframe is described in the following. The payload increases in a position of a DL (or special) subframe in the TDD cell(s). (For instance, in case that bundling is not used, the payload increases as much as $$\sum_{i=0}^{no.\ of\ configured\ FDD\ serving\ cell-1} TB_i \cdot M.$$

In case that the spatial bundling is used, the payload increases as much as $$\sum_{i=0}^{no.\ of\ configured\ FDD\ serving\ cell-1} M.\Big)$$

Meanwhile, in case that there exist a TDD cell(s) and a plurality of FDD cells, all A/N of a plurality of the FDD cells can be separately multiplexed. Or, all A/N of a plurality of the FDD cells are bundled and the bundled A/N may be multiplexed with A/N of the TDD cell.

(2) Subsequently, a bundling scheme can be used. In particular, A/N informations of both a FDD cell and a TDD cell are transmitted in a manner of being bundled. A/N payload, which is identical to the payload of a case that cells are configured by FDD only, should be maintained. In this case, bundling means a logical AND (or OR) operation.

(3) And, a multiplexing or bundling scheme according to a payload can be used. A system can be configured to differently apply the aforementioned multiplexing scheme and the bundling scheme in accordance with a payload.

For instance, if a payload is less than 4-bit, multiplexing is performed. If a payload is greater than 4-bit, bundling is performed. If the above criteria of the payload are determined by transmitting A/N information via PUCCH format 1b with channel selection, it may effectively reduce bundling loss. As a different example, if a payload is less than 20-bit, it is able to make multiplexing to be performed and if a payload is greater than 20-bit, it is able to make bundling to be performed. If the above criteria of the payload are determined by transmitting A/N information via PUCCH format 3, it may effectively reduce bundling loss.

Meanwhile, the aforementioned (1), (2), or (3) schemes can be configured in advance or can be separately configured by a higher layer configuration.

Third Embodiment

As a third embodiment of the present invention, a method of performing UCI feedback according to a frame structure of PCell can be used.

In particular, in case that frame structures different from each other exist between cells, a system is configured to perform UCI feedback on the basis of the PCell.

According to the aforementioned configuration, the method of performing UCI feedback is dependently determined according to a cell type (PCell or SCell) and a cell index.

In LTE-A release 10, a PCell can be configured as a cell including a lowest cell index (e.g., ServiCellIndex) without an explicit indication.

In this case, when FDD and TDD coexist in configured serving cells, a UE may differentiate a usage of the PCell according to whether the PCell corresponds to FDD or TDD.

Meanwhile, if the PCell corresponds to either FDD or TDD, predetermined rules different from each other can be applied, respectively.

(1) in Case that PCell Corresponds to FDD

First of all, a method of performing UCI feedback based on timing of a cell configured by FDD can be used. And, a method of transmitting PUCCH in a cell configured by FDD only can be applied as well. And, among the aforementioned second embodiment, 'the method of transmitting PUCCH in a cell configured by TDD if UCI of TDD/FDD cells corresponds to a DL subframe in a cell configured by TDD and the method of transmitting PUCCH in a cell configured by FDD only if UCI of a cell configured by the FDD corresponds to a UL subframe in a cell configured by TDD' may be used.

(2) in Case that PCell Corresponds to TDD

First of all, among the aforementioned second embodiment, 'the method of transmitting PUCCH in a cell configured by TDD only' can be used.

And, among the aforementioned second embodiment, 'the method of transmitting PUCCH in a cell configured by TDD if UCI of TDD/FDD cells corresponds to a DL subframe in a cell configured by TDD and the method of transmitting PUCCH in a cell configured by FDD only if UCI of a cell configured by the FDD corresponds to a UL subframe in a cell configured by TDD' may be used.

Fourth Embodiment

As a fourth embodiment of the present invention, a method of managing multiple PCells (or multiple cell groups) can be applied.

According to the fourth embodiment, in order for a specific UE to support a use of frame structures (FDD or TDD) different from each other between configured serving cells, unlike LTE-A Rel-10 where a single Pcell exists only, the present invention proposes to use multiple PCells.

In particular, the specific UE may have one or more PCell(s). And, each of the PCells includes PUCCH for ACK/NACK or CSI and may be able to perform ACK/NACK feedback or CSI feedback.

In this case, the number of PCells capable of being possessed by the specific UE may be equal to or less than the total number of cells configured to the UE. In this case, control information can be transmitted using a legacy method of each PCell transmitting UCI.

In the following description, detailed forms to which the fourth embodiment is applicable are explained in a manner of being divided into two.

First Embodiment Form

First of all, a UE may have one or more x number of (e.g., x=2) PCell(s). (It can be determined in advance or indicated by a signaling)

If a plurality of PCells exists, the PCells may include frame structures different from each other (FDD or TDD).

In this case, one or more PCells may indicate that one or more PCells and one or more Scells exist in DL CCs only (while original one PCell and one or more Scells are used in UL CCs as it is). Or, one or more PCells may indicate that one or more PCells and one or more Scells exist in UL CCs only (while original one PCell and one or more Scells are used in DL CCs as it is). Or, one or more PCells may indicate that one or more PCells and one or more Scells exist in DL CCs and UL CCs at the same time.

A UE may have one or more SCell(s) related to each of the PCells. Yet, a SCell related to a PCell may not exist.

In this case, if a cell becoming a standard for UCI feedback (e.g., a cell becoming an application standard of 'Table 10.1-1: Downlink association set index k: $\{k_0, k_1, \ldots k_{M-1}\}$ for TDD' of TS 36.213 v10.0.1 or a related M value (size of bundling window) and/or a cell where PUCCH exists) corresponds to the PCell, one or more SCell(s) related to the PCell may mean cells operating in a manner of being bundled with the PCell in group unit.

In particular, UCI of both the related PCells and the Scells are gathered at one time and UCI feedback is performed via a single PUCCH. In this case, the related PCells and the Scells may be situated in an identical band (potentially same RF).

In this case, assume that one or more Scells related to a specific PCell correspond to a cell group in a manner of being bundled together. In this case, all cells included in one cell group are configured to have an identical frame structure (FDD or TDD).

And, formation/configuration of a cell group is a logical meaning. Hence, it may not mean a generation of an actual physical group. If there is no related SCell, a cell group can be configured with PCell only.

Meanwhile, a UE may have at least one cell group. Each cell group includes one PCell and may include a SCell(s) (if it exists) related to the PCell.

And, UL/DL configurations different from each other can exist in a cell group configured by TDD.

In this case, a method of transmitting UCI in the cell group may be non-limited to the present invention. The present invention can be applied to (final) A/N transmission for the cell group configured by TDD and simultaneous A/N transmission of the cell group configured by FDD.

For at least one cell groups, a UE may be able to transmit ACK/NACK feedback, CSI reporting, sounding transmission, or the like via PUCCH in a PCell of each of the cell groups.

In this case, since the cell group is already configured to have an identical frame structure (FDD or TDD), the aforementioned technical problem does not occur in the cell group. It may be necessary to have RF stages different from each other between cell groups.

Cells included in an identical cell group may have an intra-band CA environment and an inter-band CA environment can be achieved between cell groups.

In this case, if a cell group is classified by a frame structure, the maximum number of PCells capable of being possessed by a specific UE may correspond to 2.

Yet, variables (e.g., TDD UL/DL configuration and the like) except the frame structure can be used to classify a cell group. By doing so, the number of cell groups may increase.

Second Embodiment Form

First of all, a UE can support frame structures (FDD or TDD) different from each other and less than a specific number x (e.g., x=2). (It can be determined in advance or indicated by a signaling) This configuration can be differently applied according to UE or can be identically applied to all UEs.

In this case, a base station can configure cells using frame structures different from each other and less than the specific number x only for a corresponding UE.

For instance, if the specific number x is identically configured for all UEs and the specific number x corresponds to 2, the base station can configure cells in a manner of using 2 frame structures (FDD or TDD) different from each other only.

A base station indicates/allocates configured serving cells to a UE. In this case, although a frame structure (FDD or TDD) may be different from each other according to a cell, there may exist frame structures different from each other and less than x number only. The UE can distinguish cells having an identical frame structure (FDD or TDD) as a cell group from the configured serving cells allocated by the base station. Since there exist the frame structures different from each other and less than x number of frame structures only, the number of cell groups less than x number can be generated. This sort of formation/configuration of the cell group is a logical meaning. Hence, it may not mean a generation of an actual physical group. In particular, a cell group includes frame structures (FDD or TDD) different from each other and consists of at least one cell.

A UE configures a specific cell included in the formed/configured cell group as a PCell of the cell group. This may be indicated by a signaling of a base station or can be configured by the UE according to a predetermined rule. For instance, a cell having a smallest cell ID in the cell group can be configured as the PCell of the cell group.

For at least one cell group, the UE may be able to transmit ACK/NACK feedback, CSI reporting, sounding transmission, or the like via PUCCH in the PCell of each of the cell groups.

In this case, since the cell group is already configured to have an identical frame structure (FDD or TDD), the aforementioned technical problem does not occur in the cell group. It may be necessary to have RF stages different from each other between cell groups.

In this case, if the cell group is classified by a frame structure, the maximum number of PCells capable of being possessed by a specific UE may correspond to 2.

Yet, variables (e.g., TDD UL/DL configuration and the like) except the frame structure can be used to classify a cell group. By doing so, the number of cell groups may increase.

Figure 49:
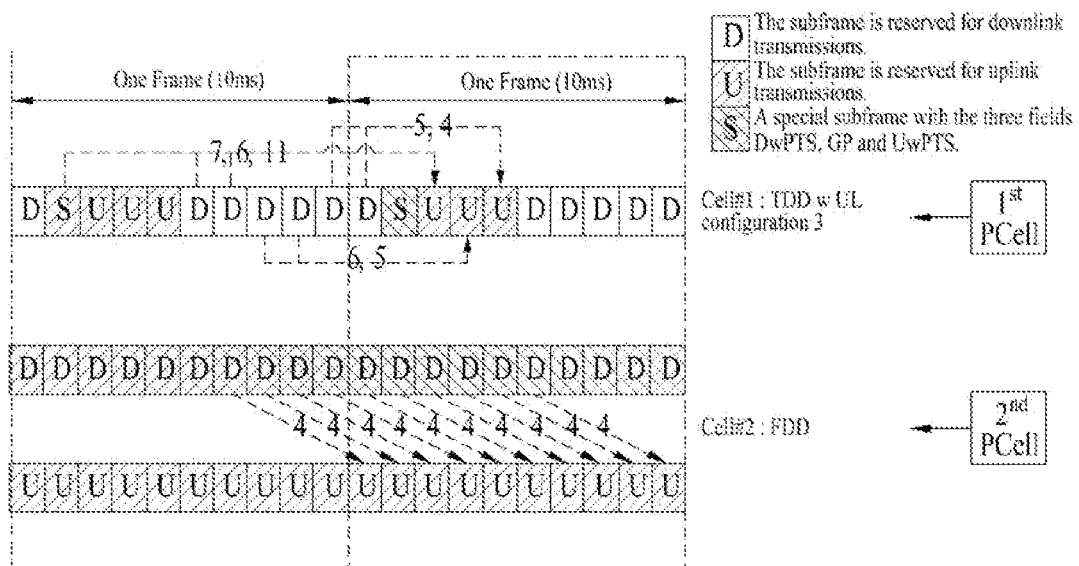
FIG. 49 is a diagram for an example of managing multiple PCells or multiple cell groups in relation to the present invention.

FIG. 49 is a diagram for an example of managing multiple PCells (or multiple cell groups) in relation to the present invention.

Referring to FIG. 49, a cell #1 is configured by TDD and a cell #2 is configured by FDD. Each of the two cells configures a cell group, respectively. In particular, both the cell #1 and the cell #2 become a PCell. A/N feedback is performed in each of the cell groups.

The aforementioned cell group configuration/management can be configured to a UE in various ways. Although a method not directly mentioned in the present invention is used for a method of configuring or designating a plurality of cell groups and a method of configuring or designating a PCell per cell group, by which the present invention may be non-limited.

When the present invention is applied, a transmission format may be non-limited to the present invention. A PUCCH format 1b with channel selection, a PUCCH format 3, or the like can be used. And, such a scheme of processing and transmitting a plurality of ACK/NACK in the bundling window as a spatial bundling, a time-domain bundling, a CC-domain bundling, multiplexing, or the like may be non-limited to the present invention.

In case of using the time-domain bundling, application of 'Table 10.1-1: Downlink association set index K: $\{k_0, k_1, \ldots k_{M-1}\}$ for TDD' of TS 36.213 v10.0.1 can be replaced not by application of an actual K set but by application of a M value indicating the number (size of bundling windows) of the set. In particular, while the PUCCH format 1b with channel selection is used, if an original ACK/NACK payload (no bundling is performed) is greater than 4, the M value is determined from the K set by the criteria. And, a channel selection table can be selected by using one of 'Table 10.1.3.2-1: Transmission of ACK/NACK multiplexing for M=2' or 'Table 10.1.3.2-2: Transmission of ACK/NACK multiplexing for M=3' or 'Table 10.1.3.2-3: Transmission of ACK/NACK multiplexing for M=4' using the determined M value. For instance, when the PUCCH 1b with channel selection is used, if an original ACK/NACK payload is equal to 4 or less than 4, a method of using the K set is applied to the present invention. If an original ACK/NACK payload is greater than 4, a method of using the M value can be applied to the present invention.

Configuration of (the number of) multiple PCells can be determined by the maximum number of inter-band used by a system or a UE. And, the configuration of (the number of) multiple PCells may be determined by a function (e.g., equal to or greater than, equal to or less than, greater than, less than, and the like) where a UL transmission timing (or TA) is related to the number of configured serving cells different from each other.

Meanwhile, although a specific cell(s) is explicitly indicated as PCell(s), the PCell(s) can be implicitly used by a predetermined rule. For instance, following method can be used.

PCell(s) can be determined by a predetermined rule among Cell IDs (identity) (or index). For instance, a cell having a lowest index among the cell IDs may be designated as the PCell. In case of using multiple PCells, the rule may be modified. For instance, if PCells different from each other are used between inter-bands, a cell having a lowest cell ID in an intra-band can be designated/used as the PCell in the intra-band. In particular, a UE can perform UCI transmission in a cell having a lowest index in the intra-band. In case of using a plurality of inter-bands, PCell for a plurality of UCI transmissions may exist. As a different example, in case that multiple PCells are used on the basis of a timing advance value, a cell having a lowest index among cells (cell group) where the multiple timing advance values are identical to each other or a difference between the multiple timing advance values is less than a predetermined value can be designated/used as the PCell in the cell group. In particular, a UE can perform UCI transmission in the cell having a lowest cell ID in the cell group. If at least one cell group(s) exists, PCell for a plurality of UCI transmissions may exist.

And, the cell identity used in this part can be indicated by 'physCellId', which is an RRC parameter.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are mainly explained centering on a signal transmission and reception relation between a user equipment and a base station. The signal transmission and reception relation can be identically/similarly extended to a signal transmission and reception between a user equipment and a relay or between a base station and a relay. A specific operation explained as performed by a base station may be performed by an upper node of the base station in some cases. In particular, in a network constructed with a plurality of network nodes including a base station, it is apparent that various operations performed for communication with a user equipment can be performed by the base station or other networks except the base station. 'Base station (BS)' may be substituted with such a terminology as a fixed station, a Node B, an eNode B (eNB), an access point (AP) and the like. And, a terminal may be substituted with such a terminology as a user equipment (UE), a mobile station (MS), a mobile station subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting control information in a wireless access system and apparatus therefor are described with reference to examples applied to 3GPP LTE system, it may be applicable to various kinds of wireless communication systems except the 3GPP LTE system.

What is claimed is:

1. A method for transmitting control information to a base station by a user equipment in a wireless communication system supporting carrier aggregation, the user equipment being configured with a first cell operating in frequency division duplex (FDD) and a second cell operating in time division duplex (TDD), the method comprising:

receiving, by the user equipment from the base station, at least one first downlink signal in at least one first subframe on the first cell;

receiving, by the user equipment from the base station, at least one second downlink signal in at least one second subframe on the second cell; and transmitting, by the user equipment to the base station, the control information corresponding to hybrid automatic repeat request acknowledgements (HARQ-ACKs) in a subframe n in response to the received at least one first downlink signal and the received at least one second downlink signal, wherein the subframe n is associated with the at least one first subframe on the first cell and the at least one second subframe on the second cell according to a frame structure of a cell having a lowest cell index from the first cell and the second cell, and wherein, when the cell having the lowest cell index is the second cell and the second cell has UL-DL configuration 3, the subframe n is associated with the at least one first subframe, n−k, on the first cell, k being defined based on the following table:

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 3 | — | — | 11, 10, 9, 8, 7, 6 | 6, 5 | 5, 4 | — | — | — | — | — | and the subframe n is associated with the at least one second subframe, n−m, on the second cell, m being defined based on the following table:

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 3 | — | — | 7, 6, 11 | 6, 5 | 5, 4 | — | — | — | — | —. |

2. The method of claim 1, wherein:

when the cell having the lowest cell index is the first cell, the subframe n is associated only with a subframe n−4 on the first cell and the second cell, and when the cell having the lowest cell index is the second cell operating in TDD, the subframe n is associated with the at least one first subframe, n−k, on the first cell and the at least one second subframe, n−k, on the second cell, k being defined according to an uplink-downlink (UL-DL) configuration of the second cell based on the following table:

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

3. The method of claim 1, wherein the cell having the lowest cell index is a primary cell.

4. The method of claim 3, wherein a cell other than the primary cell is a secondary cell.

5. The method of claim 1, wherein each of the at least one first downlink signal and the at least one second downlink signal includes at least one of a physical downlink control channel (PDCCH) or a physical downlink shared channel (PDSCH).

6. A user equipment configured to transmit control information to a base station in a wireless communication system supporting carrier aggregation, the user equipment being configured with a first cell operating in frequency division duplex (FDD) and a second cell operating in time division duplex (TDD), the user equipment comprising:

a reception module that receives at least one first downlink signal from the base station in at least one first subframe on the first cell, and receives at least one second downlink signal from the base station in at least one second subframe on the second cell;

a transmission module that transmits the control information corresponding to hybrid automatic repeat request acknowledgements (HARQ-ACKs) in a subframe n in response to the received at least one first downlink signal and the received at least one second downlink signal to the base station; and a processor that associates the subframe n with the at least one first subframe on the first cell and the at least one second subframe on the second cell according to a frame structure of a cell having a lowest cell index from the first cell and the second cell, and wherein, when the cell having the lowest cell index is the second cell and the second cell has UL-DL configuration 3, the subframe n is associated with the at least one first subframe, n−k, on the first cell, k being defined based on the following table:

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 3 | — | — | 11, 10, 9, 8 7, 6 | 6, 5 | 5, 4 | — | — | — | — | — | and the subframe n is associated with the at least one second subframe, n−m, on the second cell, m being defined based on the following table:

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 3 | — | — | 7, 6, 11 | 6, 5 | 5, 4 | — | — | — | — | —. |

7. The user equipment of claim 6, wherein:

when the cell having the lowest cell index is the first cell, the subframe n is associated only with a subframe n−4 on the first cell and the second cell, and when the cell having the lowest cell index is the second cell, the subframe n is associated with the at least one first subframe, n−k, on the first cell and the at least one second subframe, n−k, on the second cell, k being defined according to an uplink-downlink (UL-DL) configuration of the second cell based on the following table:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

8. The user equipment of claim 6, wherein the cell having the lowest cell index is a primary cell.

9. The user equipment of claim 8, wherein a cell other than the primary cell is a secondary cell.

10. The user equipment of claim 6, wherein each of the at least one first downlink signal and the at least one second downlink signal includes at least one of a physical downlink control channel (PDCCH) or a physical downlink shared channel (PDSCH).

11. The method of claim 2, wherein the UL-DL configuration of the second cell is defined according to the following table:

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

12. The user equipment of claim 7, wherein the UL-DL configuration of the second cell is defined according to the following table:

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

13. A method for transmitting control information to a base station by a user equipment in a wireless communication system supporting carrier aggregation, the user equipment being configured with a first cell operating in frequency division duplex (FDD) and a second cell operating in time division duplex (TDD), the method comprising:

receiving, by the user equipment from the base station, a plurality of downlink signals in at least one subframe on the first cell and the second cell;

multiplexing, by the user equipment, HARQ-ACKs for the plurality of downlink signals to generate the control information; and transmitting, by the user equipment to the base station, the control information in a subframe n, wherein the subframe n is associated with the at least one subframe according to a frame structure of the first cell and the second cell depending upon which cell has the lowest cell index, and wherein, when the cell having the lowest cell index is the second cell and the second cell has UL-DL configuration 3, the subframe n is associated with the at least one first subframe, n−k, on the first cell, k being defined based on the following table:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 11, 10, 9, 8, 7, 6 6, 5 5, 4 | — | — | — | — | — | — | — | and the subframe n is associated with the at least one second subframe, n−m, on the second cell, m being defined based on the following table:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | —. |

14. The method of claim 13, wherein:

when the cell having the lowest cell index is the first cell, the subframe n is associated only with a subframe n−4 on the first cell and the second cell, and when the cell having the lowest cell index is the second cell, the subframe n is associated with the at least one subframe, n−k, on the first cell and the second cell, k being defined according to an uplink-downlink (UL-DL) configuration of the second cell based on the following table:

| UL-DL Configuration | \multicolumn{10}{c|}{Subframe n} |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

15. The method of claim 13, wherein the cell having the lowest cell index is a primary cell.

16. The method of claim 15, wherein a cell other than the primary cell is a secondary cell.

17. The method of claim 13, wherein the UL-DL configuration of the second cell is defined according to the following table:

| UL-DL Configuration | \multicolumn{10}{c|}{Subframe number} |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

* * * * *